(12) United States Patent
Van Ostrand

(10) Patent No.: US 12,405,696 B2
(45) Date of Patent: Sep. 2, 2025

(54) NO-GROUND PLANE DIFFERENTIAL TOUCH SCREEN DISPLAY

(71) Applicant: SigmaSense, LLC., Austin, TX (US)

(72) Inventor: Daniel Keith Van Ostrand, Leander, TX (US)

(73) Assignee: SigmaSense, LLC., Austin, TX (US)

(*) Notice: Subject to any disclaimer, the term of this patent is extended or adjusted under 35 U.S.C. 154(b) by 0 days.

(21) Appl. No.: 18/825,403

(22) Filed: Sep. 5, 2024

(65) Prior Publication Data

US 2024/0427464 A1    Dec. 26, 2024

Related U.S. Application Data

(63) Continuation of application No. 18/214,722, filed on Jun. 27, 2023, now Pat. No. 12,093,495, which is a
(Continued)

(51) Int. Cl.
*G06F 3/044*    (2006.01)
*G06F 3/041*    (2006.01)

(52) U.S. Cl.
CPC .......... *G06F 3/0446* (2019.05); *G06F 3/0412* (2013.01)

(58) Field of Classification Search
CPC .. G06F 3/04166; G06F 3/0412; G06F 3/0446; G06F 3/0448
See application file for complete search history.

(56) References Cited

U.S. PATENT DOCUMENTS

| 5,437,178 A | 8/1995 | Esin et al. |
| 6,218,972 B1 | 4/2001 | Groshong |

(Continued)

FOREIGN PATENT DOCUMENTS

| CN | 104536627 A | 4/2015 |
| CN | 107771273 A | 3/2018 |
| EP | 2284637 A1 | 2/2011 |

OTHER PUBLICATIONS

Baker; How delta-sigma ADCs work, Part 1; Analog Applications Journal; Oct. 1, 2011; 6 pgs.
(Continued)

*Primary Examiner* — Deeprose Subedi
(74) *Attorney, Agent, or Firm* — Garlick & Markison; Patricia M. Healy

(57) ABSTRACT

A no-ground plane differential touch screen display includes a display, a plurality of differential electrode pairs integrated into the display, a plurality of differential drive-sense circuits, and a processing module. When enabled, a set of differential drive-sense circuits of the plurality of differential drive-sense circuits is operable to provide a set of differential electrode signals to a set of differential electrode pairs of the plurality of differential electrode pairs and generate a set of sensed signals representative of electrical characteristic changes of the set of differential electrode pairs. The processing module is operable to interpret the electrical characteristic changes as one or more of a column mutual capacitance of a column differential electrode pair, a row mutual capacitance of a row differential electrode pair, and a cross mutual capacitance at a crossing between one or more row differential electrode pairs and column differential electrode pairs.

1 Claim, 31 Drawing Sheets

Related U.S. Application Data continuation of application No. 17/820,499, filed on Aug. 17, 2022, now Pat. No. 11,733,820, which is a continuation of application No. 17/449,228, filed on Sep. 28, 2021, now Pat. No. 11,435,864.

(56) References Cited

U.S. PATENT DOCUMENTS

| | | | |
|---|---|---|---|
| 6,665,013 | B1 | 12/2003 | Fossum et al. |
| 7,476,233 | B1 | 1/2009 | Wiener et al. |
| 7,528,755 | B2 | 5/2009 | Hammerschmidt |
| 8,031,094 | B2 | 10/2011 | Hotelling |
| 8,089,289 | B1 | 1/2012 | Kremin et al. |
| 8,279,180 | B2 | 10/2012 | Hotelling et al. |
| 8,547,114 | B2 | 10/2013 | Kremin |
| 8,625,726 | B2 | 1/2014 | Kuan |
| 9,201,547 | B2 | 12/2015 | Elias |
| 2003/0052657 | A1 | 3/2003 | Koernle et al. |
| 2005/0235758 | A1 | 10/2005 | Kowal et al. |
| 2011/0063154 | A1 | 3/2011 | Hotelling et al. |
| 2011/0298745 | A1 | 12/2011 | Souchkov |
| 2012/0256870 | A1* | 10/2012 | Klein .................. G06F 3/0446 345/174 |
| 2013/0278447 | A1 | 10/2013 | Kremin |
| 2016/0188049 | A1 | 6/2016 | Yang et al. |
| 2018/0157354 | A1 | 6/2018 | Blondin et al. |
| 2018/0275824 | A1 | 9/2018 | Li |
| 2021/0373711 | A1 | 12/2021 | Smith |

OTHER PUBLICATIONS

Brian Pisani, Digital Filter Types in Delta-Sigma ADCs, Application Report SBAA230, May 2017, pp. 1-8, Texas Instruments Incorporated, Dallas, Texas.

European Patent Office; Extended European Search Report; Application No. 19853507.2; Jun. 13, 2023; 7 pgs.

* cited by examiner differential touch screen computing device 10

DDSC = differential drive-sense circuit differential touch screen display 44 drive-sense circuit 60

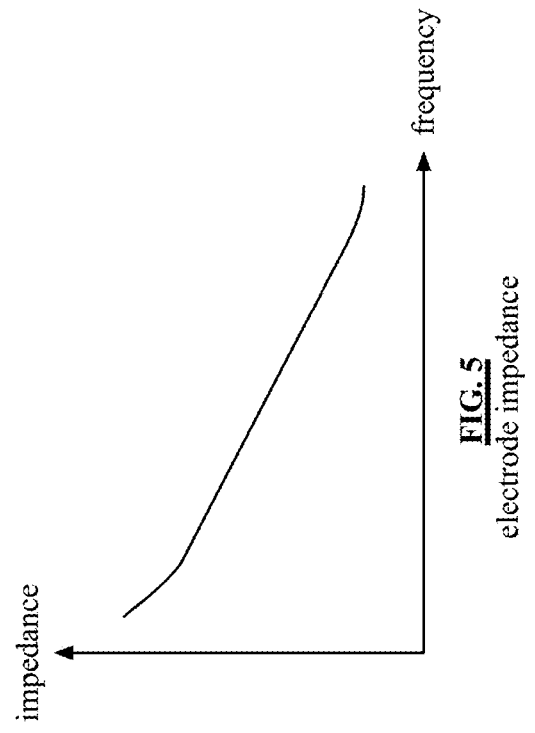
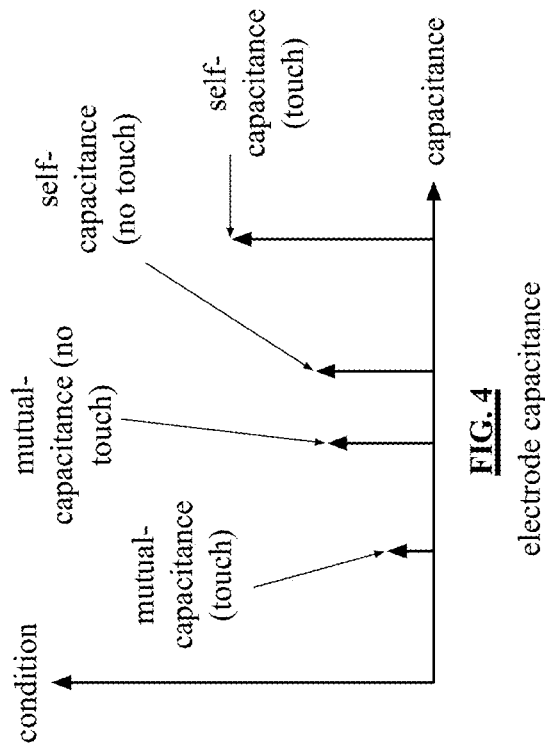
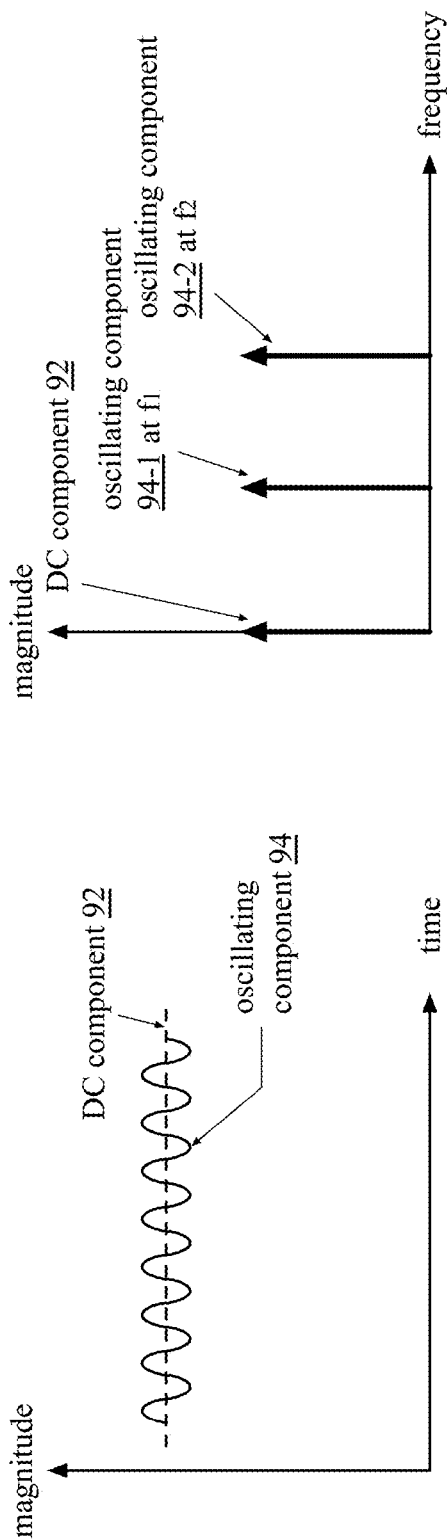

no touch with grounded touch with ungrounded touch

NO-GROUND PLANE DIFFERENTIAL TOUCH SCREEN DISPLAY

CROSS-REFERENCE TO RELATED APPLICATIONS

The present U.S. Utility Patent Application claims priority pursuant to 35 U.S.C. § 120 as a continuation of U.S. Utility application Ser. No. 18/214,722, entitled "NO-GROUND PLANE DIFFERENTIAL TOUCH SCREEN DISPLAY", filed Jun. 27, 2023, which claims priority pursuant to 35 U.S.C. § 120 as a continuation of U.S. Utility application Ser. No. 17/820,499, entitled "DIFFERENTIAL TOUCH SCREEN DISPLAY SIGNAL PROCESSING," filed Aug. 17, 2022, issued as U.S. Pat. No. 11,733,820 on Aug. 22, 2023, which claims priority pursuant to 35 U.S.C. § 120 as a continuation of U.S. Utility application Ser. No. 17/449,228, entitled "DIFFERENTIAL TOUCH SCREEN DISPLAY," filed Sep. 28, 2021, issued as U.S. Pat. No. 11,435,864 on Sep. 6, 2022, all of which are hereby incorporated herein by reference in their entirety and made part of the present U.S. Utility Patent Application for all purposes.

STATEMENT REGARDING FEDERALLY SPONSORED RESEARCH OR DEVELOPMENT

Not Applicable.

INCORPORATION-BY-REFERENCE OF MATERIAL SUBMITTED ON A COMPACT DISC

Not Applicable.

BACKGROUND OF THE INVENTION

Technical Field of the Invention

This disclosure relates generally to data communication systems and more particularly to sensed data collection and/or communication.

Description of Related Art

Sensors are used in a wide variety of applications ranging from in-home automation, to industrial systems, to health care, to transportation, and so on. For example, sensors are placed in bodies, automobiles, airplanes, boats, ships, trucks, motorcycles, cell phones, televisions, touch-screens, industrial plants, appliances, motors, checkout counters, etc. for the variety of applications.

In general, a sensor converts a physical quantity into an electrical or optical signal. For example, a sensor converts a physical phenomenon, such as a biological condition, a chemical condition, an electric condition, an electromagnetic condition, a temperature, a magnetic condition, mechanical motion (position, velocity, acceleration, force, pressure), an optical condition, and/or a radioactivity condition, into an electrical signal.

A sensor includes a transducer, which functions to convert one form of energy (e.g., force) into another form of energy (e.g., electrical signal). There are a variety of transducers to support the various applications of sensors. For example, a transducer is capacitor, a piezoelectric transducer, a piezoresistive transducer, a thermal transducer, a thermal-couple, a photoconductive transducer such as a photoresistor, a photodiode, and/or phototransistor.

A sensor circuit is coupled to a sensor to provide the sensor with power and to receive the signal representing the physical phenomenon from the sensor. The sensor circuit includes at least three electrical connections to the sensor: one for a power supply; another for a common voltage reference (e.g., ground); and a third for receiving the signal representing the physical phenomenon. The signal representing the physical phenomenon will vary from the power supply voltage to ground as the physical phenomenon changes from one extreme to another (for the range of sensing the physical phenomenon).

The sensor circuits provide the received sensor signals to one or more computing devices for processing. A computing device is known to communicate data, process data, and/or store data. The computing device may be a cellular phone, a laptop, a tablet, a personal computer (PC), a work station, a video game device, a server, and/or a data center that support millions of web searches, stock trades, or on-line purchases every hour.

The computing device processes the sensor signals for a variety of applications. For example, the computing device processes sensor signals to determine temperatures of a variety of items in a refrigerated truck during transit. As another example, the computing device processes the sensor signals to determine a touch on a touch screen. As yet another example, the computing device processes the sensor signals to determine various data points in a production line of a product.

BRIEF DESCRIPTION OF THE SEVERAL VIEWS OF THE DRAWING(S)

FIG. 4 is an example graph that plots condition verses capacitance for an electrode of a touch screen display having drive-sense circuits (DSC) coupled to electrodes;

FIG. 5 is an example graph that plots impedance verses frequency for an electrode of a touch screen display having drive-sense circuits (DSCs) coupled to electrodes;

FIG. 6 is a time domain example graph that plots magnitude verses time for an analog reference signal;

FIG. 7 is a frequency domain example graph that plots magnitude verses frequency for an analog reference signal;

DETAILED DESCRIPTION OF THE INVENTION

Figure 1:
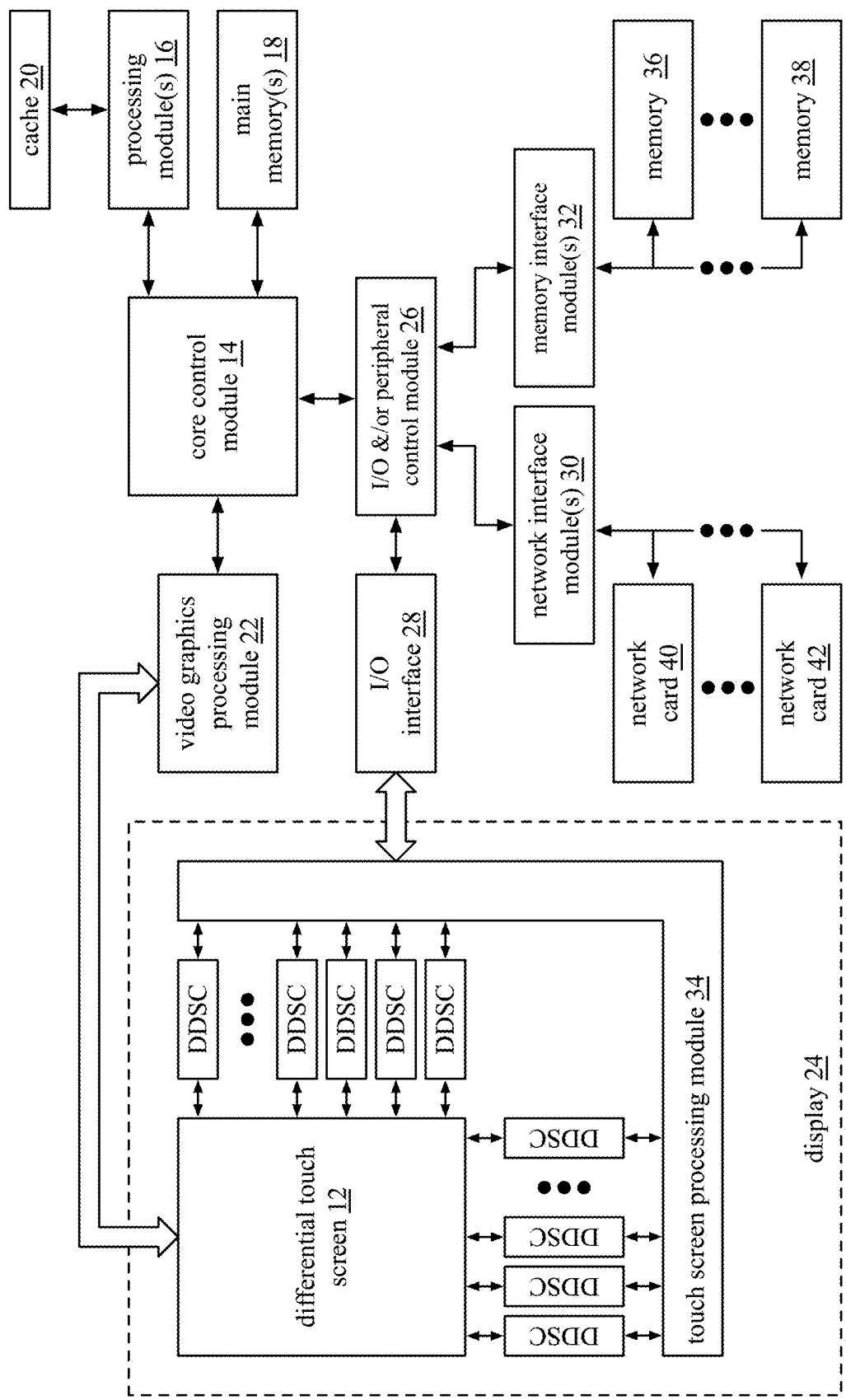
FIG. 1 is a schematic block diagram of an embodiment of a differential touch screen computing device.

FIG. 1 is a schematic block diagram of an embodiment of a differential touch screen computing device 10. The differential touch screen computing device 10 includes a differential touch screen 12, a core control module 14, one or more processing modules 16, one or more main memories 18, cache memory 20, a video graphics processing module 22, a display 24, an Input-Output (I/O) peripheral control module 26, one or more input/output (I/O) interface modules 28, one or more network interface modules 30, and one or more memory interface modules 32. A processing module 16 is described in greater detail at the end of the detailed description of the invention section and, in an alternative embodiment, has a direction connection to the main memory 18. In an alternate embodiment, the core control module 14 and the I/O and/or peripheral control module 26 are one module, such as a chipset, a quick path interconnect (QPI), and/or an ultra-path interconnect (UPI).

The differential touch screen 12 includes a differential touch screen display, a plurality of differential sensor pairs, a plurality of differential drive-sense circuits (DDSCs), and a touch screen processing module 34. In general, the differential sensor pairs (e.g., differential electrode pairs, differential capacitor sensing cell pairs, differential capacitor sensors pairs, differential inductive sensor pairs, etc.) detect a proximal touch of the screen. For example, when one or more fingers touches the screen, capacitance of differential sensor pairs proximal to the touch(es) are affected (e.g., impedance changes). The differential drive-sense circuits (DDSCs) coupled to affected differential sensor pairs detect the change and provide a representation of the change to the touch screen processing module 34, which may be a separate processing module or integrated into the processing module 16.

In comparison to drive-sense circuits (DSCs) coupled to single sensors, the DDSCs are more sensitive to small changes and reduce noise and power of the differential touch screen computing device. A DDSC will be discussed in more detail with reference to FIG. 9.

The touch screen processing module 34 processes the representative signals from the differential drive-sense circuits (DDSCs) to determine the location of the touch(es). This information is inputted to the processing module 16 for processing as an input. For example, a touch represents a selection of a button on screen, a scroll function, a zoom in-out function, etc.

Each of the main memories 18 includes one or more Random Access Memory (RAM) integrated circuits, or chips. For example, a main memory 18 includes four DDR4 ($4^{th}$ generation of double data rate) RAM chips, each running at a rate of 2,400 MHz. In general, the main memory 18 stores data and operational instructions most relevant for the processing module 16. For example, the core control module 14 coordinates the transfer of data and/or operational instructions from the main memory 18 and the memory 36-38. The data and/or operational instructions retrieve from memory 36-38 are the data and/or operational instructions requested by the processing module or will most likely be needed by the processing module. When the processing module is done with the data and/or operational instructions in main memory, the core control module 14 coordinates sending updated data to the memory 36-38 for storage.

The memory 36-38 includes one or more hard drives, one or more solid state memory chips, and/or one or more other large capacity storage devices that, in comparison to cache memory and main memory devices, is/are relatively inexpensive with respect to cost per amount of data stored. The memory 36-38 is coupled to the core control module 14 via the I/O and/or peripheral control module 26 and via one or more memory interface modules 32. In an embodiment, the I/O and/or peripheral control module 26 includes one or more Peripheral Component Interface (PCI) buses to which peripheral components connect to the core control module 14. A memory interface module 32 includes a software driver and a hardware connector for coupling a memory device to the I/O and/or peripheral control module 26. For example, a memory interface 32 is in accordance with a Serial Advanced Technology Attachment (SATA) port.

The core control module 14 coordinates data communications between the processing module(s) 16 and network(s) via the I/O and/or peripheral control module 26, the network interface module(s) 30, and a network card 40 or 42. The network(s) includes one more local area networks (LAN) and/or one or more wide area networks WAN), which may be a public network and/or a private network. A LAN may be a wireless-LAN (e.g., Wi-Fi access point, Bluetooth, ZigBee, etc.) and/or a wired network (e.g., Firewire, Ethernet, etc.). A WAN may be a wired and/or wireless WAN. For example, a LAN may be a personal home or business's wireless network and a WAN is the Internet, cellular telephone infrastructure, and/or satellite communication infrastructure.

A network card 40 or 42 includes a wireless communication unit or a wired communication unit. A wireless communication unit includes a wireless local area network (WLAN) communication device, a cellular communication device, a Bluetooth device, and/or a ZigBee communication device. A wired communication unit includes a Gigabit LAN connection, a Firewire connection, and/or a proprietary computer wired connection. A network interface module 30 includes a software driver and a hardware connector for coupling the network card to the I/O and/or peripheral control module 26. For example, the network interface module 60 is in accordance with one or more versions of IEEE 802.11, cellular telephone protocols, 10/100/1000 Gigabit LAN protocols, etc.

The core control module 14 coordinates data communications between the processing module(s) 16 and input device(s) via the I/O interface module(s) 28 and the I/O and/or peripheral control module 26. An input device includes a keypad, a keyboard, control switches, a touchpad, a microphone, a camera, etc. An I/O interface module 28 includes a software driver and a hardware connector for coupling an input device to the I/O and/or peripheral control module 26. In an embodiment, an I/O interface module 28 is in accordance with one or more Universal Serial Bus (USB) protocols.

The core control module 14 coordinates data communications between the processing module(s) 16 and output device(s) via the I/O interface module(s) 28 and the I/O and/or peripheral control module 26. An output device includes a speaker, etc. An I/O interface module 26 includes a software driver and a hardware connector for coupling an output device to the I/O and/or peripheral control module 26. In an embodiment, an I/O interface module 28 is in accordance with one or more audio codec protocols.

The processing module 16 communicates directly with a video graphics processing module 22 to display data on the display 24. The display 24 includes an LED (light emitting diode) display, an LCD (liquid crystal display), and/or other type of display technology. The display 24 has a resolution, an aspect ratio, and other features that affect the quality of the display 24. The video graphics processing module 22 receives data from the processing module 16, processes the data to produce rendered data in accordance with the characteristics of the display 24, and provides the rendered data to the display 24.

Figure 2:
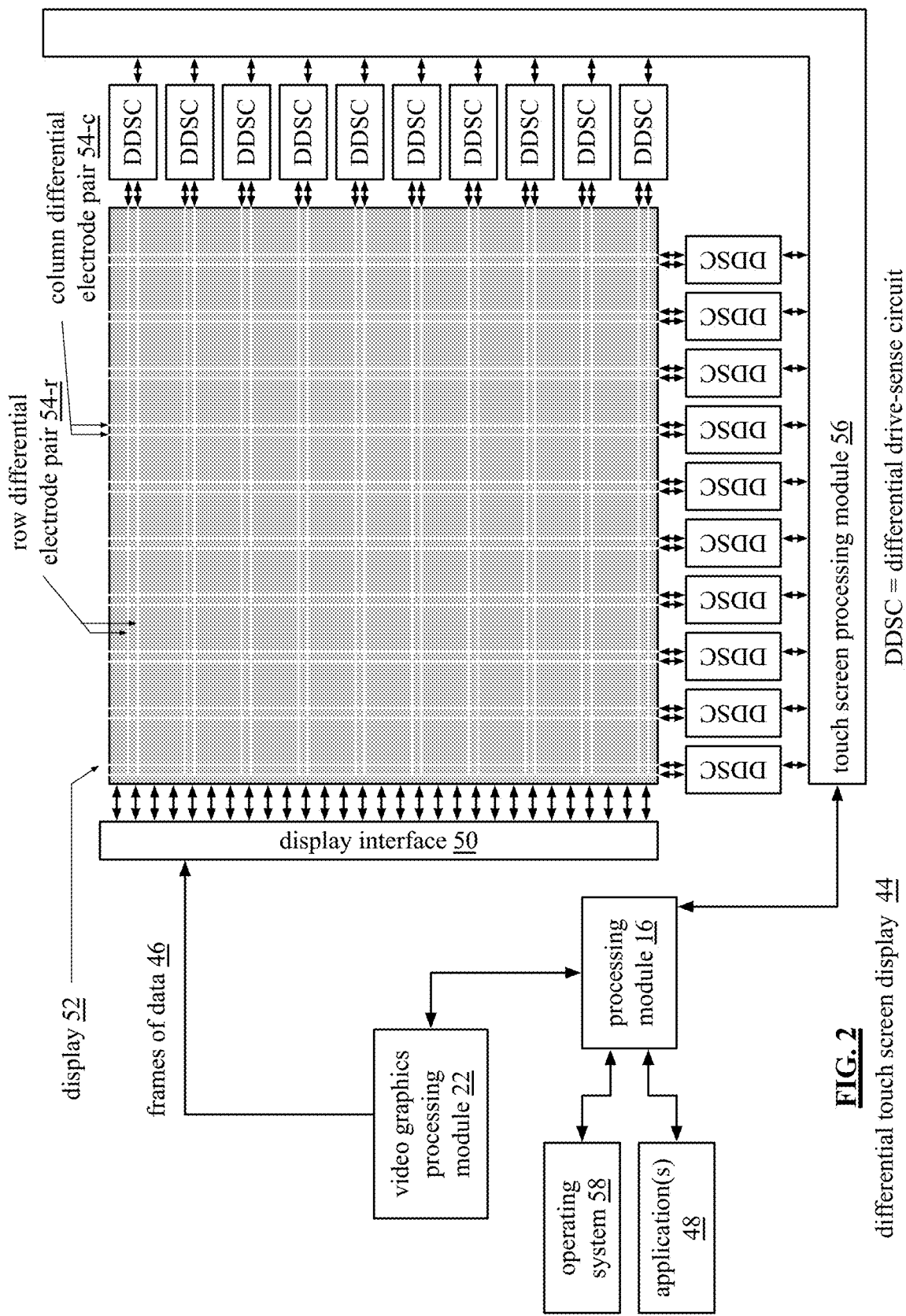
FIG. 2 is a schematic block diagram of an embodiment of a differential touch screen display.

FIG. 2 is a schematic block diagram of an embodiment of a differential touch screen display 44 that includes a plurality of differential drive-sense circuits (DDSCs), a touch screen processing module 56, a display 52, a plurality of row differential electrode pairs 54-$r$, and a plurality of column differential electrode pairs 54-$c$. The differential touch screen display 44 is coupled to a processing module 16, a video graphics processing module 22, and a display interface 50, which are components of a computing device (e.g., differential touch screen computing device 10), an interactive display, or other device that includes a differential touch screen display. An interactive display functions to provide users with an interactive experience (e.g., touch the screen to obtain information, be entertained, etc.). For example, a store provides interactive displays for customers to find certain products, to obtain coupons, to enter contests, etc.

There are a variety of other devices that include a touch screen display. For example, a vending machine includes a touch screen display to select and/or pay for an item. As another example of a device having a touch screen display is an Automated Teller Machine (ATM). As yet another example, an automobile includes a touch screen display for entertainment media control, navigation, climate control, etc.

The differential touch screen display 44 may include a large display 52 that has a resolution equal to or greater than full high-definition (HD), an aspect ratio of a set of aspect ratios, and a screen size equal to or greater than thirty-two inches. The following table lists various combinations of resolution, aspect ratio, and screen size for the display 52, but it is not an exhaustive list.

| Resolution | Width (lines) | Height (lines) | pixel aspect ratio | screen aspect ratio | screen size (inches) |
| --- | --- | --- | --- | --- | --- |
| HD (high definition) | 1280 | 720 | 1:1 | 16:9 | 32, 40, 43, 50, 55, 60, 65, 70, 75, &/or >80 |
| Full HD | 1920 | 1080 | 1:1 | 16:9 | 32, 40, 43, 50, 55, 60, 65, 70, 75, &/or >80 |
| HD | 960 | 720 | 4:3 | 16:9 | 32, 40, 43, 50, 55, 60, 65, 70, 75, &/or >80 |
| HD | 1440 | 1080 | 4:3 | 16:9 | 32, 40, 43, 50, 55, 60, 65, 70, 75, &/or >80 |
| HD | 1280 | 1080 | 3:2 | 16:9 | 32, 40, 43, 50, 55, 60, 65, 70, 75, &/or >80 |
| QHD (quad HD) | 2560 | 1440 | 1:1 | 16:9 | 32, 40, 43, 50, 55, 60, 65, 70, 75, &/or >80 |
| UHD (Ultra HD) or 4K | 3840 | 2160 | 1:1 | 16:9 | 32, 40, 43, 50, 55, 60, 65, 70, 75, &/or >80 |
| 8K | 7680 | 4320 | 1:1 | 16:9 | 32, 40, 43, 50, 55, 60, 65, 70, 75, &/or >80 |
| HD and above | 1280->=7680 | 720->=4320 | 1:1, 2:3, etc. | 2:3 | 50, 55, 60, 65, 70, 75, &/or >80 |

The display 52 is one of a variety of types of displays that is operable to render frames of data into visible images. For example, the display is one or more of: a light emitting diode (LED) display, an electroluminescent display (ELD), a plasma display panel (PDP), a liquid crystal display (LCD), an LCD high performance addressing (HPA) display, an LCD thin film transistor (TFT) display, an organic light emitting diode (OLED) display, a digital light processing (DLP) display, a surface conductive electron emitter (SED) display, a field emission display (FED), a laser TV display, a carbon nanotubes display, a quantum dot display, an interferometric modulator display (IMOD), and a digital microshutter display (DMS). The display is active in a full display mode or a multiplexed display mode (i.e., only part of the display is active at a time).

The display 52 further includes integrated differential electrode pairs 54 that provide the sensors for the touch sense part of the touch screen display. The differential electrode pairs 54 are distributed throughout the display area or where touch screen functionality is desired. For example, a first group of the differential electrode pairs are arranged in rows and a second group of differential electrode pairs are arranged in columns. As will be discussed in greater detail with reference to one or more of the following Figures, the row differential electrode pairs are separated from the column differential electrode pairs by a dielectric material. As compared to an electrode coupled to a drive-sense circuit (DSC), a differential electrode pair coupled to a differential drive-sense circuit (DDSC), is more sensitive to proximal touches and/or hovers due to increased mutual capacitance and decreased common mode noise. The electrode coupled to a drive-sense circuit (DSC) will be discussed in greater detail with reference to FIG. 3. The differential electrode pair coupled to a differential drive-sense circuit (DDSC) will be discussed in greater detail with reference to FIG. 9.

The electrodes 54 are comprised of a transparent conductive material and are in-cell or on-cell with respect to layers of the display. For example, a conductive trace is placed in-cell or on-cell of a layer of the touch screen display. The transparent conductive material, which is substantially transparent and has negligible effect on video quality of the display with respect to the human eye. For instance, an electrode is constructed from one or more of: Indium Tin Oxide, Graphene, Carbon Nanotubes, Thin Metal Films, Silver Nanowires Hybrid Materials, Aluminum-doped Zinc Oxide (AZO), Amorphous Indium-Zinc Oxide, Gallium-doped Zinc Oxide (GZO), and poly polystyrene sulfonate (PEDOT).

In an example of operation, the processing module 16 is executing an operating system application 58 and one or more user applications 48. The user applications 48 include, but are not limited to, a video playback application, a spreadsheet application, a word processing application, a computer aided drawing application, a photo display application, an image processing application, a database application, etc. While executing an application 48, the processing module generates data for display (e.g., video data, image data, text data, etc.). The processing module 16 sends the data to the video graphics processing module 22, which converts the data into frames of video 46 (i.e., data).

The video graphics processing module 22 sends the frames of video 46 (e.g., frames of a video file, refresh rate for a word processing document, a series of images, etc.) to the display interface 50. The display interface 50 provides the frames of video to the display 52, which renders the frames of video into visible images.

While the display 52 is rendering the frames of video into visible images, the differential drive-sense circuits (DDSCs) provide differential electrode signals to the differential electrode pairs 54. When the screen is touched, capacitance of the electrodes 54 proximal to the touch (i.e., directly or close by (e.g., a hover)) is changed. The DDSCs detect the capacitance change for affected electrodes and provide the detected change to the touch screen processing module 56.

The touch screen processing module 56 processes the capacitance change of the affected electrodes to determine one or more specific locations of touch and provides this information to the processing module 16. The processing module 16 processes the one or more specific locations of touch to determine if an operation of the application is to be altered. For example, the touch is indicative of a pause command, a fast forward command, a reverse command, an increase volume command, a decrease volume command, a stop command, a select command, a delete command, etc. In another embodiment, the processing module 16 also operates as the touch screen processing module 56.

Figure 3:
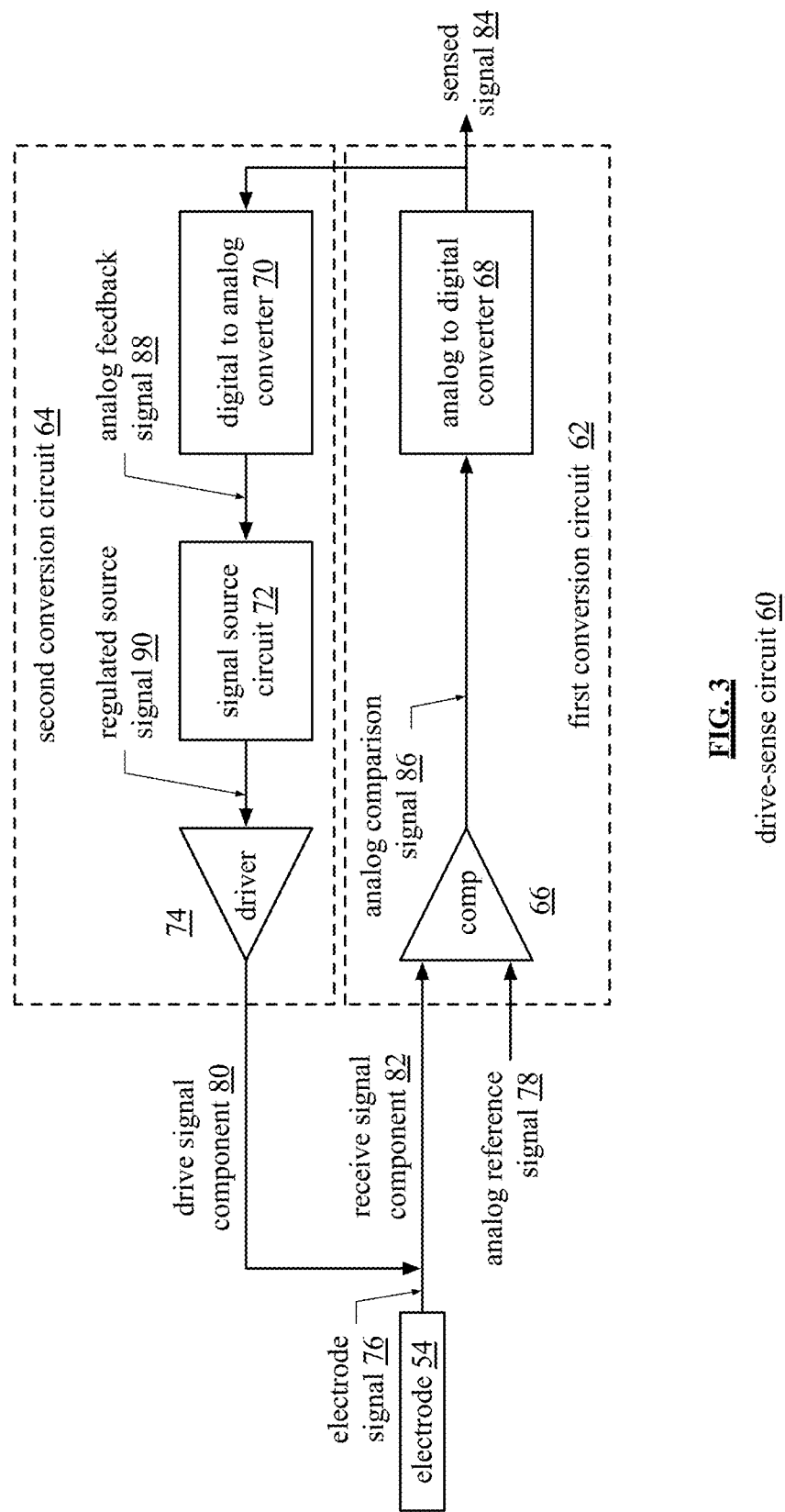
FIG. 3 is a schematic block diagram of an embodiment of a drive-sense circuit (DSC)

FIG. 3 is a schematic block diagram an embodiment of a drive-sense circuit (DSC) 60 coupled to an electrode 54 that includes a first conversion circuit 62 and a second conversion circuit 64. The first conversion circuit 62 includes comparator (comp) 66 and an analog to digital converter (ADC) 68. The second conversion circuit 64 includes a digital to analog converter (DAC) 70, a signal source circuit 72, and a driver 74.

The analog to digital converter (ADC) 68 may be implemented in a variety of ways. For example, the ADC 68 is one of: a flash ADC, a successive approximation ADC, a ramp-compare ADC, a Wilkinson ADC, an integrating ADC, a delta encoded ADC, and/or a sigma-delta ADC. The digital to analog converter (DAC) 70 may be a sigma-delta DAC, a pulse width modulator DAC, a binary weighted DAC, a successive approximation DAC, and/or a thermometer-coded DAC.

The feedback loop of the drive-sense circuit 60 functions to keep an electrode signal 76 substantially matching an analog reference signal 78. As such, the electrode signal 76 will have a similar waveform to that of the analog reference signal 78. The first conversion circuit 62 converts the electrode signal 76 into a sensed signal 84. The second conversion circuit 64 generates the drive signal component 80 from the sensed signal 84. As an example, the first and second conversion circuits 62 and 64 function to keep the electrode signal 76 substantially constant (e.g., substantially matching the reference signal 78) with the first conversion circuit creating the sensed signal 84 to correspond the receive signal component 82 of the electrode signal 76 and the second conversion circuit 64 generating the drive signal component 80 based on adjusting the source signal in accordance with the sensed signal 84.

In an example, the electrode signal 76 is provided to an electrode 54 as a regulated current signal. The regulated current (I) signal in combination with the impedance (Z) of the electrode 54 creates a voltage (V), where V=I*Z. As the impedance (Z) of the electrode 54 changes, the regulated current (I) signal is adjusted to keep the voltage (V) substantially unchanged. To regulate the current signal, the DSC adjusts the drive signal component 80 based on the receive signal component 82 of the sensed signal 84, which is indicative of the impedance of the electrode 54 and changes thereof.

More specifically, the comparator 66 compares the electrode signal 76 to the analog reference signal 78 to produce an analog comparison signal 86. The analog comparison signal 86 contains a representation of the drive signal component 80 and the receive signal component 82. The analog reference signal 78 (e.g., a current signal or a voltage signal) includes a DC component and an oscillating component. The DC component is a DC voltage in the range of a few tens of milli-volts to tens of volts or more. The oscillating component includes a sinusoidal signal, a square wave signal, a triangular wave signal, a multiple level signal (e.g., has varying magnitude over time with respect to the DC component), and/or a polygonal signal (e.g., has a symmetrical or asymmetrical polygonal shape with respect to the DC component). In another example, the frequency of the oscillating component may vary so that it can be tuned to the impedance of the electrode and/or to be off-set in frequency from other electrode signals.

The analog to digital converter 70 converts the analog comparison signal 86 into a digital sensed signal 84 representative of the received signal. In another embodiment, the analog to digital converter 68 and the digital to analog converter 70 are not included and the analog comparison signal 86 is output to the processing module for analysis and analog filtering.

The second conversion circuit 64 adjusts the regulated current based on the changes to the sensed signal 84. More specifically, the digital to analog converter (DAC) 70 converts the sensed signal 84 into an analog feedback signal 88. The signal source circuit 72 (e.g., a dependent current source, a linear regulator, a DC-DC power supply, etc.) generates a regulated source signal 90 (e.g., a regulated current signal or a regulated voltage signal) based on the analog feedback signal 88. The driver 74 increases power of the regulated source signal 90 to produce the drive signal component 80. Note that, in an embodiment, the driver may be omitted.

As another example, the electrode signal 76 is provided to the electrode 54 as a regulated voltage signal. The regulated voltage (V) signal in combination with the impedance (Z) of the electrode 54 creates an electrode current (I), where I=V/Z. As the impedance (Z) of electrode changes, the regulated voltage (V) signal is adjusted to keep the electrode current (I) substantially unchanged. To regulate the voltage signal, the first conversion circuit 62 adjusts the sensed signal 84 based on the receive signal component 82, which is indicative of the impedance of the electrode 54 and changes thereof. The second conversion circuit 64 adjusts the regulated voltage based on the changes to the sensed signal 84.

The digital filtering of the DSC outputted signals can have a very narrow bandwidth (e.g., 100 Hz or less). The combination of low sampling rate, greater than 100 dBm SNR of the DSCs, and very narrow bandwidth allows for very accurate measurements of very low voltage (and/or current) changes of the cells (e.g., of a few nano-volts to tens of pico-volts) in this embodiment and in others.

FIG. 4 is an example graph that plots condition verses capacitance for an electrode of a touch screen display having drive-sense circuits (DSCs) coupled to electrodes as discussed with reference to FIG. 3. As shown, the mutual capacitance decreases with a touch and the self capacitance increases with a touch. Note that the mutual capacitance and self capacitance for a no-touch condition are shown to be about the same. This is done merely for ease of illustration. In practice, the mutual capacitance and self capacitance may or may not be about the same capacitance based on the various properties of the touch screen display discussed above.

FIG. 5 is an example graph that plots impedance verses frequency for an electrode of a touch screen display having drive-sense circuits (DSCs) coupled to electrodes as discussed with reference to FIG. 3. Since the impedance of an electrode is primarily based on its capacitance (self and/or mutual), as the frequency increases for a fixed capacitance, the impedance decreases based on $\frac{1}{2\pi f C}$, where f is the frequency and C is the capacitance.

FIG. 6 is a time domain example graph that plots magnitude verses time for an analog reference signal 78. As discussed with reference to FIG. 3, the analog reference signal 78 (e.g., a current signal or a voltage signal) is inputted to a comparator and is compared to the electrode signal 76. The feedback loop of the drive-sense circuit 60 functions to keep the electrode signal 76 substantially matching the analog reference signal 78. As such, the electrode signal 76 will have a similar waveform to that of the analog reference signal 78.

In an example, the analog reference signal 78 includes a DC component 92 and/or one or more oscillating components 94. The DC component 92 is a DC voltage in the range of a few hundred milli-volts to tens of volts or more. The oscillating component 94 includes a sinusoidal signal, a square wave signal, a triangular wave signal, a multiple level signal (e.g., has varying magnitude over time with respect to the DC component), and/or a polygonal signal (e.g., has a symmetrical or asymmetrical polygonal shape with respect to the DC component).

In another example, the frequency of the oscillating component 94 may vary so that it can be tuned to the impedance of the sensor and/or to be off-set in frequency from other sensor signals in a system. For example, a capacitance sensor's impedance decreases with frequency. As such, if the frequency of the oscillating component is too high with respect to the capacitance, the capacitor looks like a short and variances in capacitances will be missed. Similarly, if the frequency of the oscillating component is too low with respect to the capacitance, the capacitor looks like an open and variances in capacitances will be missed.

FIG. 7 is a frequency domain example graph that plots magnitude verses frequency for an analog reference signal 78. As shown, the analog reference signal 78 includes the DC component 92 at DC (e.g., 0 Hz or near 0 Hz), a first oscillating component 94-1 at a first frequency ($f_1$), and a second oscillating component 94-2 at a second frequency ($f_2$). In an example, the DC component is used to measure resistance of an electrode (if desired), the first oscillating component 94-1 is used to measure the impedance of self capacitance, and the second oscillating component 94-2 is used to measure the impedance of mutual capacitance. Note that the second frequency may be greater than the first frequency.

Figure 8:
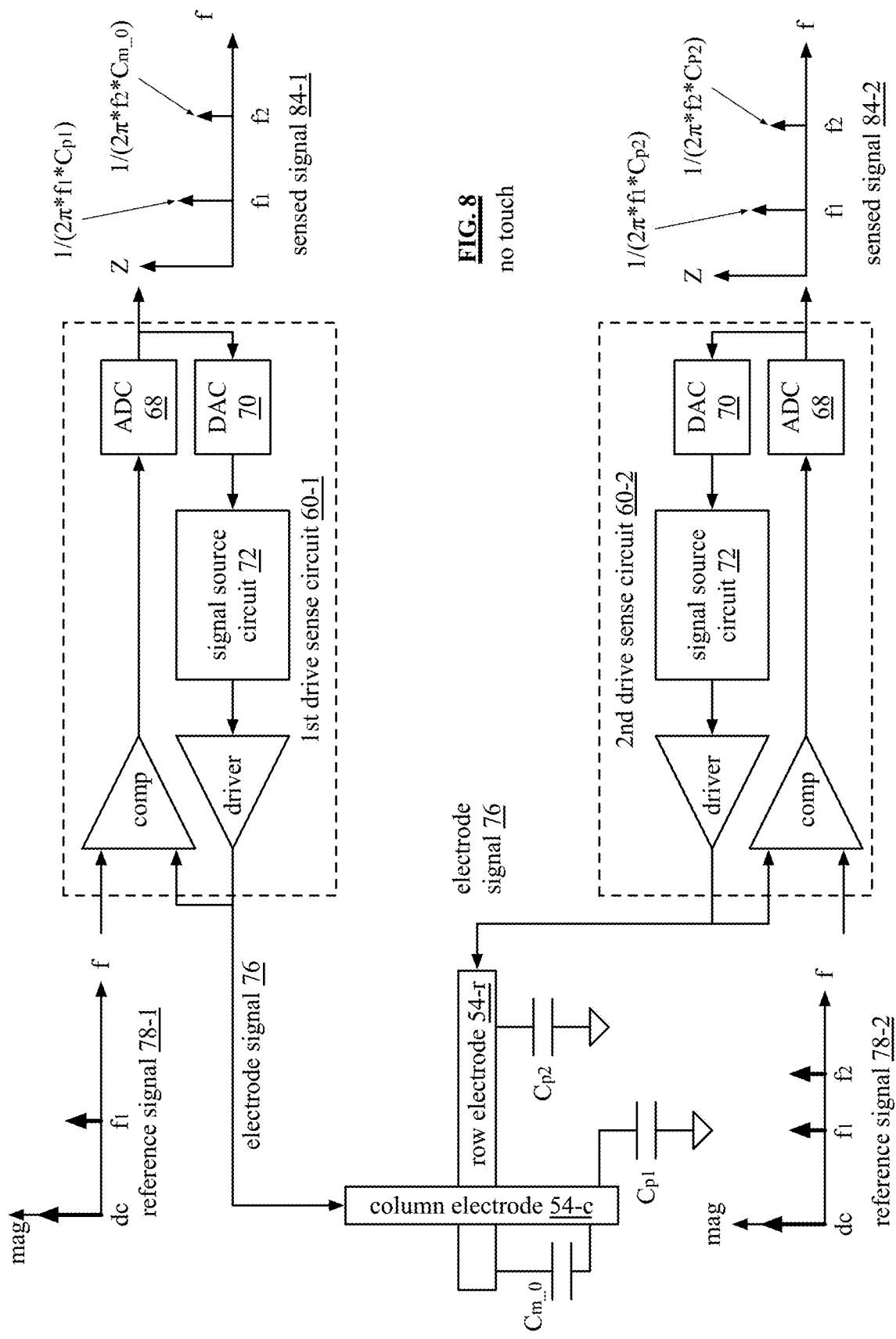
FIG. 8 is a schematic block diagram of an example of a first drive-sense circuit coupled to a first electrode and a second drive-sense circuit coupled to a second electrode.

FIG. 8 is a schematic block diagram of an example of a first drive-sense circuit 60-1 coupled to a first electrode 54-c and a second drive-sense circuit 60-2 coupled to a second electrode 54-r without a touch proximal to the electrodes. Each of the drive-sense circuits include a comparator, an analog to digital converter (ADC) 68, a digital to analog converter (DAC) 70, a signal source circuit 72, and a driver. The functionality of this embodiment of a drive-sense circuit was described with reference to FIG. 3. For additional embodiments of a drive-sense circuit see patent application entitled, "Drive-sense circuit with Drive-Sense Line" having issue date of Aug. 24, 2021, and a patent number of U.S. Pat. No. 11,099,032.

As an example, a first reference signal 78-1 (e.g., analog or digital) is provided to the first drive-sense circuit 60-1 and a second reference signal 78-2 (e.g., analog or digital) is provided to the second drive-sense circuit 60-2. The first reference signal includes a DC component and/or an oscillating at frequency $f_1$. The second reference signal includes a DC component and/or two oscillating components: the first at frequency $f_1$ and the second at frequency $f_2$.

The first drive-sense circuit 60-1 generates an electrode signal 76 based on the reference signal 78-1 and provides the electrode signal to the column electrode 54-c. The second drive-sense circuit generates another electrode signal 76 based on the reference signal 78-2 and provides the electrode signal to the row electrode 54-r.

In response to the electrode signals being applied to the electrodes, the first drive-sense circuit 60-1 generates a first sensed signal 84-1, which includes a component at frequency $f_1$ and a component a frequency $f_2$. The component at frequency $f_1$ corresponds to the self capacitance of the column electrode 54-c and the component a frequency $f_2$ corresponds to the mutual capacitance between the row and column electrodes 54-c and 54-r. The self capacitance is expressed as $1/(2\pi f_1 C_{p1})$ and the mutual capacitance is expressed as $1/(2\pi f_2 C_{m\_0})$.

Also, in response to the electrode signals being applied to the electrodes, the second drive-sense circuit 60-2 generates a second sensed signal 84-2, which includes a component at frequency $f_1$ and a component a frequency $f_2$. The component at frequency $f_1$ corresponds to a shielded self capacitance of the row electrode 54-r and the component a frequency $f_2$ corresponds to an unshielded self capacitance of the row electrode 54-r. The shielded self capacitance of the row electrode is expressed as $1/(2\pi f_1 C_{p2})$ and the unshielded self capacitance of the row electrode is expressed as $1/(2\pi f_2 C_{p2})$.

With each active drive-sense circuit using the same frequency for self capacitance (e.g., $f_1$), the row and column electrodes are at the same potential, which substantially eliminates cross-coupling between the electrodes. This provides a shielded (i.e., low noise) self capacitance measurement for the active drive-sense circuits. In this example, with the second drive-sense circuit transmitting the second frequency component, it has a second frequency component in its sensed signal but is primarily based on the row electrode's self capacitance with some cross coupling from other electrodes carrying signals at different frequencies. The cross coupling of signals at other frequencies injects unwanted noise into this self capacitance measurement and hence it is referred to as unshielded.

Figure 9:
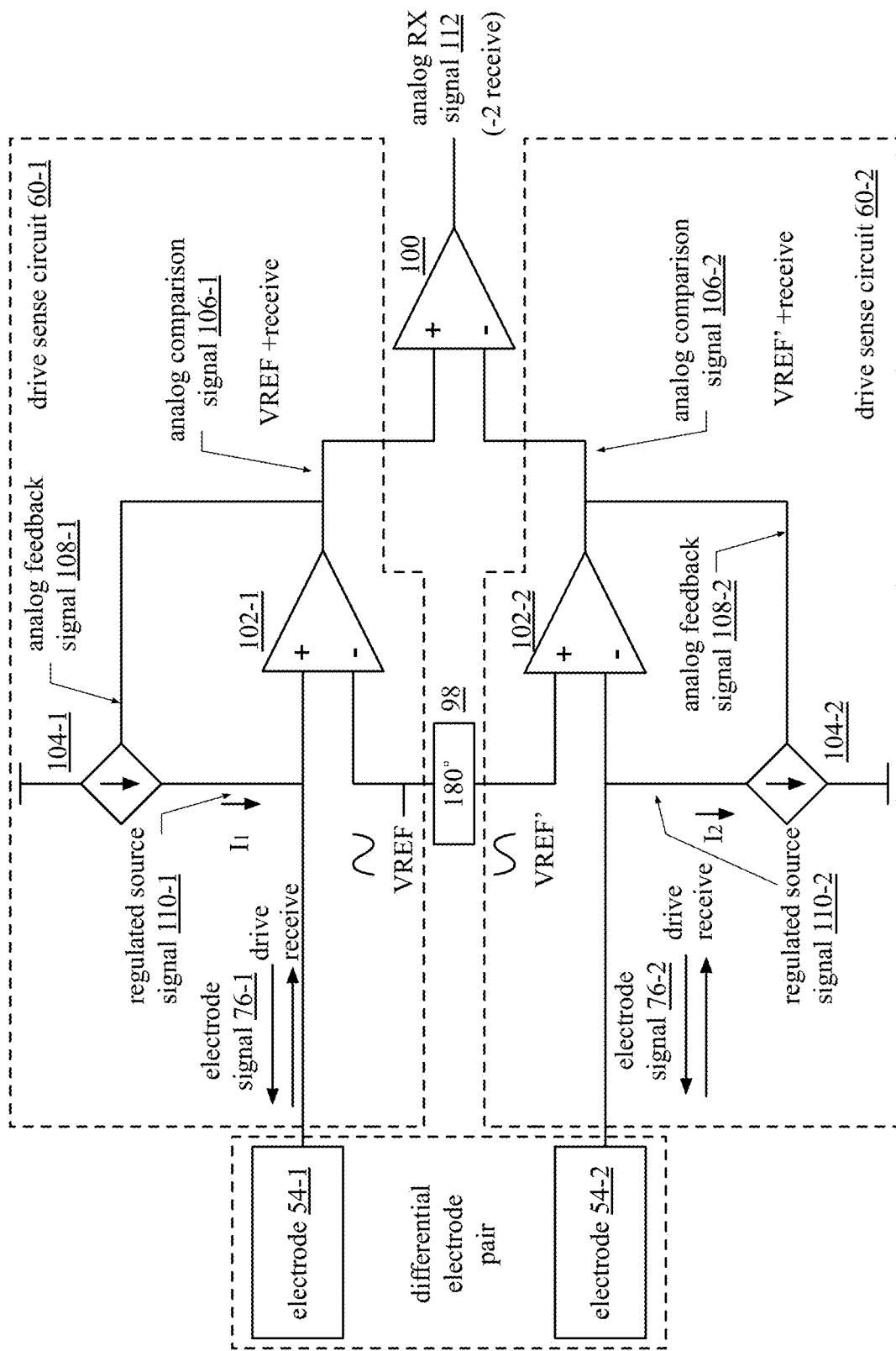
FIG. 9 is a schematic block diagram of an embodiment of a differential drive-sense circuit (DDSC)

FIG. 9 is a schematic block diagram of an embodiment of a differential drive-sense circuit (DDSC) 96 that includes drive-sense circuits 60-1 and 60-2, a 180° phase shifter 98, and an output operational amplifier (op-amp) 100. The drive-sense circuits 60-1 and 60-2 each include an op-amp 102-1 and 102-2, and a regulated current source circuit 104-1 and 104-2. Within the drive-sense circuit 60-1, the positive input terminal of the op-amp 102-1 is coupled to a first electrode 54-1 of a differential electrode pair and the negative input terminal of the op-amp 102-1 is coupled to a voltage reference source (e.g., via a signal generator, via the processing module that generates and provides the voltage reference signal, etc.) that provides an analog reference signal (e.g., voltage reference signal VREF). Within the drive-sense circuit 60-2, the positive input terminal of the op-amp 102-2 is coupled to the 180° phase shifter 98 which provides a 180° phase shifted version of the analog reference signal (voltage reference signal VREF') and the negative input terminal of the op-amp 56-2 is coupled to a second electrode 54-2 of the differential electrode pair.

The drive-sense circuits 60-1 and 60-2 operate similarly to the drive-sense circuit 60 of FIG. 3 where the feedback loops function to keep the electrode signals 76-1 and 76-2 substantially matching the analog reference signals (e.g., VREF and VREF'). As such, the electrode signal 76-1 will have a similar waveform to that of the VREF and the electrode signal 76-2 will have a similar waveform to that of the VREF'.

The electrode signals 76-1 and 76-2 form a differential electrode signal that each include a drive signal component and a receive signal component. The op-amp 102-1 of the drive-sense circuit 60-1 compares the electrode signal 76-1 to the VREF signal to produce an analog comparison signal 106-1. The analog comparison signal 106-1 contains a representation of the receive signal (e.g., the reference signal VREF and the receive signal). The analog comparison signal 106-1 is fed back to the regulated current source circuit 104-1 as analog feedback signal 108-1. The regulated current source circuit 104-1 generates a regulated source signal 110-1 (e.g., a regulated current signal (I1)) based on the analog feedback signal 108-1. The regulated current signal (I1) in combination with the impedance (Z) of the electrode creates a voltage (V), where V=I*Z. As the impedance (Z) of electrode changes, the regulated current (I) signal is adjusted to keep the voltage (V) substantially unchanged. For example, if the impedance increases the voltage on the electrode, the regulated current signal (I1) provides more current to keep the voltage substantially equal to VREF.

The op-amp 102-2 of the drive-sense circuit 60-2 compares the electrode signal 76-2 to the VREF' signal (the 180° phase shifted VREF signal) to produce an analog comparison signal 106-2. The analog comparison signal 106-2 contains a representation of the receive signal (e.g., the reference signal VREF' and the receive signal). The analog comparison signal 106-2 is fed back to the regulated current source circuit 104-2 as analog feedback signal 108-2. The regulated current source circuit 104-2 generates a regulated source signal 110-2 (e.g., a regulated current signal (I2)) based on the analog feedback signal 108-2. The regulated current signal (I2) in combination with the impedance (Z) of the electrode creates a voltage (V), where V=I*Z. As the impedance (Z) of the electrode changes, the regulated current (I) signal is adjusted to keep the voltage (V) substantially unchanged. For example, if the impedance lowers the voltage on the electrode, the regulated current signal (I2) is increased to keep the voltage substantially equal to VREF'.

The output op-amp 100 compares the analog comparison signal 106-1 and the analog comparison signal 106-2 to produce an analog receive (RX) signal 112. Comparing the analog comparison signal 106-1 and the analog comparison signal 106-2 cancels out the VREF and VREF' drive components due to the opposite phases and doubles the receive component. As such, the differential drive-sense circuit 96 is more sensitive than the drive-sense circuit 60 at sensing very small impedance changes because the sensed receive signal is doubled in comparison to the drive-sense circuit 60. Further, with the differential drive-sense circuit 96, because the VREF and VREF' components are canceled out in the analog RX signal, common mode noise is eliminated from the analog RX signal. Therefore, the differential drive-sense circuit 96 is more sensitive and has better signal to noise ratio than the drive-sense circuit 60. Additionally, a lower magnitude VREF in comparison to the DSC embodiment may be used to reduce overall power.

Figure 10:
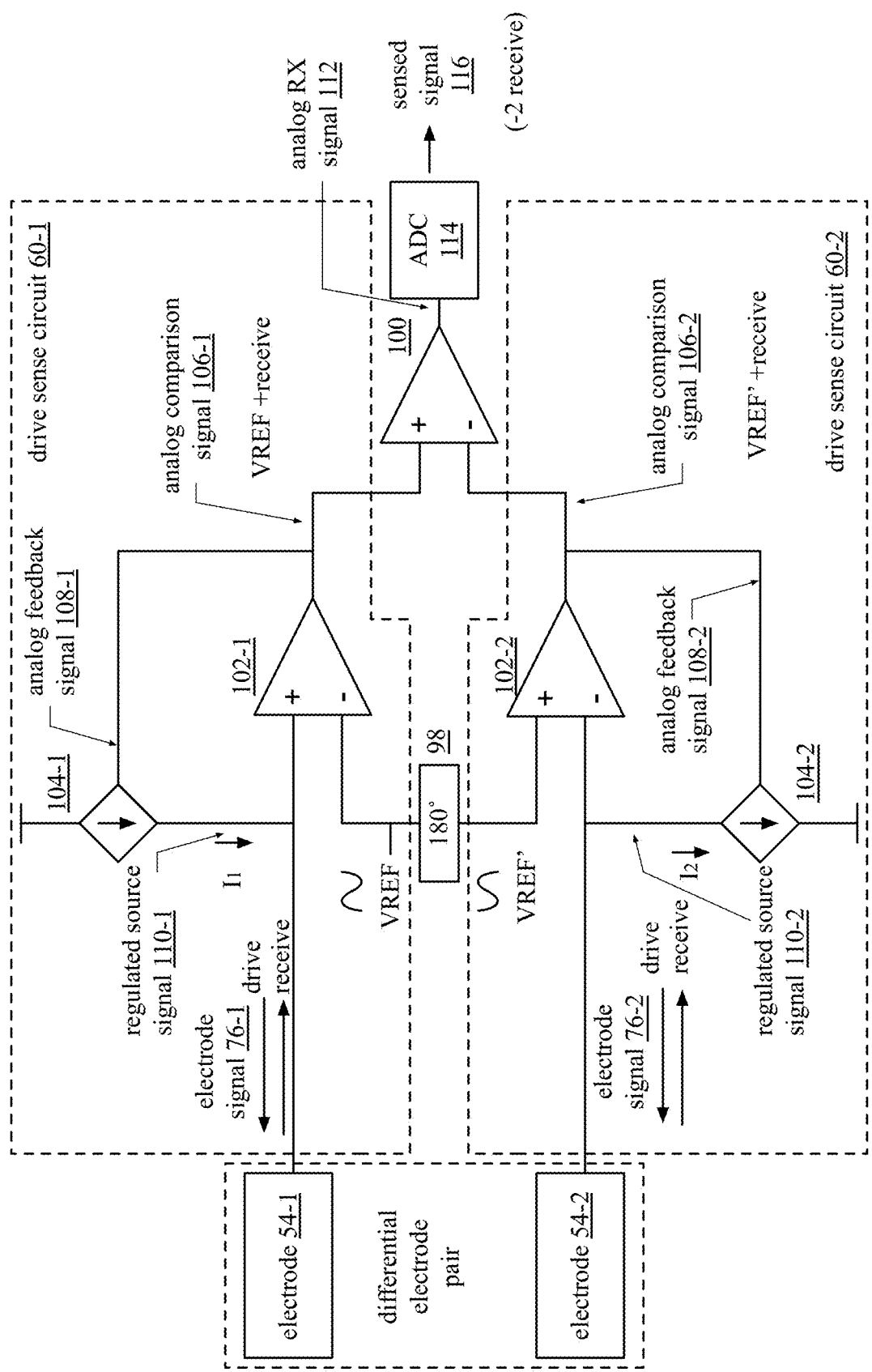
FIG. 10 is a schematic block diagram of another embodiment of a differential drive-sense circuit (DDSC)

FIG. 10 is a schematic block diagram of an embodiment of a differential drive-sense circuit 96 (DDSC). The DDSC 96 of FIG. 10 operates similarly to the DDSC 96 of FIG. 9 except that the DDSC 96 of FIG. 10 includes an analog to digital converter (ADC) 114 coupled to the output op-amp 100 operable to convert the analog RX signal 112 to a digital sensed signal 116. The analog to digital converter (ADC) 114 may be implemented in a variety of ways. For example, the ADC 114 is one of: a flash ADC, a successive approximation ADC, a ramp-compare ADC, a Wilkinson ADC, an integrating ADC, a delta encoded ADC, and/or a sigma-delta ADC.

Figure 11A:
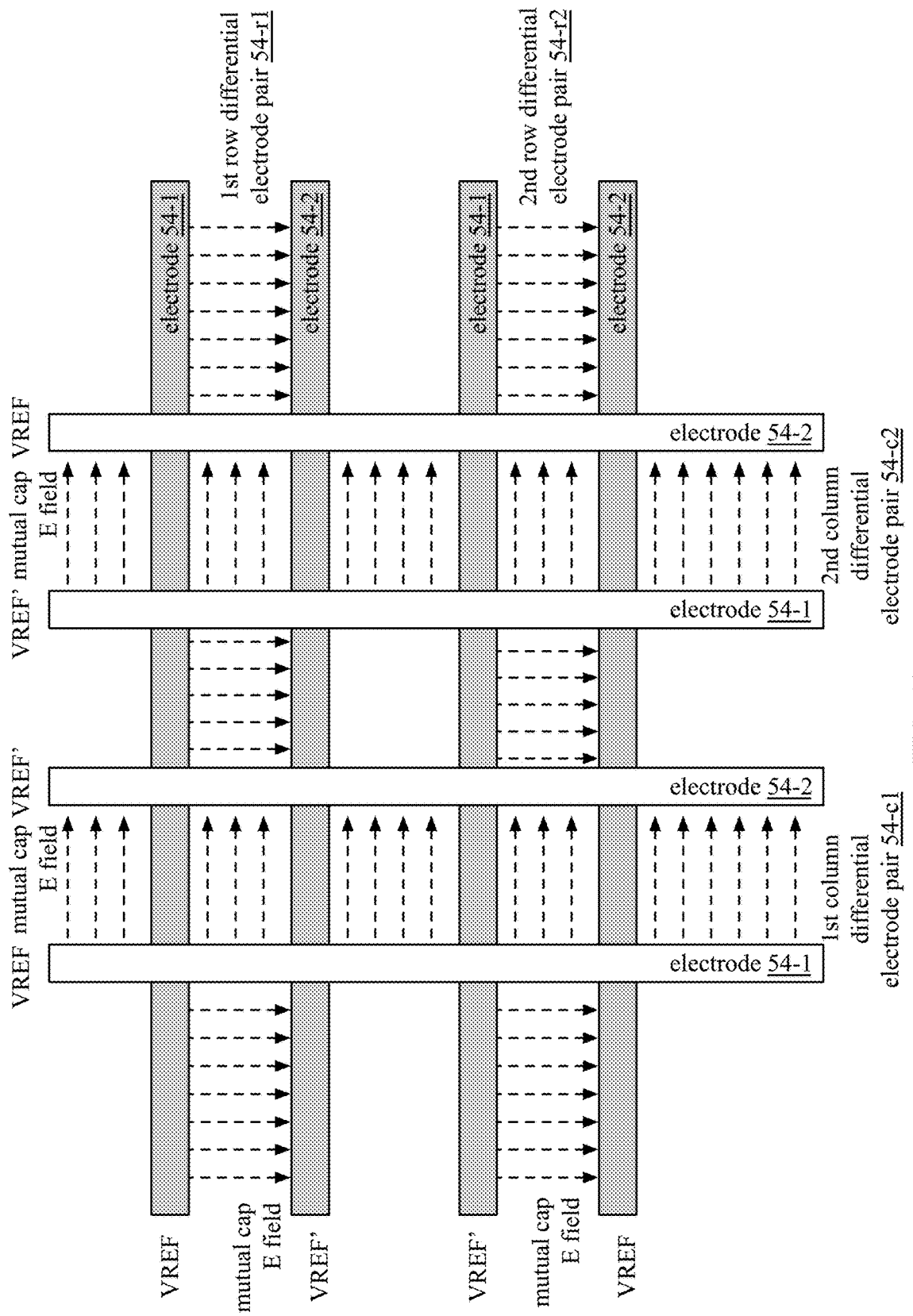
FIGS. 11A-11B are schematic block diagrams of examples of mutual capacitance electric fields of differential electrode pairs.
Figure 11B:
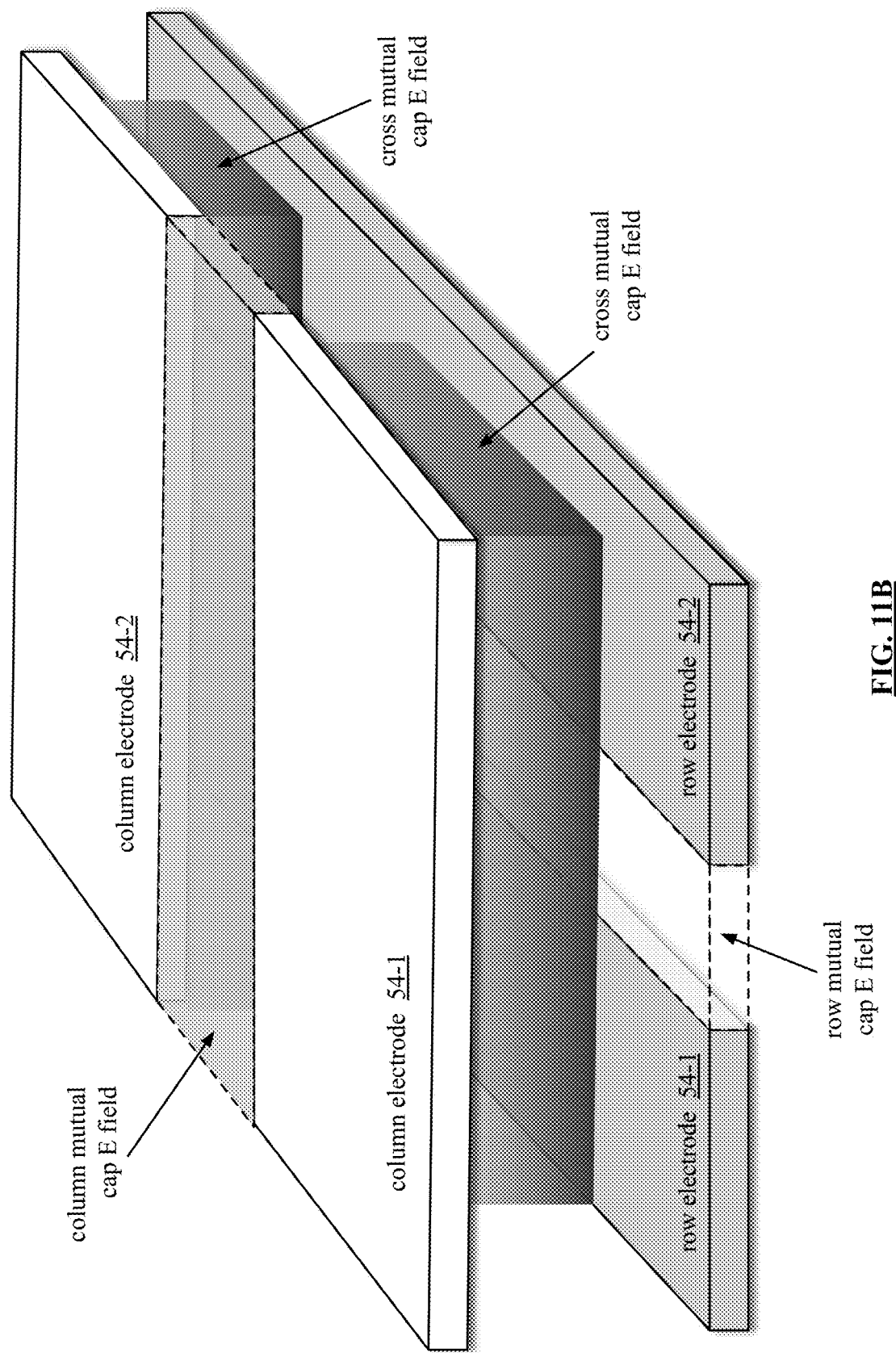

FIGS. 11A-11B are schematic block diagrams of examples of mutual capacitance electric fields of differential electrode pairs. A mutual capacitance is generated between electrodes due to capacitive coupling. FIG. 11A depicts mutual capacitance electrical fields that exist between each differential electrode pair (e.g., "pair" mutual capacitance). A first electrode of a differential electrode pair is provided an analog reference signal (VREF) and a second electrode of the differential electrode pair is provided a phase-shifted analog reference signal (VREF'). The differential electrode pairs are positioned such that electrodes having in-phase reference signals are next to each other to eliminate cross-coupling between the row and column differential electrode pairs. As depicted in FIG. 11A, the pair mutual capacitance electrical fields are substantially kept between each differential electrode pair.

FIG. 11B depicts mutual capacitance electrical fields that exist between a column differential electrode pair 54-*c* and a row differential electrode pair 54-*r* (e.g., "cross" mutual capacitance) as well as the pair mutual capacitance electrical fields of the column differential electrode pair 54-*c* and the row differential electrode pair 54-*r*. Because electrodes of a differential electrode pairs can be spaced closely together, the pair mutual capacitance is likely greater than a cross mutual capacitance.

Figure 12:
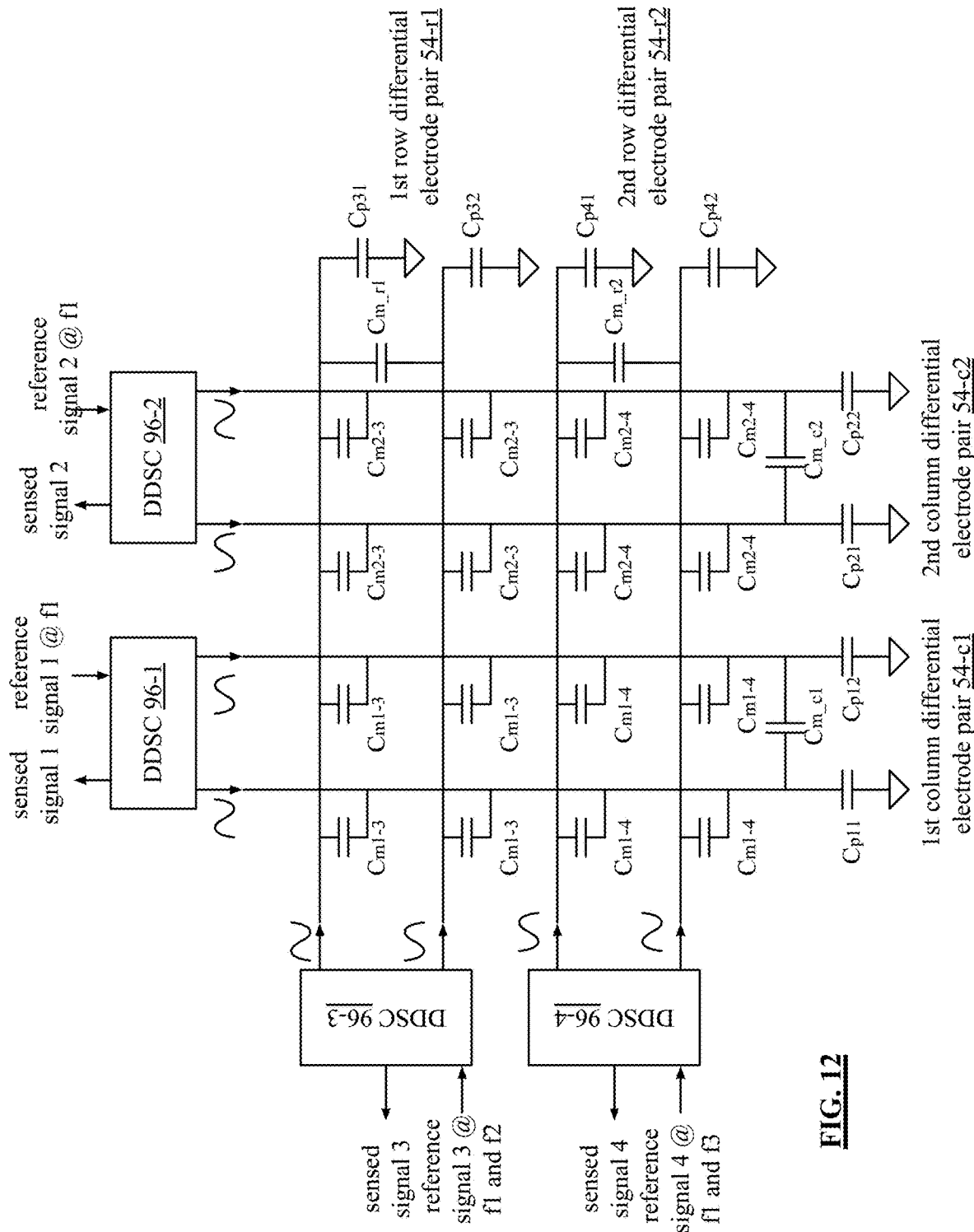
FIG. 12 is a schematic block diagram of an embodiment of a portion of a differential touch screen display.

FIG. 12 is a schematic block diagram of an embodiment of a portion of a differential touch screen display that includes differential drive-sense circuits (DDSCs) 96-1 through 96-4, a first column differential electrode pair 54-*c*1, a second column differential electrode pair 54-*c*2, a first row differential electrode pair 54-*r*1, and a second row differential electrode pair 54-*r*2. The DDSCs 96-1 through 96-4 each operate similarly to the DDSC of FIG. 10 (e.g., including the ADC at the output) to provide differential electrode signals based on reference signals 1-4 (e.g., VREF) to the differential electrode pairs and generate sensed signals 1-4 representative of impedance changes of the differential electrode pairs.

As an example, a reference signal 1 (e.g., analog or digital) is provided to the DDSC 96-1, a reference signal 2 (e.g., analog or digital) is provided to the DDSC 96-2, a reference signal 3 (e.g., analog or digital) is provided to the DDSC 96-3, and a reference signal 4 (e.g., analog or digital) is provided to the DDSC 96-4. The reference signal 1 includes a DC component and/or an oscillating at frequency $f_1$, the reference signal 2 includes a DC component and/or an oscillating at frequency $f_1$, the reference signal 3 includes a DC component and/or two oscillating components: the first at frequency $f_1$ and the second at frequency $f_2$, and the reference signal 4 includes a DC component and/or two oscillating components: the first at frequency $f_1$ and a third frequency at frequency $f_3$.

The DDSC 96-1 generates a differential electrode signal based on the reference signal 1 and provides the differential electrode signal to a first column differential electrode pair 54-*c*1. The DDSC 96-2 generates a differential electrode signal based on the reference signal 2 and provides the differential electrode signal to a second column differential electrode pair 54-*c*2. The DDSC 96-3 generates a differential electrode signal based on the reference signal 3 and provides the differential electrode signal to a first row differential electrode pair 54-*r*1. The DDSC 96-4 generates an electrode signal based on the reference signal 4 and provides the electrode signal to a second column differential electrode pair 54-*r*2.

In response to the differential electrode signals being applied to the differential electrode pairs, the DDSC 96-1 generates a sensed signal 1, which includes a component at frequency $f_1$, a component a frequency $f_2$, and a component a frequency $f_3$. The component at frequency $f_1$ corresponds to the self capacitance of the first column differential electrode pair 54-*c*1 (e.g., a combination of capacitances $C_{p11}$ and $C_{p12}$), the component at frequency $f_2$ corresponds to the mutual capacitance between the first row differential electrode pair 54-*r*1 and first column differential electrode pair 54-*c*1 (e.g., a parallel combination of 4 capacitances $C_{p1-3}$), and the component at frequency $f_3$ corresponds to the mutual capacitance between the second row differential electrode pair 54-*r*2 and first column differential electrode pair 54-*c*1 (e.g., a parallel combination of 4 capacitances $C_{p1-4}$).

In response to the electrode signals being applied to the differential electrode pairs, the DDSC 96-2 generates a sensed signal 2, which includes a component at frequency $f_1$, a component a frequency $f_2$, and a component a frequency $f_3$. The component at frequency $f_1$ corresponds to the self capacitance of the second column differential electrode pair 54-*c*2 (e.g., a combination of capacitances $C_{p21}$ and $C_{p22}$), the component at frequency $f_2$ corresponds to the mutual capacitance between the first row differential electrode pair 54-*r*1 and second column differential electrode pair 54-*c*2 (e.g., a parallel combination of 4 capacitances $C_{p2-3}$), and the component at frequency $f_3$ corresponds to the mutual capacitance between the second row differential electrode pair 54-*r*2 and second column differential electrode pair 54-*c*2 (e.g., a parallel combination of 4 capacitances $C_{p2-4}$).

In response to the electrode signals being applied to the differential electrode pairs, the DDSC 96-3 generates the sensed signal 3, which includes a component at frequency $f_1$, a component a frequency $f_2$, and a component a frequency $f_3$. The component at frequency $f_1$ corresponds to a shielded self capacitance of the first row differential electrode pair 54-*r*1 (e.g., a combination of capacitances $C_{p31}$ and $C_{p32}$), the component at frequency $f_2$ corresponds to an unshielded self capacitance of the first row differential electrode pair 54-*r*1, and the component at frequency $f_3$ corresponds to an unshielded self capacitance of the first row differential electrode pair 54-*r*1. Because cross mutual capacitance of the first row differential electrode pair 54-*r*1 and the first and second column differential electrode pairs is detected in sensed signals 1 and 2, only the self capacitance of the first row differential electrode pair 54-*r*1 is needed.

In response to the electrode signals being applied to the differential electrode pairs, the DDSC 96-4 generates the sensed signal 4, which includes a component at frequency $f_1$, a component a frequency $f_2$, and a component a frequency $f_3$. The component at frequency $f_1$ corresponds to a shielded self capacitance of the second row differential electrode pair 54-*r*2 (e.g., a combination of capacitances $C_{p41}$ and $C_{p42}$), the component at frequency $f_2$ corresponds to an unshielded self capacitance of the second row differential electrode pair 54-*r*2, and the component at frequency $f_3$ corresponds to an unshielded self capacitance of the second row differential electrode pair 54-*r*2. Because cross mutual capacitance of the second row differential electrode pair 54-*r*1 and the first and second column differential electrode pairs is detected in sensed signals 1 and 2, only the self capacitance of the second row differential electrode pair 54-*r*2 is needed.

With the DDSCs 96-3 and 96-4 transmitting the second and third frequency components, they have a second and third frequency component in their sensed signals but they are primarily based on the each differential row electrode pair's self capacitance with some cross coupling from other electrodes carrying signals at different frequencies.

Each active differential drive-sense circuit uses the same frequency for self capacitance (e.g., $f_1$), such that the differential electrode pairs are at the same potential, which substantially eliminates cross-coupling between the differential electrode pairs. Further, the differential signaling and the positioning of electrodes having in-phase reference signals next to each other eliminates cross-coupling between the differential electrode pairs. Because self capacitance is greater than mutual capacitance, cross coupling of mutual capacitance with self capacitance is insignificant.

The pair mutual capacitances shown (e.g., $C_{m\_c1}$, $C_{m\_c2}$, $C_{m\_r1}$, and $C_{m\_r2}$) are not detected in this example because self capacitance of a differential electrode pair is much greater than pair mutual capacitance. The cross mutual capacitances and self capacitances provide enough data to detect touches and hovers. Detection of pair mutual capacitances in order to improve and/or enable touch and/or hover detection will be discussed with reference to one or more of the following Figures.

Figure 13A:
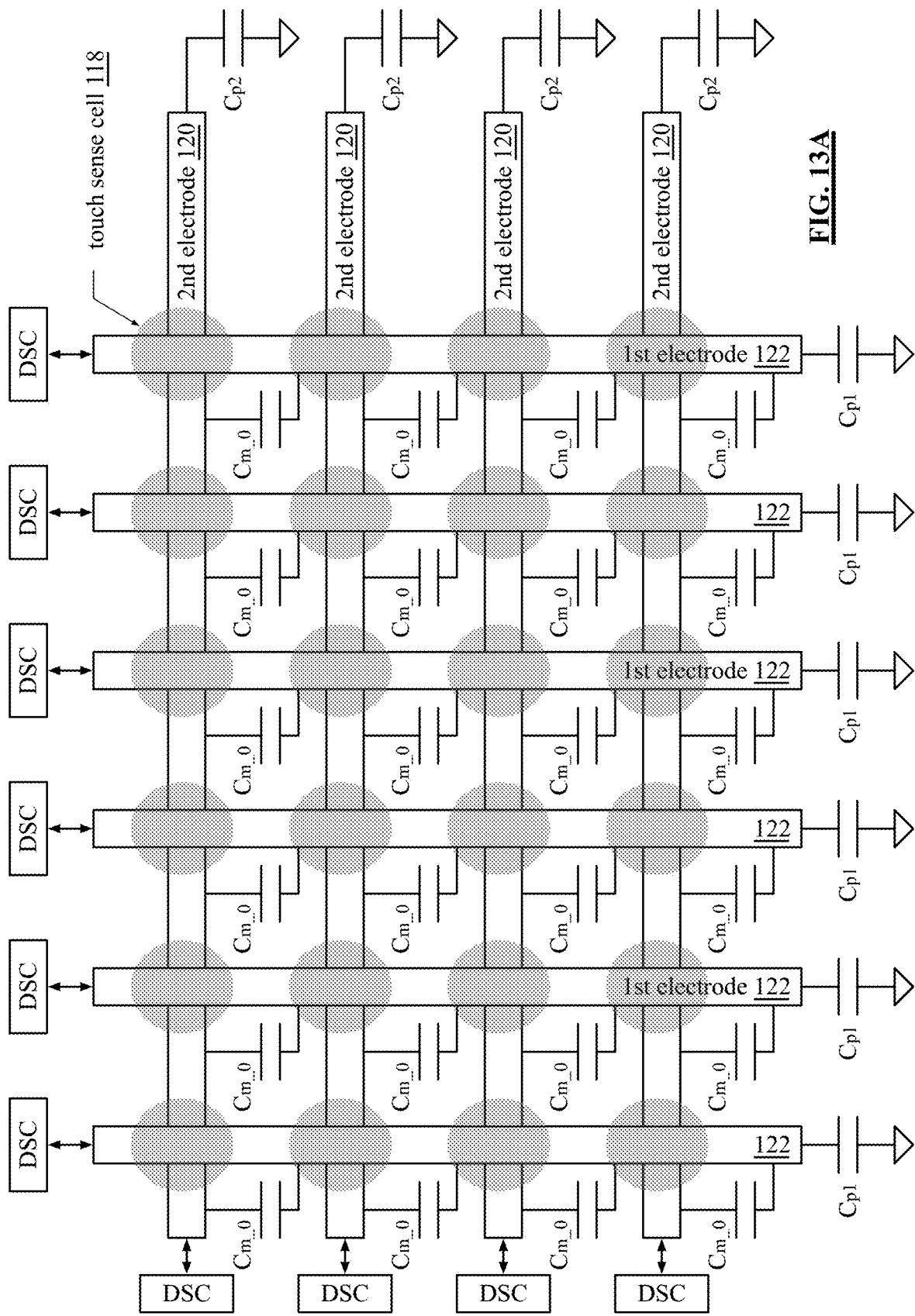
FIGS. 13A-13B are schematic block diagrams of embodiments of a plurality of electrodes creating a plurality of touch sense cells within a touch screen display.
Figure 13B:
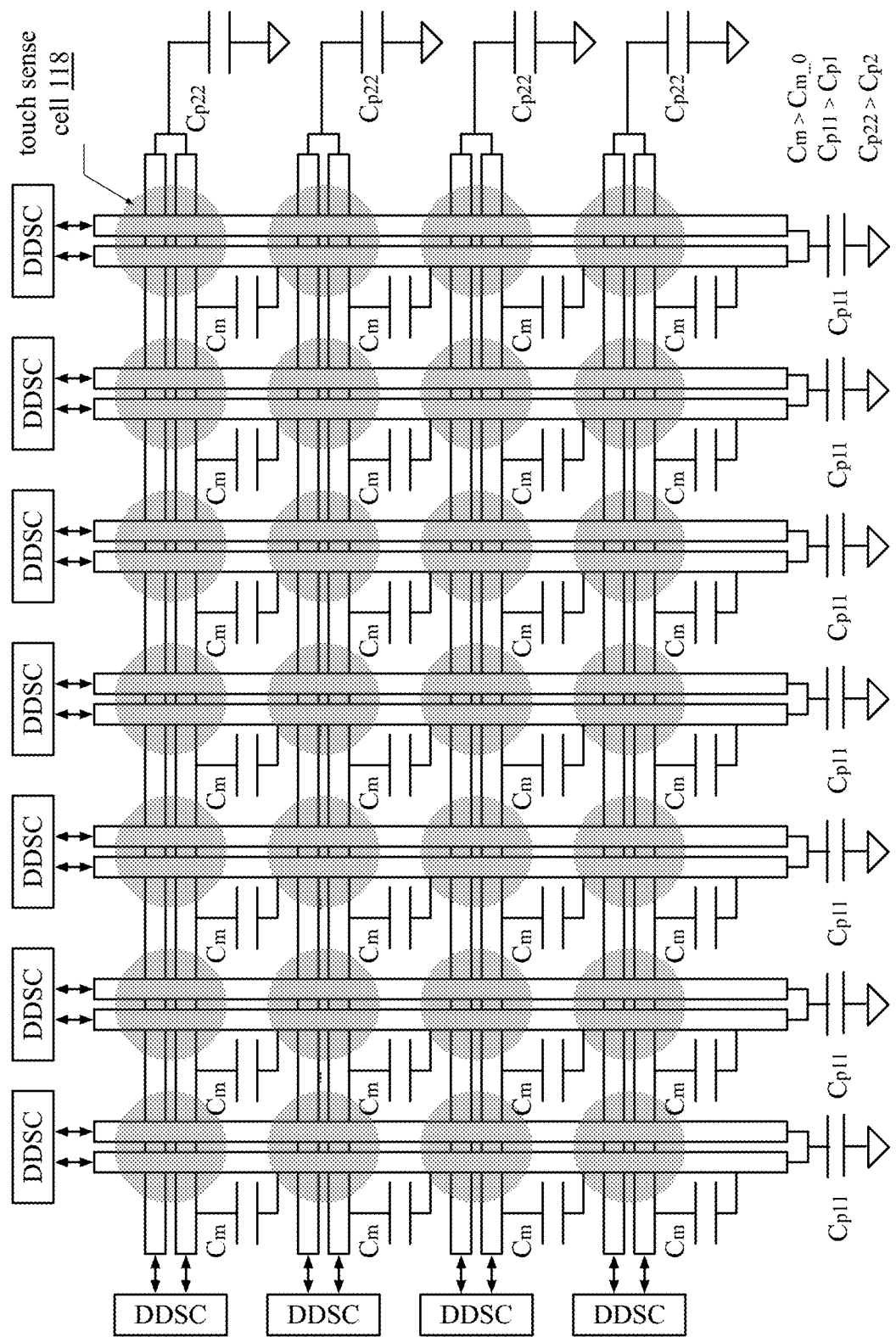

FIGS. 13A-13B are schematic block diagrams of embodiments of a plurality of electrodes creating a plurality of touch sense cells 118 within a touch screen display. In FIG. 13A, a plurality of second electrodes 120 are perpendicular and on a different layer of the display than a plurality of first electrodes 122. For each crossing of a first electrode and a second electrode, a touch sense cell 118 is created. At each touch sense cell 118, a mutual capacitance ($C_{m\_0}$) is created between the crossing electrodes. Each second electrode also includes a self capacitance ($C_{p2}$) and each first electrode also includes a self capacitance ($C_{p1}$) which are shown as single parasitic capacitances, but, in some instances, are distributed R-C circuits.

A drive-sense circuit (DSC) is coupled to a corresponding one of the electrodes. The drive-sense circuits (DSC) provides electrode signals to the electrodes and determines the loading on the electrode signals of the electrodes. When no touch is present, each touch cell 138 will have a similar mutual capacitance and each electrode of a similar length will have a similar self capacitance. When a touch is applied on or near a touch sense cell 118, the mutual capacitance of the cell will decrease (creating an increased impedance) and the self capacitances of the electrodes creating the touch sense cell will increase (creating a decreased impedance). Between these impedance changes, the processing module can detect the location of a touch, or touches.

In FIG. 13B, a plurality of second differential electrode pairs is perpendicular and on a different layer of the display than a plurality of first differential electrode pairs. For each crossing of a first differential electrode pair and a second differential electrode pair, a touch sense cell 118 is created. At each touch sense cell 118, a mutual capacitance ($C_m$) is created between the crossing electrodes. In comparison to FIG. 13A, the mutual capacitance $C_m$ is greater than the mutual capacitance $C_{m\_0}$ due to the additional row and column crossings. Therefore, in FIG. 13B, mutual capacitance change detection is more sensitive than in FIG. 13A.

Each second differential electrode pair also includes a self capacitance ($C_{p22}$) and each first differential electrode pair also includes a self capacitance ($C_{p11}$) which are shown as single parasitic capacitances, but, in some instances, are distributed R-C circuits. In comparison to FIG. 13A, the self capacitance $C_{p22}$ is greater than the self capacitance $C_{p2}$ and the self capacitance $C_{p11}$ is greater than the self capacitance $C_{p1}$ due to the additional electrodes. Therefore, in FIG. 13B, self capacitance change detection is more sensitive than in FIG. 13A.

A differential drive-sense circuit (DDSC) is coupled to a corresponding one of the differential electrode pairs. The differential drive-sense circuit (DDSC) provides electrode signals to the differential electrode pairs and determines the loading on the electrode signals of the differential electrode pairs. When no touch is present, each touch cell 118 will have a similar mutual capacitance and each differential electrode pair of a similar length will have a similar self capacitance. When a touch is applied on or near a touch sense cell 118, the mutual capacitance of the cell will decrease (creating an increased impedance) and the self capacitances of the differential electrode pairs creating the touch sense cell will increase (creating a decreased impedance). Between these impedance changes, the processing module can detect the location of a touch, or touches.

FIGS. 14A-14D are schematic block diagrams of embodiments of touch screen electrode patterns that include row differential electrode pairs 54-$r$ and column differential electrode pairs 54-$c$. Each row differential electrode pair 54-$r$ and each column differential electrode pair 54-$r$ includes a plurality of individual conductive cells (e.g., capacitive sense plates) (e.g., white cells for columns, gray cells for rows) that are electrically coupled together. The size of a cell depends on the desired resolution of touch sensing. For example, a cell size may be 1 millimeter by 1 millimeter to 5 millimeters by 5 millimeters to provide adequate touch sensing for cell phones and tablets. Making the cells smaller improves touch resolution and will typically reduce touch sensor errors (e.g., touching a "w" by an "e" is displayed).

Mutual capacitance is generated between a differential pair of electrodes and at a crossing of a row and column differential pair of electrodes. Therefore, a differential electrode pair configuration has increased mutual capacitance in comparison to a single electrode configuration (e.g., where mutual capacitance is generated between a row and column electrode). Various cell shapes, patterns, and dielectric materials can be used to further increase mutual capacitance of differential electrode pair configurations. Based on the capacitance equation C=εA/d, where ε is a dielectric constant, A is the area of a plate, and d is the distance between the plates, the cells for a differential pair of electrodes should be as close as possible (e.g., decrease d) and have as large of an area as possible and practical (e.g., increase A) to increase mutual capacitance. Further, the cross sections of row differential pairs of electrodes and column differential pairs of electrodes should be as close as possible (e.g., decrease d) and have as large of an area as possible and practical (e.g., increase A) to increase mutual capacitance. A dielectric material with a higher dielectric constant could also be used between the differential pairs and the cross sections of rows and columns to increase mutual capacitance.

Figure 14A:
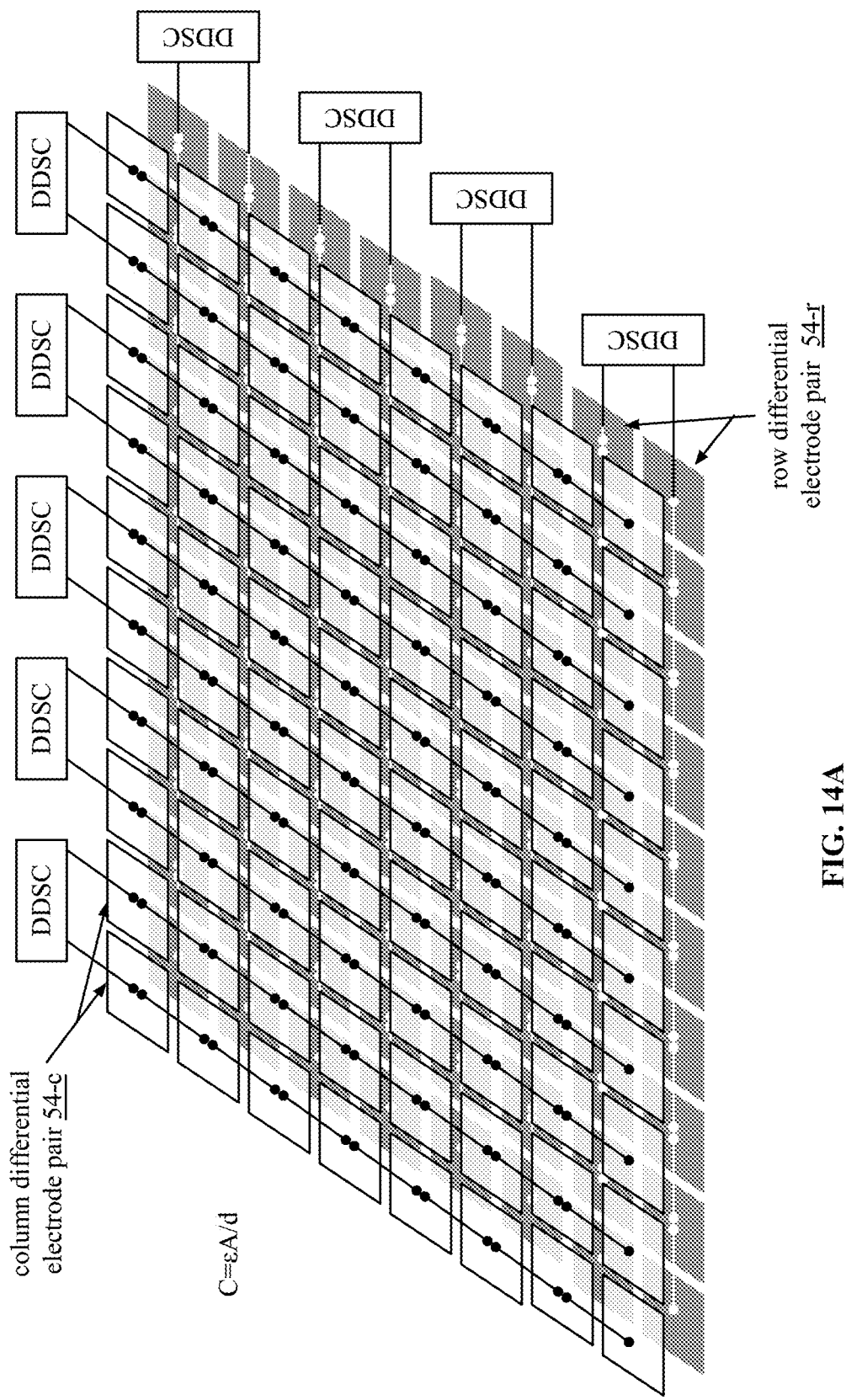
FIGS. 14A-14D are schematic block diagrams of embodiments of touch screen electrode patterns.

The cells for the row and column differential electrode pairs may be on the same layer or on different layers. In FIG. 14A, the cells for the row and column differential electrode pairs are shown on different layers where each row and column differential electrode pair is coupled to a differential drive-sense circuit (DDSC). While the cells are shown to be square, they may be of any polygonal shape, diamond, or circular shape. With the cells for the row and column differential electrode pairs on different layers, a square or rectangular shape allows the differential electrode pairs to be close together and have as large of an area as required for enhanced mutual capacitance. Further, a dielectric material could be used between the layers to increase mutual capacitance between the row and column differential electrode pairs.

Figure 14B:
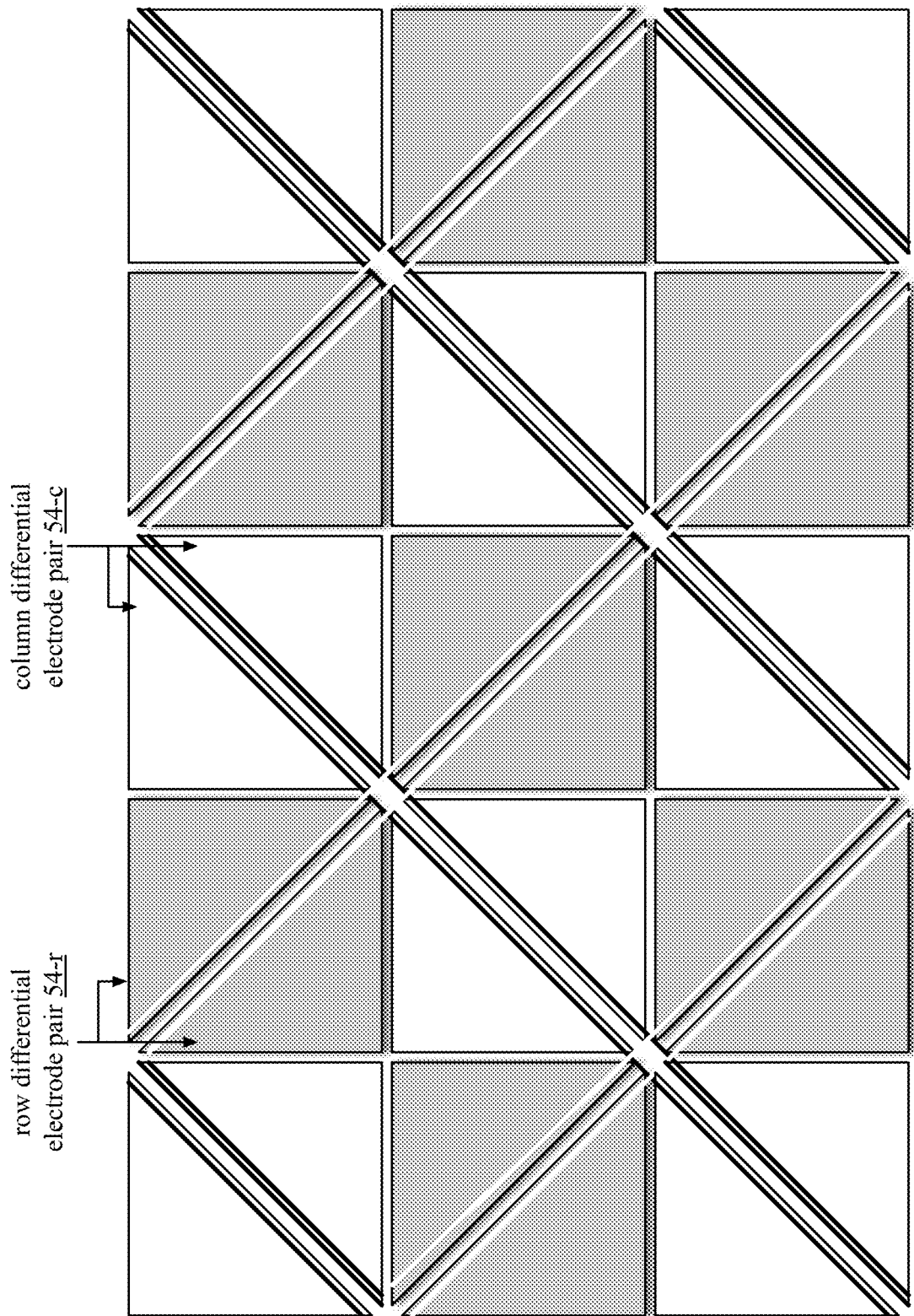
Figure 14C:
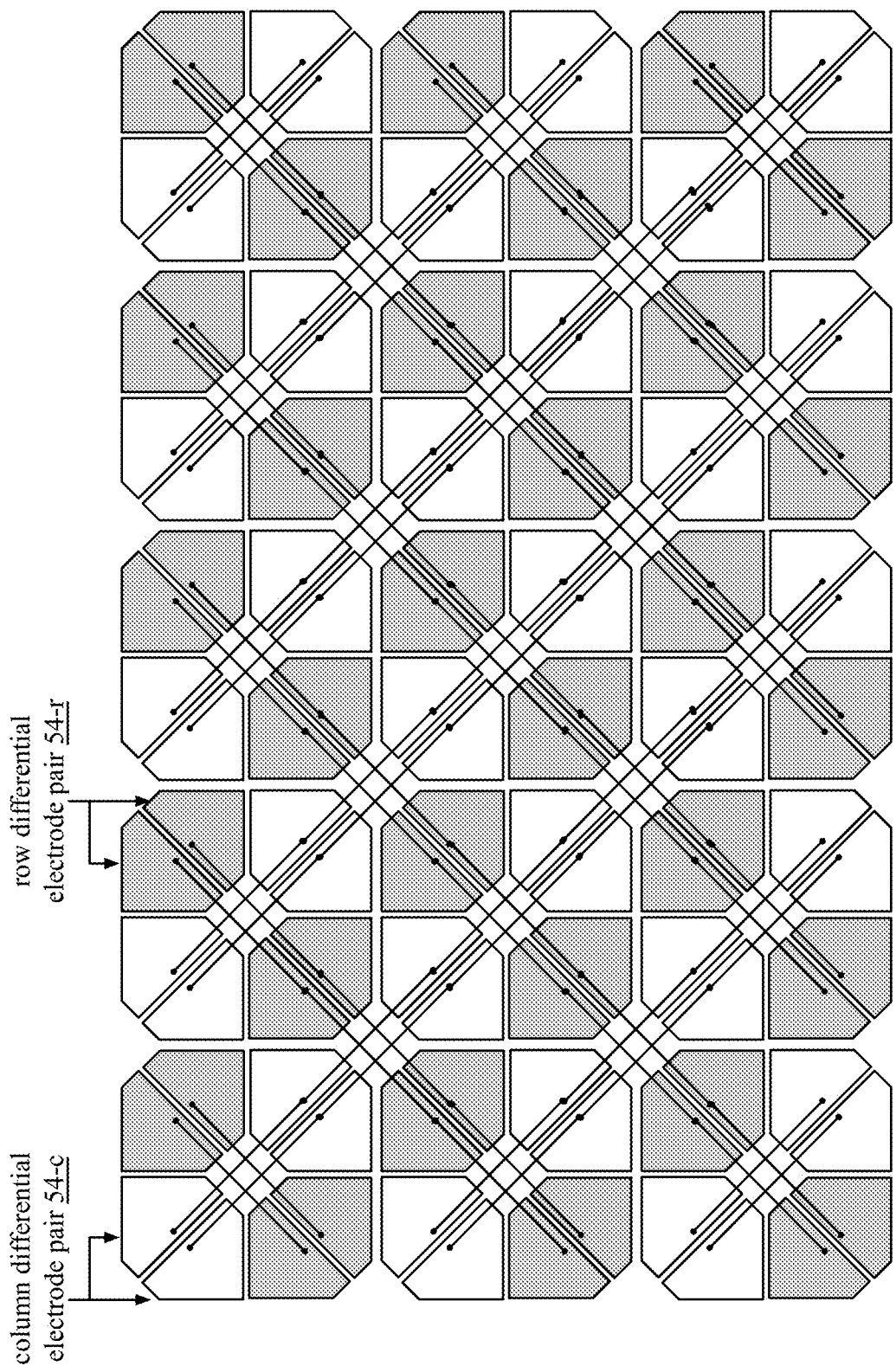
Figure 14D:
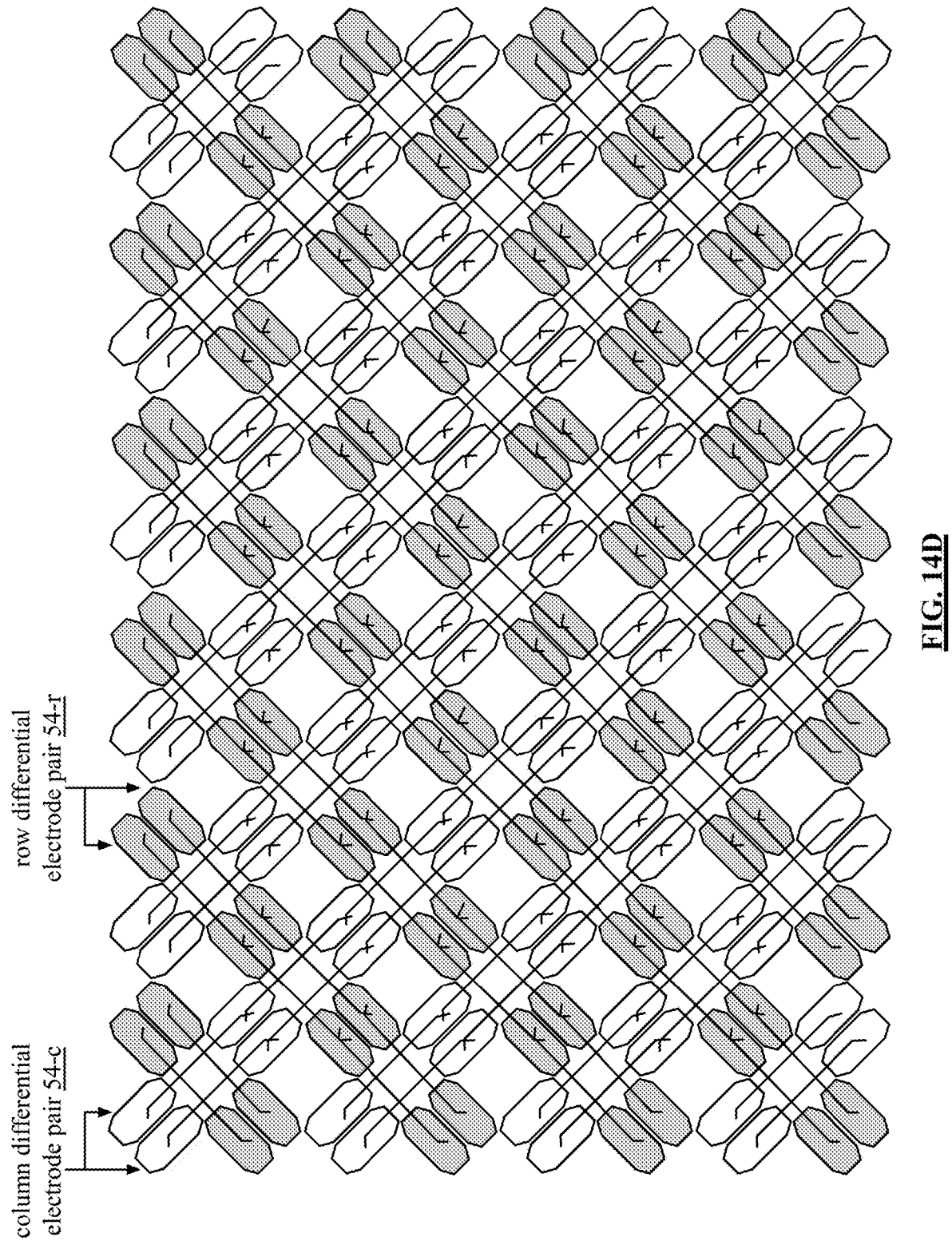

In FIGS. 14B-14D, the cells for row and column differential electrode pairs are shown on the same layer. The electric coupling between the cells is done using vias and running traces (e.g., wire traces) on another layer. Note that the cells may be on one or more ITO layers of a touch screen, which includes a touch screen display. With the cells for the row and column differential electrode pairs on the same layer, the position, pattern, size, and shape of differential electrode pairs should be considered in order to increase mutual capacitance and not to interfere with the benefits that differential electrode pairs provide (e.g., decreased noise and increased sensing sensitivity). For example, one electrode of a differential electrode pair should not be placed too far from the other electrode of the differential electrode pair or be separated by an electrode of a different differential electrode pair.

FIGS. 14B-14D depict various cell shapes and electrode patterns that could be used for the row and column differential electrode pairs on a single layer. For example, in FIG. 14B one electrode of a differential electrode pair includes electrically coupled half squares (e.g., right triangles) and the other electrode of the differential electrode pair includes electrically coupled half squares such that the two sets of half squares form a separated square. Mutual capacitance is generated between the half squares of a differential electrode pair and wherever a row differential electrode pair and a column differential electrode pair intersect.

FIG. 14C is similar to FIG. 14B except that the half squares have clipped corners to increase the area at a row and column cross sections which may increase mutual capacitance. In FIG. 14D, the cells have an elongated octagonal shape to increase the area at a row and column cross section. Other cell shapes and electrode patterns are possible. Further, a dielectric material could be used between the differential electrode pairs to increase mutual capacitance.

Figure 15:
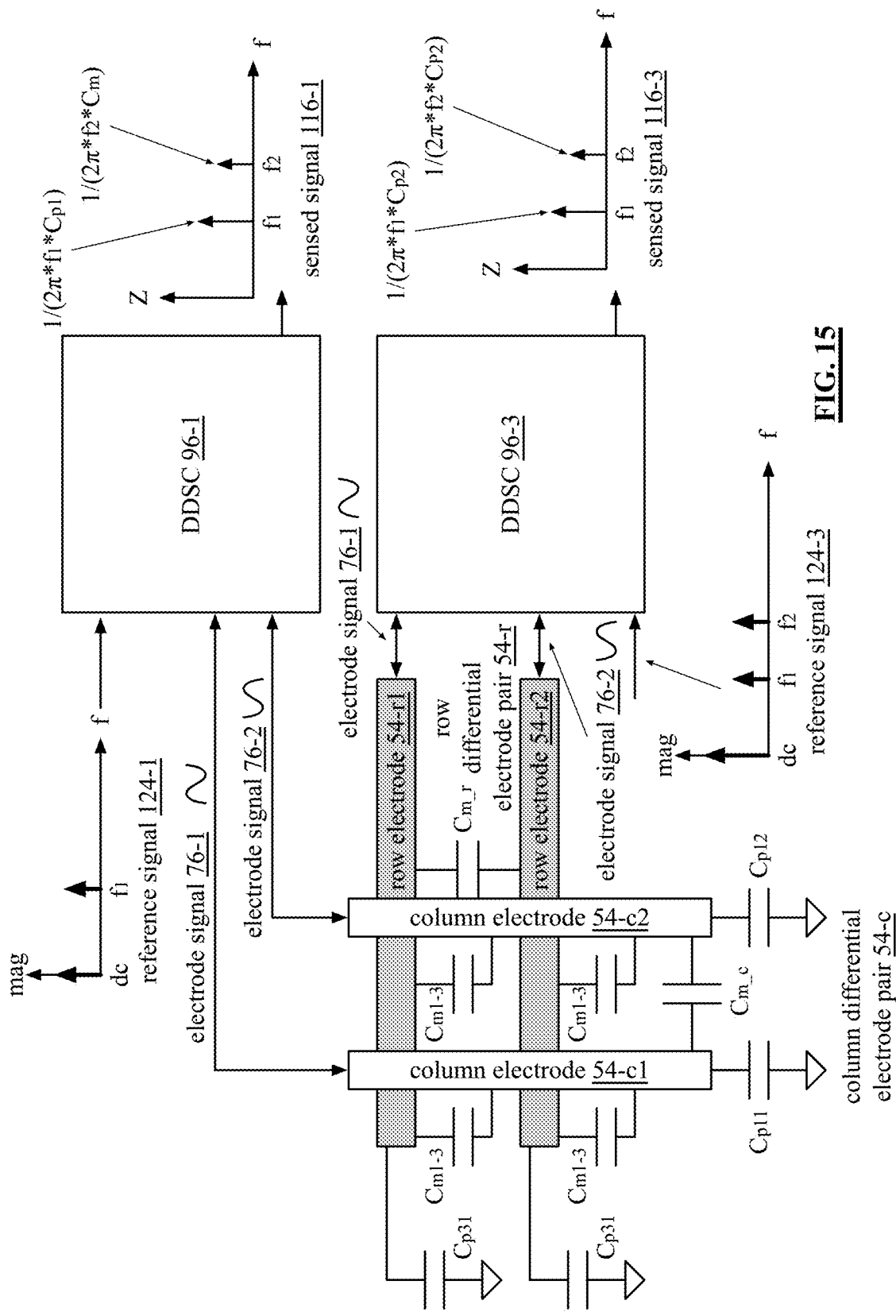
FIG. 15 is a schematic block diagram of an example of a first differential drive-sense circuit (DDSC) coupled to a column differential pair of electrodes and a third differential drive-sense circuit (DDSC) coupled to a row differential pair of electrodes.

FIG. 15 is a schematic block diagram of an example of a first differential drive-sense circuit (DDSC) 96-1 coupled to a column differential electrode pair 54-c and a third differential drive-sense circuit (DDSC) 96-3 coupled to a row differential electrode pair 54-r without a touch proximal to the electrodes. Each of the differential drive-sense circuits operate similarly to the DDSC of FIGS. 9 and 10.

As an example, a first reference signal 124-1 (e.g., VREF) is provided to the first differential drive-sense circuit 96-1 and a third reference signal 124-3 is provided to the third differential drive-sense circuit 96-3. The first reference signal includes a DC component and/or an oscillating at frequency $f_1$. The third reference signal includes a DC component and/or two oscillating components: the first at frequency $f_1$ and the second at frequency $f_2$.

The first differential drive-sense circuit 96-1 generates a differential electrode signal (e.g., first and second electrode signals 76-1 and 76-2) based on the reference signal 124-1 and provides the electrode signal 76-1 to the first column electrode 54-c1 of the column differential electrode pair 54-c and provides the electrode signal 76-2 to the second column electrode 54-c2 of the column differential electrode pair 54-c. The third differential drive-sense circuit 96-3 generates a differential electrode signal (e.g., first and second electrode signals 76-1 and 76-2) based on the reference signal 124-3 and provides the electrode signal 76-1 to the first row electrode 54-r1 of the row differential electrode pair 54-r and provides the electrode signal 76-2 to the second row electrode 54-r2 of the row differential electrode pair 54-r.

In response to the differential electrode signals being applied to the electrodes, the first differential drive-sense circuit 96-1 generates a first sensed signal 116-1, which includes a component at frequency $f_1$ and a component a frequency $f_2$. The component at frequency $f_1$ corresponds to the self capacitance of the column differential electrode pair 54-c and the component a frequency $f_2$ corresponds to the mutual capacitance between the row and column differential electrode pairs 54-c and 54-r. The self capacitance is expressed as $1/(2\pi f_1 C_{p1})$ and the mutual capacitance is expressed as $1/(2\pi f_2 C_m)$ where $C_{p1}$ is a combination of $C_{p11}$ and $C_{p12}$ and $C_m$ is a combination of four cross mutual capacitances at $C_{m1-3}$.

Also, in response to the electrode signals being applied to the electrodes, the third differential drive-sense circuit 96-3 generates a third sensed signal 116-3, which includes a component at frequency $f_1$ and a component at frequency $f_2$. The component at frequency $f_1$ corresponds to a shielded self capacitance of the row differential electrode pair 54-r and the component a frequency $f_2$ corresponds to an unshielded self capacitance of the row differential electrode pair 54-r. The shielded self capacitance of the row differential electrode pair is expressed as $1/(2\pi f_1 C_{p2})$ and the unshielded self capacitance of the row differential electrode pair is expressed as $1/(2\pi f_2 C_{p2})$ where $C_{p2}$ is a combination of capacitances $C_{p21}$ and $C_{p22}$.

With each active differential drive-sense circuit using the same frequency for self capacitance (e.g., $f_1$), the row and column differential electrode pairs are at the same potential, which substantially eliminates cross-coupling between the row and column differential electrode pairs. This provides a shielded (i.e., low noise) self capacitance measurement for the active differential drive-sense circuits. In this example, with the third differential drive-sense circuit transmitting the second frequency component, it has a second frequency component in its sensed signal but is primarily based on the row differential electrode pair's self capacitance with some cross coupling from other electrodes carrying signals at different frequencies. The cross coupling of signals at other frequencies injects unwanted noise into this self capacitance measurement and hence it is referred to as unshielded.

Figure 15A:
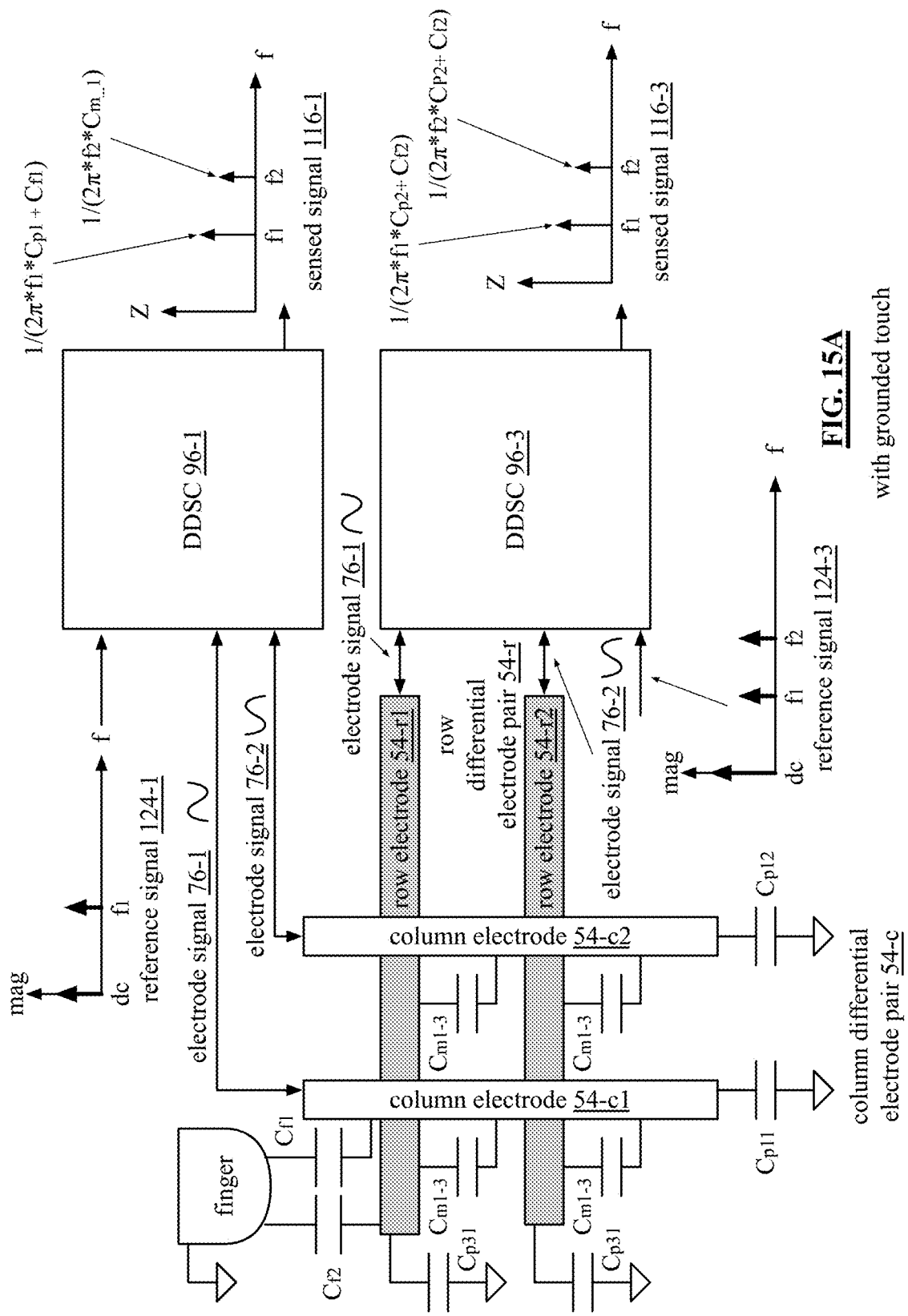
FIG. 15A is a schematic block diagram of another example of a first differential drive-sense circuit (DDSC) coupled to a column differential pair of electrodes and a third differential drive-sense circuit (DDSC) coupled to a row differential pair of electrodes.

FIG. 15A is a schematic block diagram of an example of a first differential drive sense circuit 96-1 coupled to a column differential electrode pair 54-c and a third differential drive sense circuit 96-3 coupled to a row differential electrode pair 54-r with a grounded touch proximal to the electrodes. The example of FIG. 15A is similar to the example of FIG. 15 with the difference being the grounded touch proximal to the differential electrode pairs (e.g., a touch that shadows the intersection of the differential electrode pairs or is physically close to the intersection of the differential electrode pairs). With the grounded touch (e.g., a finger touch, etc.), the self-capacitance and the mutual capacitance of the electrodes are changed.

In this example, the impedance of the self-capacitance at $f_1$ of the column differential electrode pair 54-c now includes the effect of the finger capacitance. As such, the impedance of the self-capacitance of the column differential electrode pair 54-c equals $1/(2\pi f_1*(C_{p1}+C_{f1}))$, which is included the sensed signal 116-1. The second frequency component at $f_2$ corresponds to the impedance of the mutual capacitance at $f_2$, which includes the effect of the finger capacitance. As such, the impedance of the mutual capacitance equals $1/(2\pi f_2 C_{m\_1})$, where $C_{m\_1}=(C_m*C_{f1})/(C_m+C_{f1})$.

Continuing with this example, the first frequency component at $f_1$ of the third sensed signal 116-3 corresponds to the impedance of the shielded self-capacitance of the row differential electrode pair 54-r at $f_1$, which is affected by the finger capacitance. As such, the impedance of the capacitance of the row differential electrode pair 54-r equals $1/(2\pi f_1 * (C_{p2} + C_{f2}))$. The second frequency component at $f_2$ of the third sensed signal 116-3 corresponds to the impedance of the unshielded self-capacitance at $f_2$, which includes the effect of the finger capacitance and is equal to $1/(2\pi f_2 * (C_{p2} + C_{f2}))$.

Figure 15B:
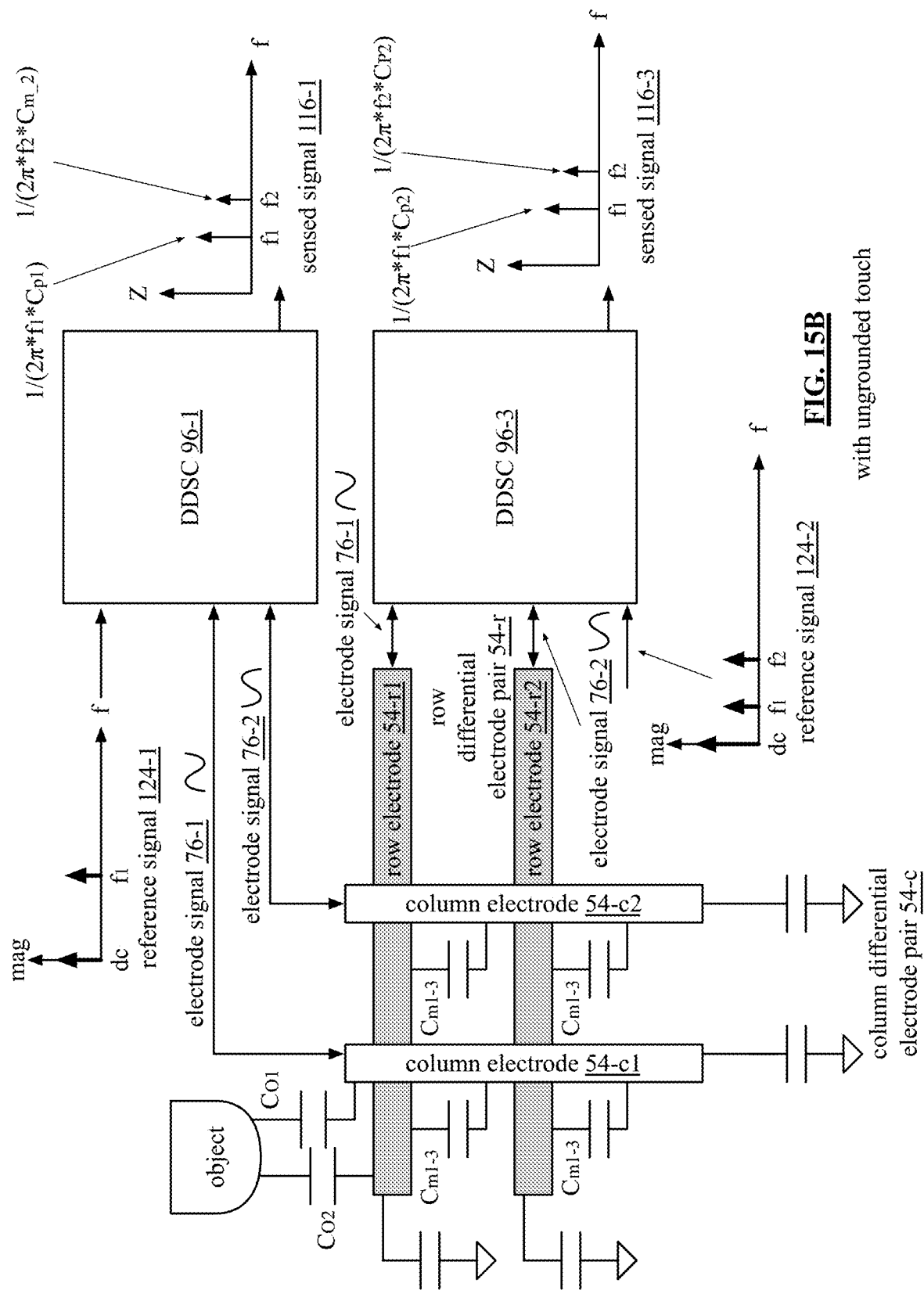
FIG. 15B is a schematic block diagram of another example of a first differential drive-sense circuit (DDSC) coupled to a column differential pair of electrodes and a third differential drive-sense circuit (DDSC) coupled to a row differential pair of electrodes.

FIG. 15B is a schematic block diagram of an example of a first differential drive sense circuit 96-1 coupled to a column differential electrode pair 54-c and a third differential drive sense circuit 96-3 coupled to a row differential electrode pair 54-r with an ungrounded touch proximal to the electrodes. The example of FIG. 15B is similar to the example of FIG. 15 with the difference being the ungrounded touch proximal to the differential electrode pairs (e.g., a touch that shadows the intersection of the differential electrode pairs or is physically close to the intersection of the differential electrode pairs). With the ungrounded touch (e.g., an ungrounded object), only mutual capacitance of the electrode pairs is changed. With greater mutual capacitance change sensitivity, the differential drive-sense circuits are better at detecting ungrounded objects than drive-sense circuits.

In this example, the impedance of the self-capacitance at $f_1$ of the column differential electrode pair 54-c remains substantially unchanged due to the ungrounded object. As such, the impedance of the self-capacitance of the column differential electrode pair 54-c equals $1/(2\pi f_1 * (C_{p1}))$, which is included the sensed signal 116-1. The second frequency component at $f_2$ corresponds to the impedance of the mutual capacitance at $f_2$, which includes the effect of the ungrounded object capacitance. As such, the impedance of the mutual capacitance equals $1/(2\pi f_2 C_{m\_2})$, where $C_{m\_2} = (C_m * C_{O1})/(C_m + C_{O1})$.

Continuing with this example, the first frequency component at $f_1$ of the third sensed signal 116-3 corresponds to the impedance of the shielded self-capacitance of the row differential electrode pair 54-r at f1, which remains substantially unchanged by the ungrounded object capacitance. As such, the impedance of the capacitance of the row differential electrode pair 54-r equals $1/(2\pi f_1 * C_{p2})$. The second frequency component at $f_2$ of the third sensed signal 116-3 corresponds to the impedance of the unshielded self-capacitance at $f_2$, which remains substantially unchanged by the ungrounded object capacitance and is equal to $1/(2\pi f_2 * (C_{p2}))$. In another embodiment, any small changes detected in the self capacitance measurements could be attributable to pair mutual capacitances when detecting an ungrounded object.

Figure 16:
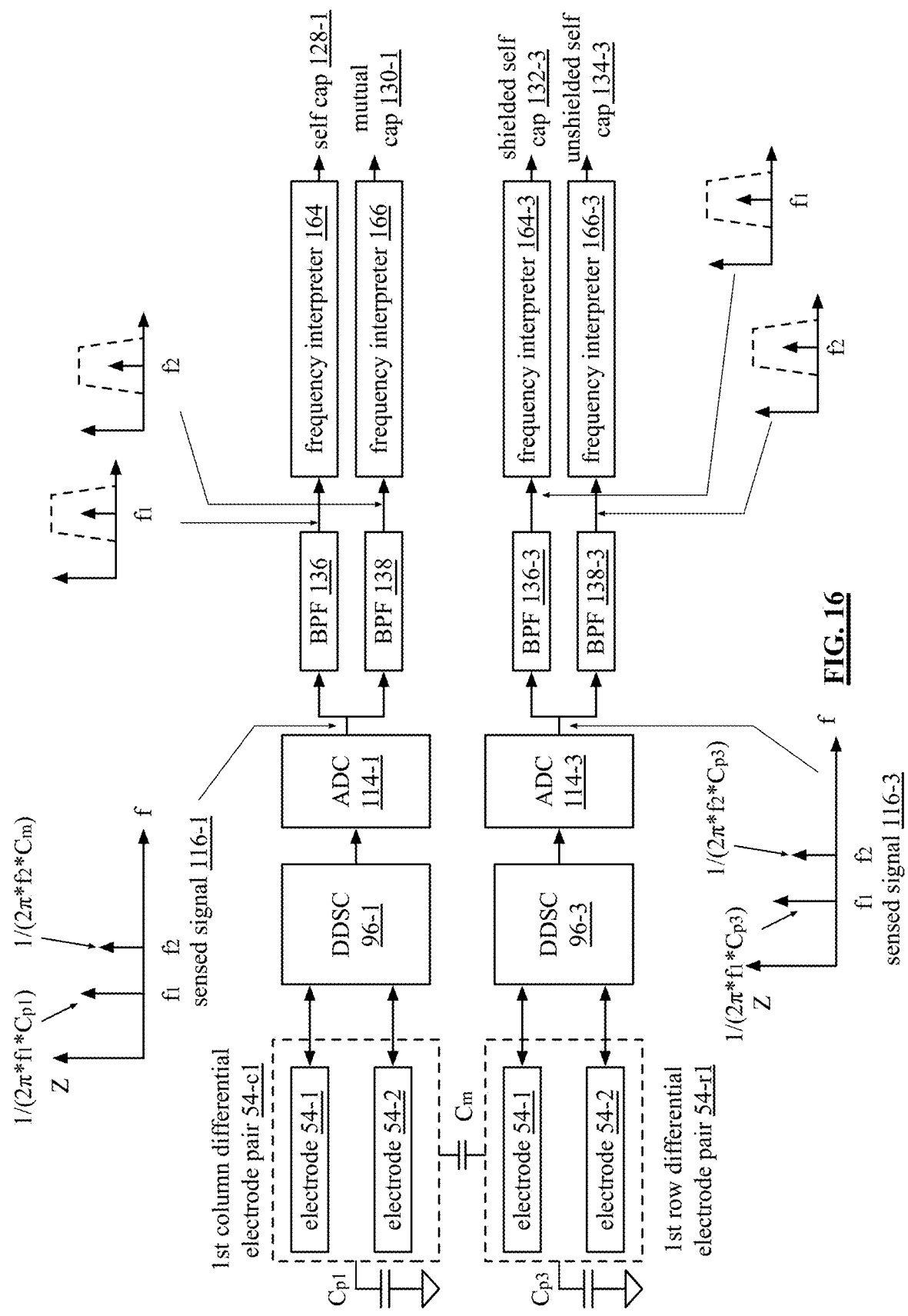
FIG. 16 is a schematic block diagram of a touchless example of a few differential drive-sense circuits and a portion of the touch screen processing module of a differential touch screen display.

FIG. 16 is a schematic block diagram of a touchless example of a few differential drive-sense circuits 96-1 and 96-3 and a portion of the touch screen processing module 56 of a differential touch screen display 44. The portion of the processing module 56 includes analog to digital converters (ADCs) 114-1 and 114-3 (e.g., when the DDSCs do not include ADCs), band pass filters 136, 138, 136-1, & 138-3, and frequency interpreters 164 & 164-3, and 166 & 166-3. As previously discussed, a first differential drive-sense circuit is coupled to a first column differential electrode pair 54-c1 and a third differential drive-sense circuit is coupled to a first row differential electrode pair electrode 54-r1.

The differential drive-sense circuits 96 provide electrode signals to their respective differential electrode pairs 54 and produce therefrom respective sensed signals 116. The first sensed signal 116-1 includes a first frequency component at $f_1$ that corresponds to the self capacitance of the first column differential electrode pair 54-c1 and a second frequency component at $f_2$ that corresponds to the mutual capacitance between the first column differential electrode pair 54-c1 and the first row differential electrode pair 54-r1. The second sensed signal 116-3 includes a first frequency component at $f_1$ that corresponds to the shielded self capacitance of the first row differential electrode pair electrode 54-r1 and/or a second frequency component at $f_2$ that corresponds to the unshielded self capacitance of the first row differential electrode pair 54-r1. In an embodiment, the sensed signals 116 are frequency domain digital signals.

The first bandpass filter 136 passes (i.e., substantially unattenuated) signals in a bandpass region (e.g., tens of Hertz to hundreds of thousands of Hertz, or more) centered about frequency $f_1$ and attenuates signals outside of the bandpass region. As such, the first bandpass filter 136 passes the portion of the sensed signal 116-1 that corresponds to the self capacitance of the first column differential electrode pair 54-c1. In an embodiment, the sensed signal 116 is a digital signal, thus, the first bandpass filter 136 is a digital filter such as a cascaded integrated comb (CIC) filter, a finite impulse response (FIR) filter, an infinite impulse response (IIR) filter, a Butterworth filter, a Chebyshev filter, an elliptic filter, etc.

The frequency interpreter 164 receives the first bandpass filter sensed signal and interprets it to render a self capacitance ("cap") 128-1 value for the first column differential electrode pair 54-c1. As an example, the frequency interpreter 164 is a processing module, or portion thereof, that executes a function to convert the first bandpass filter sensed signal into the self capacitance 128-1 value, which is an actual capacitance value, a relative capacitance value (e.g., in a range of 0-100), or a difference capacitance value (e.g., is the difference between a default capacitance value and a sensed capacitance value). As another example, the frequency interpreter 164 is a look up table where the first bandpass filter sensed signal is an index for the table.

The second bandpass filter 138 passes, substantially unattenuated, signals in a second bandpass region (e.g., tens of Hertz to hundreds of thousands of Hertz, or more) centered about frequency $f_2$ and attenuates signals outside of the bandpass region. As such, the second bandpass filter 138 passes the portion of the sensed signal 116-1 that corresponds to the mutual capacitance between the first column differential electrode pair 54-c1 and the first row differential electrode pair 54-r1. In an embodiment, the sensed signal 116-1 is a digital signal, thus, the second bandpass filter 138 is a digital filter such as a cascaded integrated comb (CIC) filter, a finite impulse response (FIR) filter, an infinite impulse response (IIR) filter, a Butterworth filter, a Chebyshev filter, an elliptic filter, etc.

The frequency interpreter 166 receives the second bandpass filter sensed signal and interprets it to render a mutual capacitance ("cap") 130-1 value. As an example, the frequency interpreter 166 is a processing module, or portion thereof, that executes a function to convert the second bandpass filter sensed signal into the mutual capacitance 130-1 value, which is an actual capacitance value, a relative capacitance value (e.g., in a range of 0-100), and/or a difference capacitance value (e.g., is the difference between a default capacitance value and a sensed capacitance value). As another example, the frequency interpreter 166 is a look up table where the first bandpass filter sensed signal is an index for the table.

For the first row differential electrode pair 54-r1, the differential drive-sense circuit 96-3 produces a third sensed signal 116-3, which includes a shielded self capacitance component and/or an unshielded self capacitance component. The third bandpass filter 136-3 is similar to the first bandpass filter 136 and, as such passes signals in a bandpass region centered about frequency $f_1$ and attenuates signals outside of the bandpass region. In this example, the third bandpass filter 136-3 passes the portion of the third sensed signal 116-3 that corresponds to the shielded self capacitance of the row differential electrode pair 54-r.

The frequency interpreter 164-3 receives the third bandpass filter sensed signal and interprets it to render a shielded self capacitance ("cap") 132-3 value for the first row differential electrode pair 54-r1. The frequency interpreter 164-3 may be implemented similarly to the first frequency interpreter 164 or an integrated portion thereof. In an embodiment, the shielded self capacitance 132-3 value is an actual capacitance value, a relative capacitance value (e.g., in a range of 0-100), or a difference capacitance value (e.g., is the difference between a default capacitance value and a sensed capacitance value).

The fourth bandpass filter 138-3, if included, is similar to the second bandpass filter 138. As such, it passes, substantially unattenuated, signals in a bandpass region centered about frequency $f_2$ and attenuates signals outside of the bandpass region. In this example, the fourth bandpass filter 138-3 passes the portion of the third sensed signal 116-3 that corresponds to the unshielded self capacitance of the first row differential electrode pair 54-r1.

The frequency interpreter 166-3, if included, receives the fourth bandpass filter sensed signal and interprets it to render an unshielded self capacitance ("cap") 134-3 value. The frequency interpreter 166-3 may be implemented similarly to the frequency interpreter 166 or an integrated portion thereof. In an embodiment, the unshielded self capacitance 134-3 value is an actual capacitance value, a relative capacitance value (e.g., in a range of 0-100), or a difference capacitance value (e.g., is the difference between a default capacitance value and a sensed capacitance value). Note that the unshielded self capacitance may be ignored, thus band pass filter 138-3 and frequency interpreter 166-3 may be omitted.

Figure 17:
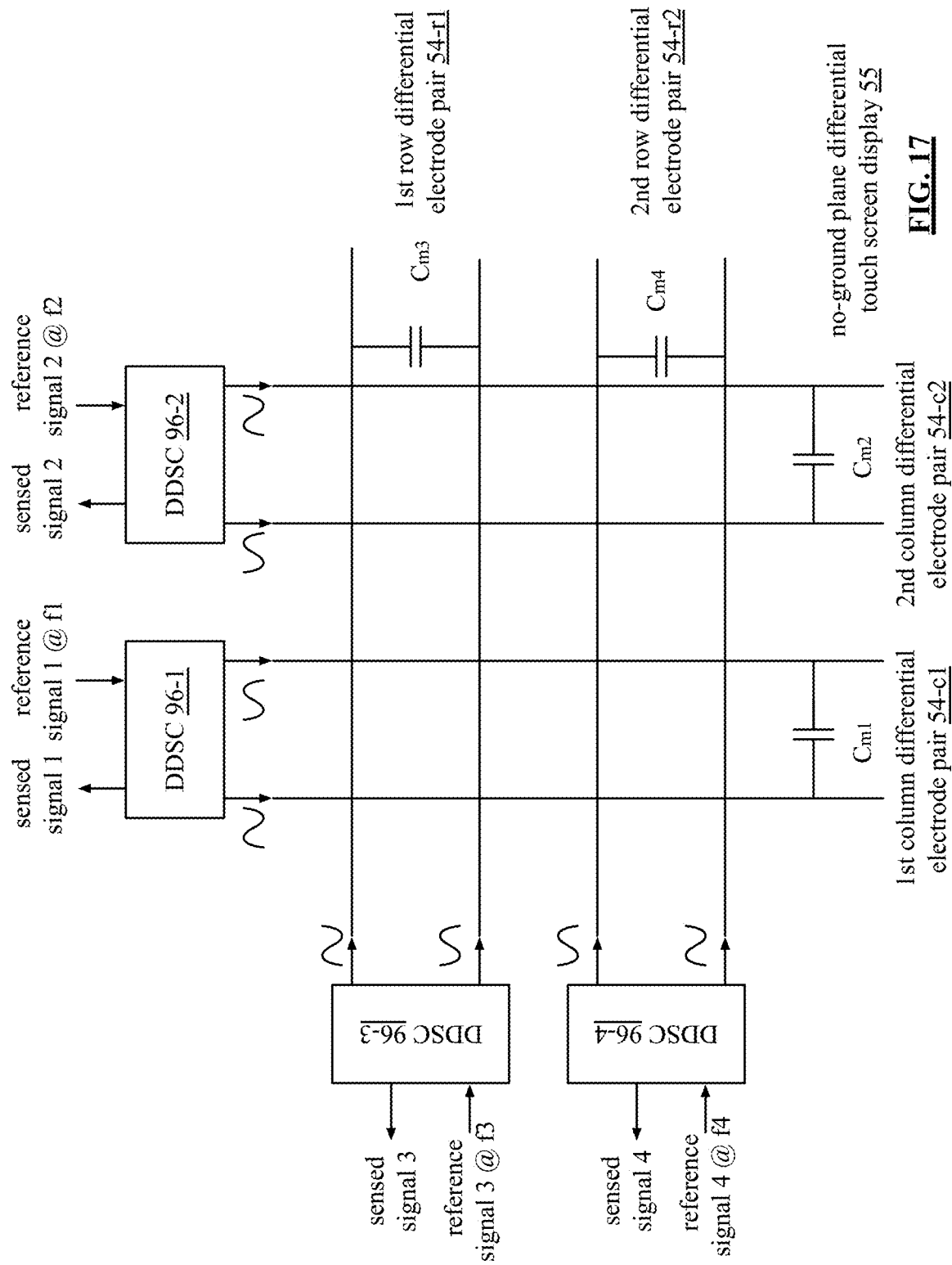
FIG. 17 is a schematic block diagram of an embodiment of a portion of a no-ground plane differential touch screen display.

FIG. 17 is a schematic block diagram of an embodiment of a portion of a no-ground plane differential touch screen display 55 that includes differential drive-sense circuits (DDSCs) 96-1 through 96-4, a first and second column differential electrode pair 54-c1 and 54-c2, and a first and second row differential electrode pair 54-r1 and 54-r2. The no-ground plane differential touch screen display 55 of FIG. 17 operates similarly to the touch screen display of FIG. 12 except that there is no ground plane. Without a ground connection at each electrode, self capacitance cannot be measured. However, due to increased mutual capacitance generated by the differential electrode pairs as previously discussed, mutual capacitance detection is improved and can be used to detect touches, hovers, and un-grounded objects without the need of self capacitance detection.

The DDSCs 96-1 through 96-4 operate similarly to the DDSCs of FIG. 10 (e.g., including the ADC at the output) to provide reference signals 1-4 (e.g., VREF) to the differential electrode pairs and generate sensed signals 1-4 representative of impedance changes of the differential electrode pairs.

As an example, a reference signal 1 (e.g., analog or digital) is provided to the DDSC 96-1, a reference signal 2 (e.g., analog or digital) is provided to the DDSC 96-2, a reference signal 3 (e.g., analog or digital) is provided to the DDSC 96-3, and a reference signal 4 (e.g., analog or digital) is provided to the DDSC 96-4. The reference signal 1 includes a DC component and/or an oscillating at frequency $f_1$, the reference signal 2 includes a DC component and/or an oscillating at frequency $f_2$, the reference signal 3 includes a DC component and/or an oscillating at frequency $f_3$, and the reference signal 4 includes a DC component and/or an oscillating at frequency $f_4$.

The DDSC 96-1 generates an electrode signal based on the reference signal 1 and provides the electrode signal to the first column differential electrode pair 54-c1. The DDSC 96-2 generates an electrode signal based on the reference signal 2 and provides the electrode signal to the second column differential electrode pair 54-c2. The DDSC 96-3 generates an electrode signal based on the reference signal 3 and provides the electrode signal to the first row differential electrode pair 54-r1. The DDSC 96-4 generates an electrode signal based on the reference signal 4 and provides the electrode signal to the second column differential electrode pair 54-r2.

In response to the electrode signals being applied to the differential electrode pairs, the DDSC 96-1 generates a sensed signal 1, which includes components at frequencies $f_1$-$f_4$. The component at frequency $f_1$ corresponds to the mutual capacitance of first and second electrodes of the first column differential electrode pair 54-c1 or $C_{m1}$.

In response to the electrode signals being applied to the differential electrode pairs, the DDSC 96-2 generates a sensed signal 2, which includes components at frequencies $f_1$-$f_4$. The component at frequency $f_2$ corresponds to the mutual capacitance of first and second electrodes of the second column differential electrode pair 54-c2 or $C_{m2}$.

In response to the electrode signals being applied to the differential electrode pairs, the DDSC 96-3 generates a sensed signal 3, which includes components at frequencies $f_1$-$f_4$. The component at frequency $f_3$ corresponds to the mutual capacitance of first and second electrodes of the first row differential electrode pair 54-r1 or $C_{m3}$.

In response to the electrode signals being applied to the differential electrode pairs, the DDSC 96-4 generates a sensed signal 4, which includes components at frequencies $f_1$-$f_4$. The component at frequency $f_4$ corresponds to the mutual capacitance of first and second electrodes of the second row differential electrode pair 54-r2 or $C_{m4}$.

With no ground plane, the electrical field (generated by mutual capacitance) does not radiate outwards but stays between differential pairs. Each active differential drive-sense circuit uses a different frequency for measuring mutual capacitance of a differential electrode pair (e.g., $f_1$-$f_4$) to isolate the intended mutual capacitance measurement. Unlike self capacitance measurement, cross coupling between cross mutual capacitance and pair mutual capacitance is possible and thus different frequencies for measuring mutual capacitance are required. The differential electrode pairs are positioned such that electrodes having in-phase reference signals are next to each other to substantially eliminate cross-coupling between the row and column differential electrode pairs.

Figure 18:
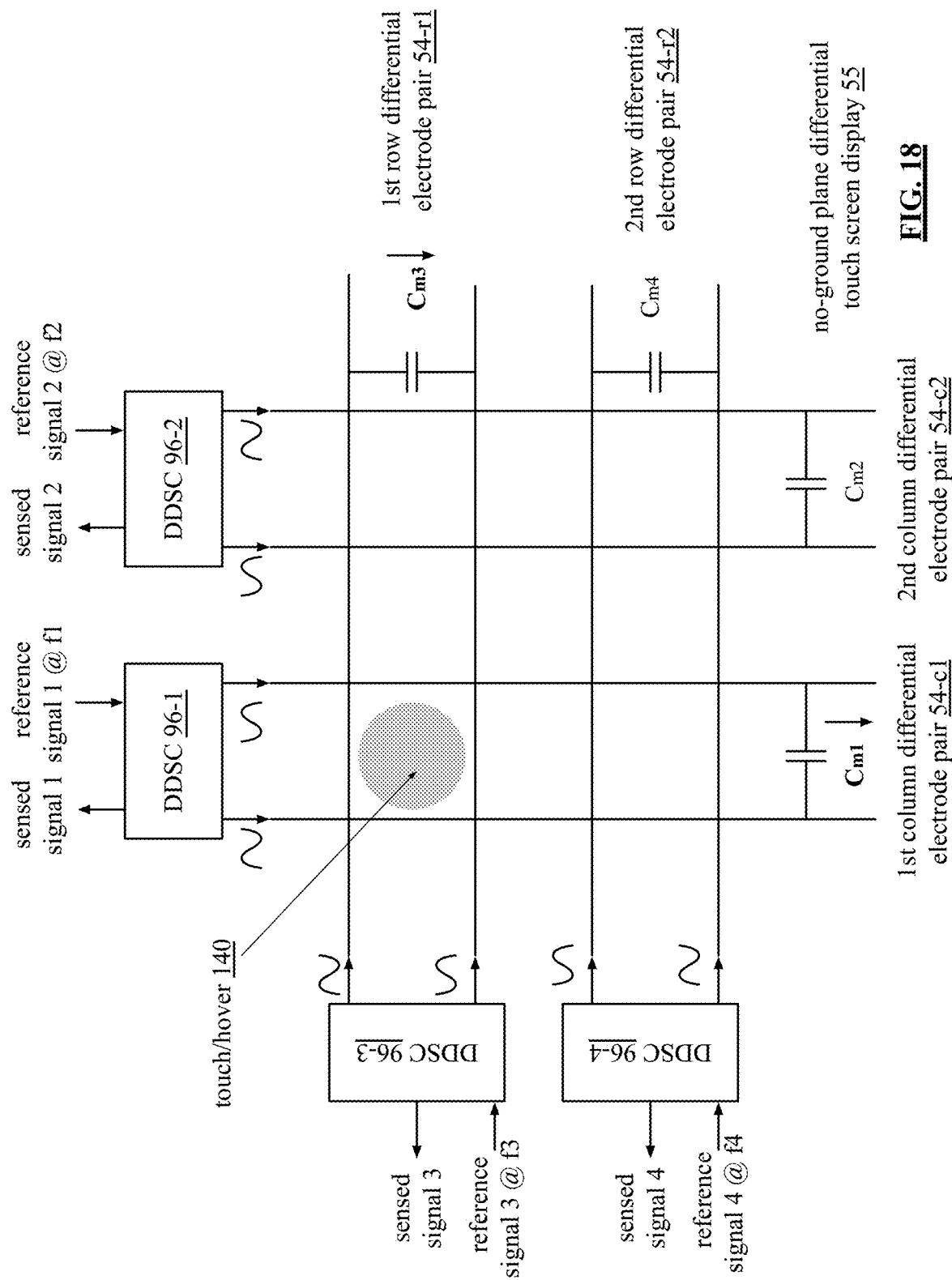
FIG. 18 is a schematic block diagram of an embodiment of a portion of a no-ground plane differential touch screen display.

FIG. 18 is a schematic block diagram of an embodiment of a portion of a no-ground plane differential touch screen display 55 that includes differential drive-sense circuits (DDSCs) 96-1 through 96-4, a first and second column differential electrode pair 54-c1 and 54-c2, and a first and second row differential electrode pair 54-r1 and 54-r2. FIG. 18 operates similarly to the no-ground plane differential touch screen display 55 of FIG. 17 and shows an example of detecting a touch and/or hover 140 on the no-ground plane differential touch screen display 55. The touch and/or hover 140 shown causes a decrease in the mutual capacitance between a first column differential electrode pair 54-c (e.g., $C_{m1}$) and a decrease in the mutual capacitance between a first row differential electrode pair 54-r (e.g., $C_{m3}$).

The DDSCs 1 and 3 produce sensed signals representative of these changes and a processing module is operable to interpret the changes as mutual capacitance measurements and interpret the mutual capacitance measurements as user inputs. For example, a smaller mutual capacitance decrease may indicate a hover user input and a larger mutual capacitance decrease may indicate a touch user input. Further, the location and duration of the mutual capacitance changes may indicate particular user input functions (e.g., a selection, scroll, etc.).

Figure 19:
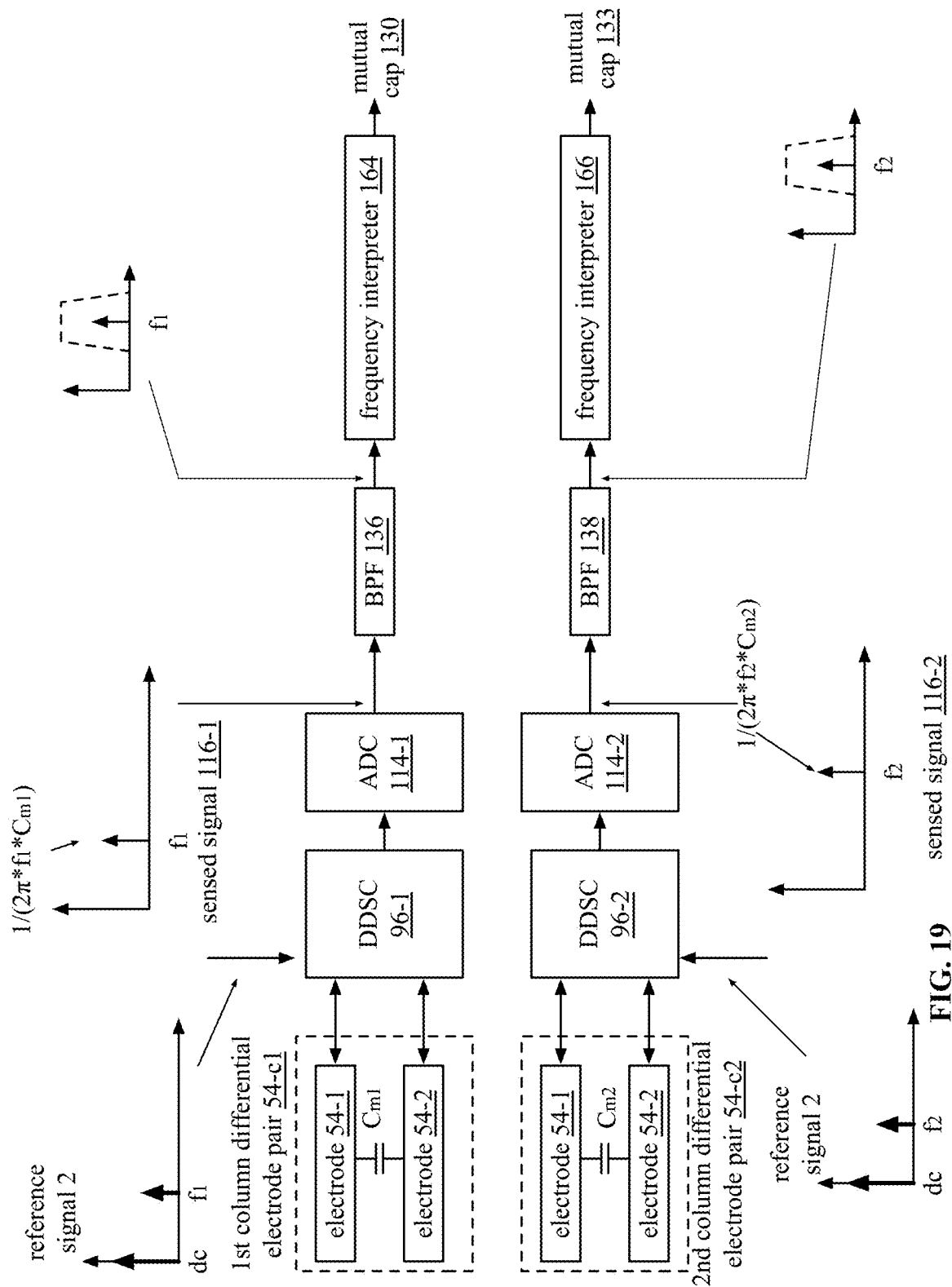
FIG. 19 is a schematic block diagram of an example of column differential drive-sense circuits and a portion of the touch screen processing module of a no-ground plane differential touch screen display.

FIG. 19 is a schematic block diagram of an example of column differential drive-sense circuits 96-1 and 96-2 (e.g., DDSC 96-1 and 2 of FIGS. 17-18) and a portion of the touch screen processing module of a no-ground plane differential touch screen display. The portion of the processing module includes analog to digital converters (ADCs) 114-1 and 114-2 (e.g., when the DDSCs do not include ADCs), band pass filters 136 and 138 and frequency interpreters 164 and 166. A first differential drive-sense circuit 96-1 is coupled to a first column differential electrode pair 54-c1 and a second differential drive-sense circuit 96-2 is coupled to a second column differential electrode pair electrode 54-c2.

The differential drive-sense circuits 96 provide electrode signals to their respective differential electrode pairs 54 and produce therefrom respective sensed signals 116. The first sensed signal 116-1 includes a first frequency component at $f_1$ that corresponds to the mutual capacitance of the first and second electrodes of the first column differential electrode pair 54-c1. A second frequency component at $f_2$ is not included in the sensed signal 116-1 since coupling between the column differential pairs does not occur.

The second sensed signal 116-2 includes a second frequency component at $f_2$ that corresponds to the mutual capacitance of the first and second electrodes of the second column differential electrode pair 54-c2. A frequency component at $f_1$ is not included in the sensed signal 116-2 because coupling between the column differential pairs does not occur. In an embodiment, the sensed signals 116 are frequency domain digital signals.

The first bandpass filter 136 passes (i.e., substantially unattenuated) signals in a bandpass region (e.g., tens of Hertz to hundreds of thousands of Hertz, or more) centered about frequency $f_1$ and attenuates signals outside of the bandpass region. As such, the first bandpass filter 136 passes the portion of the sensed signal 116-1 that corresponds to the mutual capacitance of the first column differential electrode pair 54-c1. In an embodiment, the sensed signal 116-1 is a digital signal, thus, the first bandpass filter 136 is a digital filter such as a cascaded integrated comb (CIC) filter, a finite impulse response (FIR) filter, an infinite impulse response (IIR) filter, a Butterworth filter, a Chebyshev filter, an elliptic filter, etc.

The frequency interpreter 164 receives the first bandpass filter sensed signal and interprets it to render a mutual capacitance ("cap") 130 value for the first column differential electrode pair 54-c1. As an example, the frequency interpreter 164 is a processing module, or portion thereof, that executes a function to convert the first bandpass filter sensed signal into the mutual capacitance 130 value, which is an actual capacitance value, a relative capacitance value (e.g., in a range of 0-100), or a difference capacitance value (e.g., is the difference between a default capacitance value and a sensed capacitance value). As another example, the frequency interpreter 164 is a look up table where the first bandpass filter sensed signal is an index for the table.

For the second column differential electrode pair 54-c2, the differential drive-sense circuit 96-2 produces a second sensed signal 116-2. The bandpass filter 138 passes, substantially unattenuated, signals in a bandpass region centered about frequency $f_2$ and attenuates signals outside of the bandpass region. In this example, the bandpass filter 138 passes the portion of the second sensed signal 116-2 that corresponds to the mutual capacitance of the second column differential electrode pair 54-c2.

The frequency interpreter 166 receives the second bandpass filter sensed signal and interprets it to render a mutual capacitance ("cap") 133 value for the second column differential electrode pair 54-c2. The frequency interpreter 166 may be implemented similarly to the first frequency interpreter 164 or an integrated portion thereof. In an embodiment, the mutual capacitance 133 value is an actual capacitance value, a relative capacitance value (e.g., in a range of 0-100), or a difference capacitance value (e.g., is the difference between a default capacitance value and a sensed capacitance value).

Figure 20:
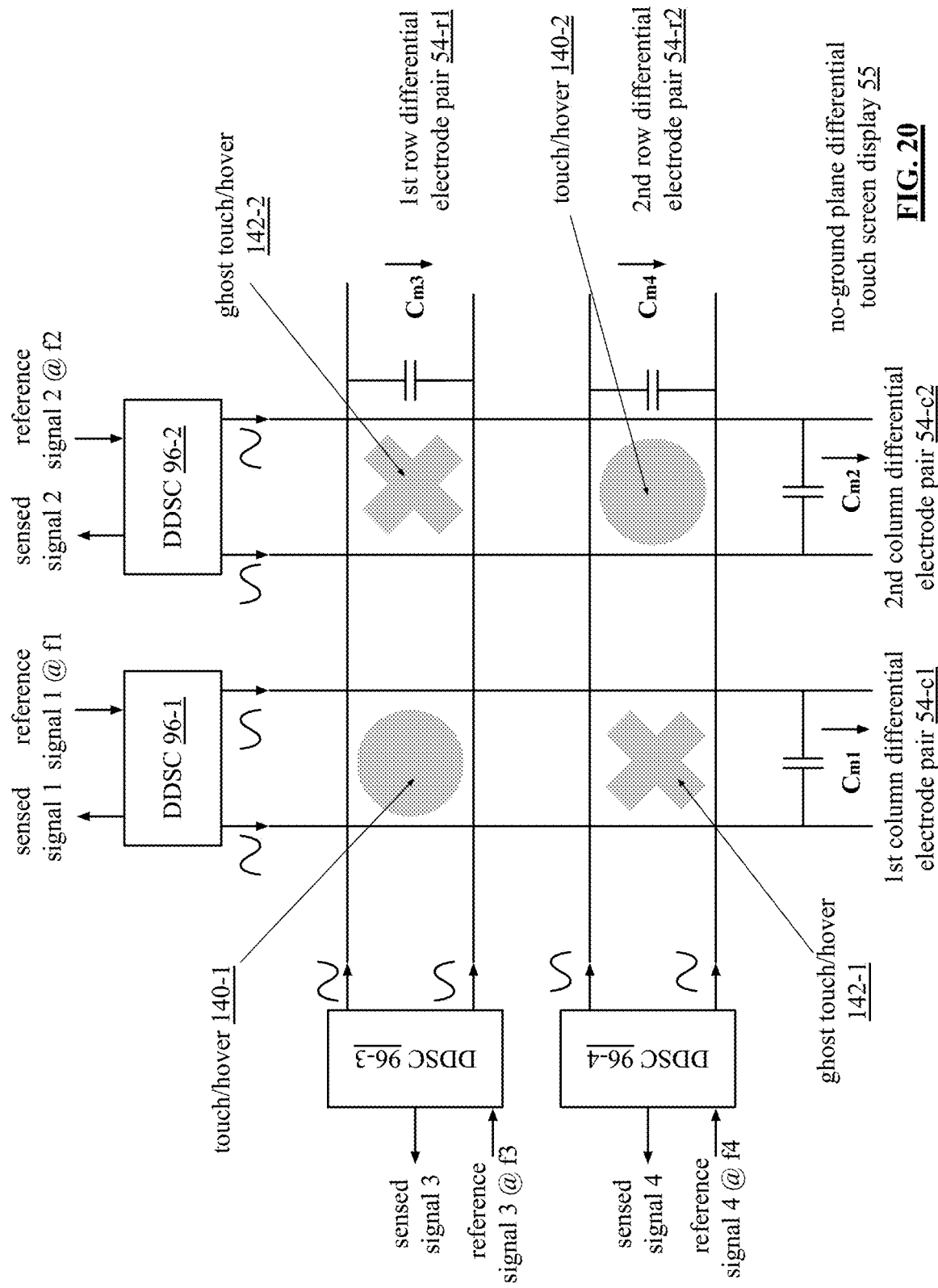
FIG. 20 is a schematic block diagram of an embodiment of a portion of a no-ground plane differential touch screen display.

FIG. 20 is a schematic block diagram of an embodiment of a portion of a no-ground plane differential touch screen display 55 that includes differential drive-sense circuits (DDSCs) 96-1 through 96-4, a first and second column differential electrode pair 54-c1 and 54-c2, and a first and second row differential electrode pair 54-r1 and 54-r2. FIG. 20 operates similarly to the no-ground plane differential touch screen display 55 of FIG. 17 and shows an example of detecting two touches and/or hovers 140-1 and 140-2 simultaneously on the no-ground plane differential touch screen display 55. The touch and/or hover 140-1 shown causes a decrease in the mutual capacitance between the first column differential electrode pair 54-c1 (e.g., $C_{m1}$) and a decrease in the mutual capacitance between the first row differential electrode pair 54-r1 (e.g., $C_{m3}$).

The touch and/or hover 140-2 shown causes a decrease in the mutual capacitance between the second column differential electrode pair 54-c2 (e.g., $C_{m2}$) and a decrease in the mutual capacitance between a second row differential electrode pair 54-r2 (e.g., $C_{m4}$).

Because the simultaneous touches 140-1 and 140-2 cause decreases in the mutual capacitances $C_{m1}$, $C_{m2}$, $C_{m3}$, and $C_{m4}$ simultaneously, a ghost (i.e., not real) touch/hover 142-1 is sensed at the intersection of the first column differential electrode pair 54-c1 and the second row differential electrode pair 54-r2 and a ghost touch/hover 142-2 is sensed at the intersection of the second column differential electrode pair 54-c2 and the first row differential electrode pair 54-r1. In this example, the no-ground plane differential touch screen display is unable to distinguish between the real touches 140-1 and 140-2 and ghost touches 142-1 and 142-2.

Figure 21A:
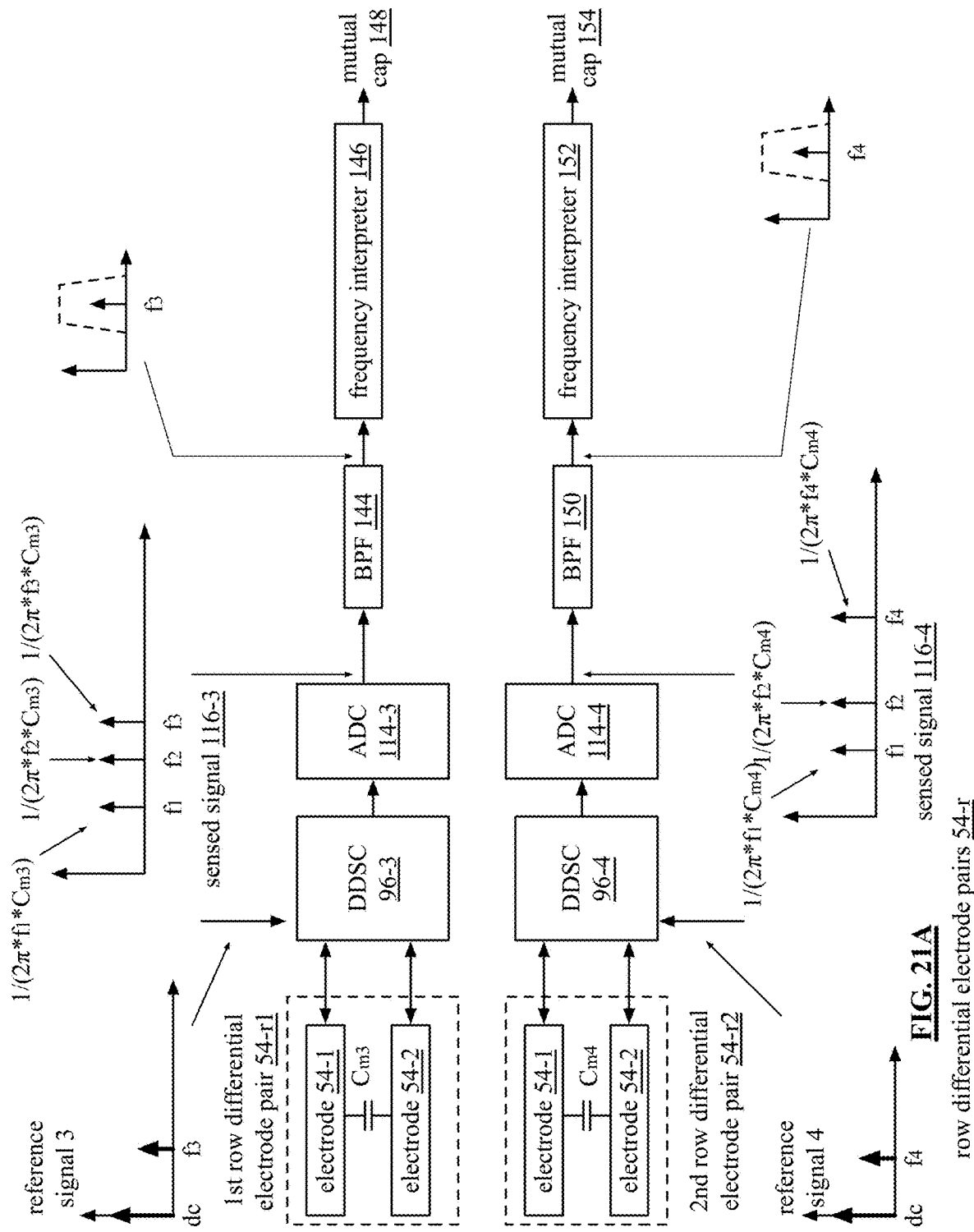
FIGS. 21A-21B are schematic block diagrams of embodiments of differential drive-sense circuits and a portion of the touch screen processing module of a no-ground plane differential touch screen display.
Figure 21B:
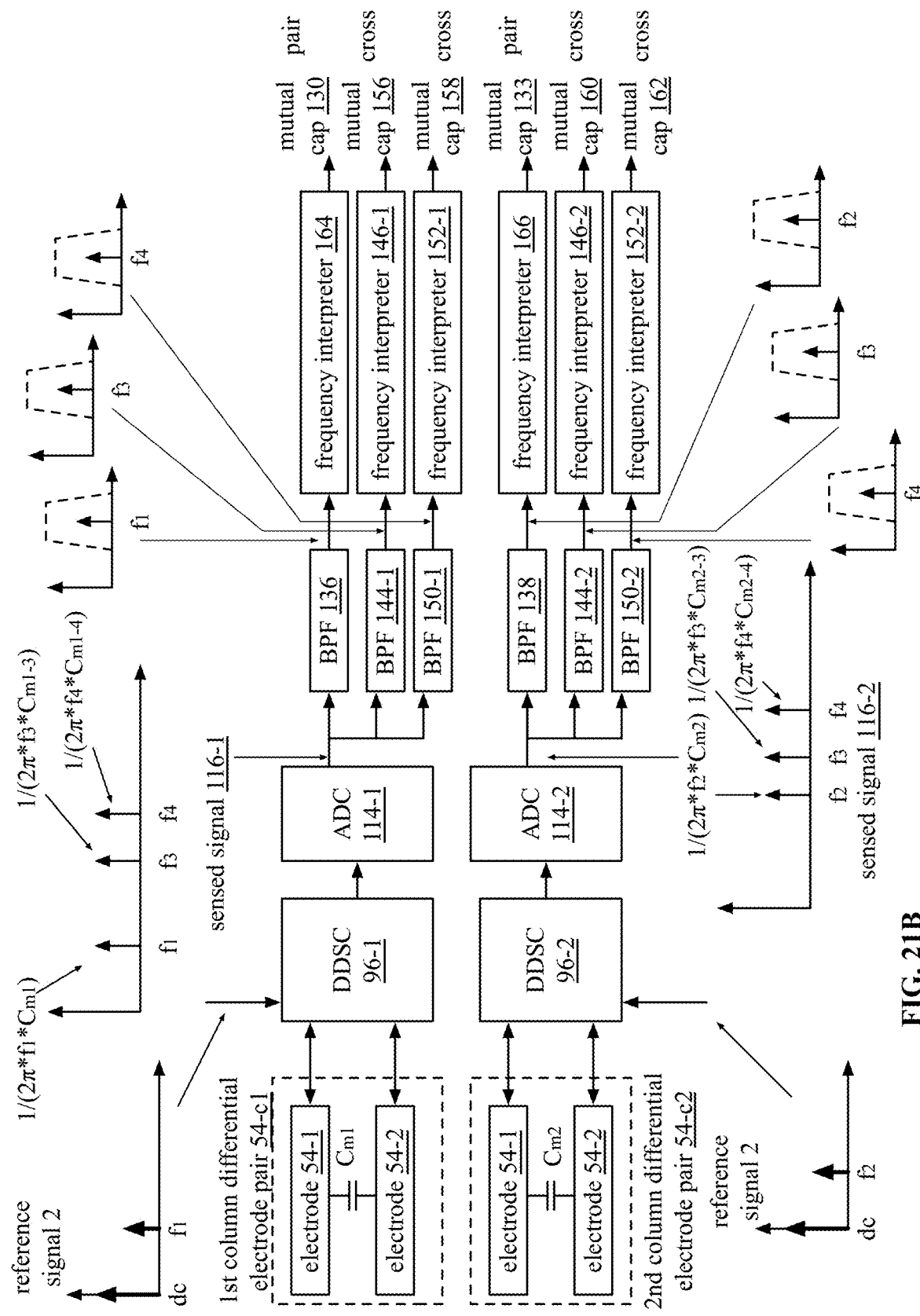

FIGS. 21A-21B are schematic block diagrams of embodiments of differential drive-sense circuits and a portion of the touch screen processing module of a no-ground plane differential touch screen display. FIG. 21A includes row differential drive-sense circuits 96-3 and 96-4 (e.g., DDSC 96-3 and 96-4 of FIG. 20) and a portion of the touch screen processing module of a no-ground plane differential touch screen display. The portion of the processing module includes analog to digital converters (ADCs) 114-3 and 114-4 (e.g., when the DDSCs do not include ADCs), band pass filters 144 and 150 and frequency interpreters 146 and 152. A differential drive-sense circuit 96-3 is coupled to a first row differential electrode pair 54-$r1$ and a differential drive-sense circuit 96-4 is coupled to a second row differential electrode pair electrode 54-$r2$.

The DDSC 96-3 generates an electrode signal based on the reference signal 3 (where reference signal 3 includes the frequency component at $f_3$) and provides the electrode signal to the first row differential electrode pair 54-$r1$. The DDSC 96-4 generates an electrode signal based on the reference signal 4 (where reference signal 4 includes the frequency component at $f_4$) and provides the electrode signal to the second row differential electrode pair 54-$r2$.

FIG. 21B includes column differential drive-sense circuits 96-1 and 96-2 (e.g., DDSC 96-1 and 96-2 of FIG. 20) and a portion of the touch screen processing module of a no-ground plane differential touch screen display. The portion of the processing module includes analog to digital converters (ADCs) 114-1 and 114-2 (e.g., when the DDSCs do not include ADCs), band pass filters 136, 138, 144-1 & 144-2, and 150-1 & 150-2 and frequency interpreters 164, 166, 146-1 & 146-2, and 152-1 and 152-2. A differential drive-sense circuit 96-1 is coupled to a first column differential electrode pair 54-$c1$ and a differential drive-sense circuit 96-2 is coupled to a second column differential electrode pair electrode 54-$c2$.

The DDSC 96-1 generates an electrode signal based on the reference signal 1 (where reference signal 1 includes the frequency component at $f_1$) and provides the electrode signal to the first column differential electrode pair 54-$c1$. The DDSC 96-2 generates an electrode signal based on the reference signal 2 (where reference signal 2 includes the frequency component at $f_2$) and provides the electrode signal to the second column differential electrode pair 54-$c2$.

The differential drive-sense circuits provide electrode signals to their respective differential electrode pairs and produce therefrom respective sensed signals. Referring back to FIG. 21A, the sensed signal 116-3 includes frequency components $f_1$-$f_3$. The first frequency component at $f_1$ corresponds to a mutual capacitance at a crossing of the first row differential electrode pair 54-$r1$ and the first column differential electrode pair 54-$c2$ of FIG. 21B. The second frequency component at $f_2$ corresponds to a mutual capacitance at a crossing of the first row differential electrode pair 54-$r1$ and the second column differential electrode pair 54-$c2$ of FIG. 21. The third frequency component at $f_3$ corresponds to the mutual capacitance of the first and second electrodes of the first row differential electrode pair 54-$r1$. A fourth frequency component at $f_4$ is included in the sensed signal since coupling between the row differential pairs does not occur.

The sensed signal 116-4 includes frequency components $f_1$, $f_2$, and $f_4$. The first frequency component at $f_1$ corresponds to a mutual capacitance at a crossing of the second row differential electrode pair 54-$r2$ and the first column differential electrode pair 54-$c1$ of FIG. 21B. The second frequency component at $f_2$ corresponds to a mutual capacitance at a crossing of the second row differential electrode pair 54-$r2$ and the second column differential electrode pair 54-$c2$ of FIG. 21B. The fourth frequency component at $f_4$ corresponds to the mutual capacitance of the first and second electrodes of the second row differential electrode pair 54-$r2$. The third frequency component at $f_3$ is not included in the sensed signal since coupling between the row differential pairs does not occur. In an embodiment, the sensed signals 116 are frequency domain digital signals.

The bandpass filter 144 passes (i.e., substantially unattenuated) signals in a bandpass region (e.g., tens of Hertz to hundreds of thousands of Hertz, or more) centered about frequency $f_3$ and attenuates signals outside of the bandpass region. As such, the bandpass filter 144 passes the portion of the sensed signal 116-3 that corresponds to the mutual capacitance of the first row differential electrode pair 54-$r1$. In an embodiment, the sensed signal 116-3 is a digital signal, thus, the first bandpass filter 144 is a digital filter such as a cascaded integrated comb (CIC) filter, a finite impulse response (FIR) filter, an infinite impulse response (IIR) filter, a Butterworth filter, a Chebyshev filter, an elliptic filter, etc.

The frequency interpreter 146 receives the bandpass filter sensed signal and interprets it to render a mutual capacitance ("cap") 148 value for the first row differential electrode pair 54-$r1$. As an example, the frequency interpreter 146 is a processing module, or portion thereof, that executes a function to convert the first bandpass filter sensed signal into the mutual capacitance value 148, which is an actual capacitance value, a relative capacitance value (e.g., in a range of 0-100), or a difference capacitance value (e.g., is the difference between a default capacitance value and a sensed capacitance value). As another example, the frequency interpreter 146 is a look up table where the first bandpass filter sensed signal is an index for the table.

For the second row differential electrode pair 54-$r2$, the differential drive-sense circuit 96-4 produces a second sensed signal 116-4. The bandpass filter 150 passes, substantially unattenuated, signals in a bandpass region centered about frequency $f_4$ and attenuates signals outside of the bandpass region. In this example, the bandpass filter 150 passes the portion of the second sensed signal 116-4 that corresponds to the mutual capacitance of the second row differential electrode pair 54-$r2$.

The frequency interpreter 152 receives the bandpass filter sensed signal and interprets it to render a mutual capacitance ("cap") 154 value for the second row differential electrode pair 54-$r2$. In an embodiment, the mutual capacitance value 154 is an actual capacitance value, a relative capacitance value (e.g., in a range of 0-100), or a difference capacitance value (e.g., is the difference between a default capacitance value and a sensed capacitance value).

Referring to FIG. 21B, the first sensed signal 116-1 includes a first frequency component at $f_1$ that corresponds to the mutual capacitance of the first and second electrodes of the first column differential electrode pair 54-$c1$. The third frequency component at $f_3$ corresponds to a mutual capacitance at a crossing of the first column differential electrode pair 54-$c1$ and the first row differential electrode pair 54-$r1$. A fourth frequency component at $f_4$ corresponds to a mutual capacitance at a crossing of the first column differential electrode pair 54-$c1$ and the second row differential electrode pair 54-$r2$. A second frequency component is not included in the sensed signal because coupling between the column differential pairs does not occur. In an embodiment, the sensed signals 116 are frequency domain digital signals.

To eliminate ghost touches as discussed with reference to FIG. 20, the processing module filters the sensed signals to extract data corresponding to cross sections of columns and row differential electrode pairs. The processing module only needs one mutual capacitance measurement per differential electrode pairs cross section so in the examples of FIGS. 21A-21B, only the sensed signals produced by the column differential electrode pairs are filtered for cross section mutual capacitance as well as the mutual capacitance between the column differential electrode pairs. In another example, only the sensed signals produced by the row differential electrodes pairs are filtered for cross section mutual capacitance as well as the mutual capacitance between the row differential electrode pairs.

The bandpass filter 136 passes (i.e., substantially unattenuated) signals in a bandpass region (e.g., tens of Hertz to hundreds of thousands of Hertz, or more) centered about frequency $f_1$ and attenuates signals outside of the bandpass region. As such, the first bandpass filter 136 passes the portion of the sensed signal 116-1 that corresponds to the mutual capacitance of the first column differential electrode pair 54-c. In an embodiment, the sensed signal 116-1 is a digital signal, thus, the first bandpass filter 136 is a digital filter such as a cascaded integrated comb (CIC) filter, a finite impulse response (FIR) filter, an infinite impulse response (IIR) filter, a Butterworth filter, a Chebyshev filter, an elliptic filter, etc.

The frequency interpreter 164 receives the first bandpass filter sensed signal and interprets it to render a mutual capacitance ("cap") 130 value for the first column differential electrode pair 54-c1. As an example, the frequency interpreter 164 is a processing module, or portion thereof, that executes a function to convert the first bandpass filter sensed signal into the mutual capacitance 130 value, which is an actual capacitance value, a relative capacitance value (e.g., in a range of 0-100), or a difference capacitance value (e.g., is the difference between a default capacitance value and a sensed capacitance value). As another example, the frequency interpreter 164 is a look up table where the first bandpass filter sensed signal is an index for the table.

The bandpass filter 144-1 passes (i.e., substantially unattenuated) signals in a bandpass region (e.g., tens of Hertz to hundreds of thousands of Hertz, or more) centered about frequency $f_3$ and attenuates signals outside of the bandpass region. As such, the bandpass filter 144-1 passes the portion of the sensed signal 116-1 that corresponds to the mutual capacitance of the cross section of the first column differential electrode pair 54-c1 and the first row differential electrode pair 54-r1 of FIG. 21A.

The frequency interpreter 146-1 receives the bandpass filter sensed signal and interprets it to render a mutual capacitance ("cap") 156 value for the cross section of the first column differential electrode pair 54-c1 and the first row differential electrode pair 54-r1.

The bandpass filter 150-1 passes, substantially unattenuated, signals in a bandpass region centered about frequency $f_4$ and attenuates signals outside of the bandpass region. In this example, the bandpass filter 150-1 passes the portion of the first sensed signal 116-1 that corresponds to the mutual capacitance of the cross section of the first column differential electrode pair 54-c1 and the second row differential electrode pair 54-r2.

The frequency interpreter 152-1 receives the bandpass filter sensed signal and interprets it to render a mutual capacitance ("cap") 158 value for the cross section of the first column differential electrode pair 54-c1 and the second row differential electrode pair 54-r2.

For the second column differential electrode pair 54-c2, the differential drive-sense circuit 96-2 produces a second sensed signal 116-2. The bandpass filter 138 passes, substantially unattenuated, signals in a bandpass region centered about frequency $f_2$ and attenuates signals outside of the bandpass region. In this example, the bandpass filter 138 passes the portion of the second sensed signal 116-2 that corresponds to the mutual capacitance of the second column differential electrode pair 54-c2.

The frequency interpreter 166 receives the second bandpass filter sensed signal and interprets it to render a mutual capacitance ("cap") 133 value for the second column differential electrode pair 54-c2. In an embodiment, the mutual capacitance 133 value is an actual capacitance value, a relative capacitance value (e.g., in a range of 0-100), or a difference capacitance value (e.g., is the difference between a default capacitance value and a sensed capacitance value).

The bandpass filter 144-2 passes (i.e., substantially unattenuated) signals in a bandpass region (e.g., tens of Hertz to hundreds of thousands of Hertz, or more) centered about frequency $f_3$ and attenuates signals outside of the bandpass region. As such, the bandpass filter 144-2 passes the portion of the sensed signal 116-2 that corresponds to the mutual capacitance of the cross section of the second column differential electrode pair 54-c2 and the first row differential electrode pair 54-r1 of FIG. 21A.

The frequency interpreter 146-2 receives the bandpass filter sensed signal and interprets it to render a mutual capacitance value 160 for the cross section of the second column differential electrode pair 54-c2 and the first row differential electrode pair 54-r1 of FIG. 21A.

The bandpass filter 150-2 passes, substantially unattenuated, signals in a bandpass region centered about frequency $f_4$ and attenuates signals outside of the bandpass region. In this example, the bandpass filter 150-2 passes the portion of the second sensed signal 116-2 that corresponds to the mutual capacitance of the cross section of the second column differential electrode pair 54-c2 and the second row differential electrode pair 54-r2 of FIG. 21A.

The frequency interpreter 152-2 receives the bandpass filter sensed signal and interprets it to render a mutual capacitance ("cap") 162 value for the cross section of the second column differential electrode pair 54-c2 and the second row differential electrode pair 54-r2.

Figure 22:
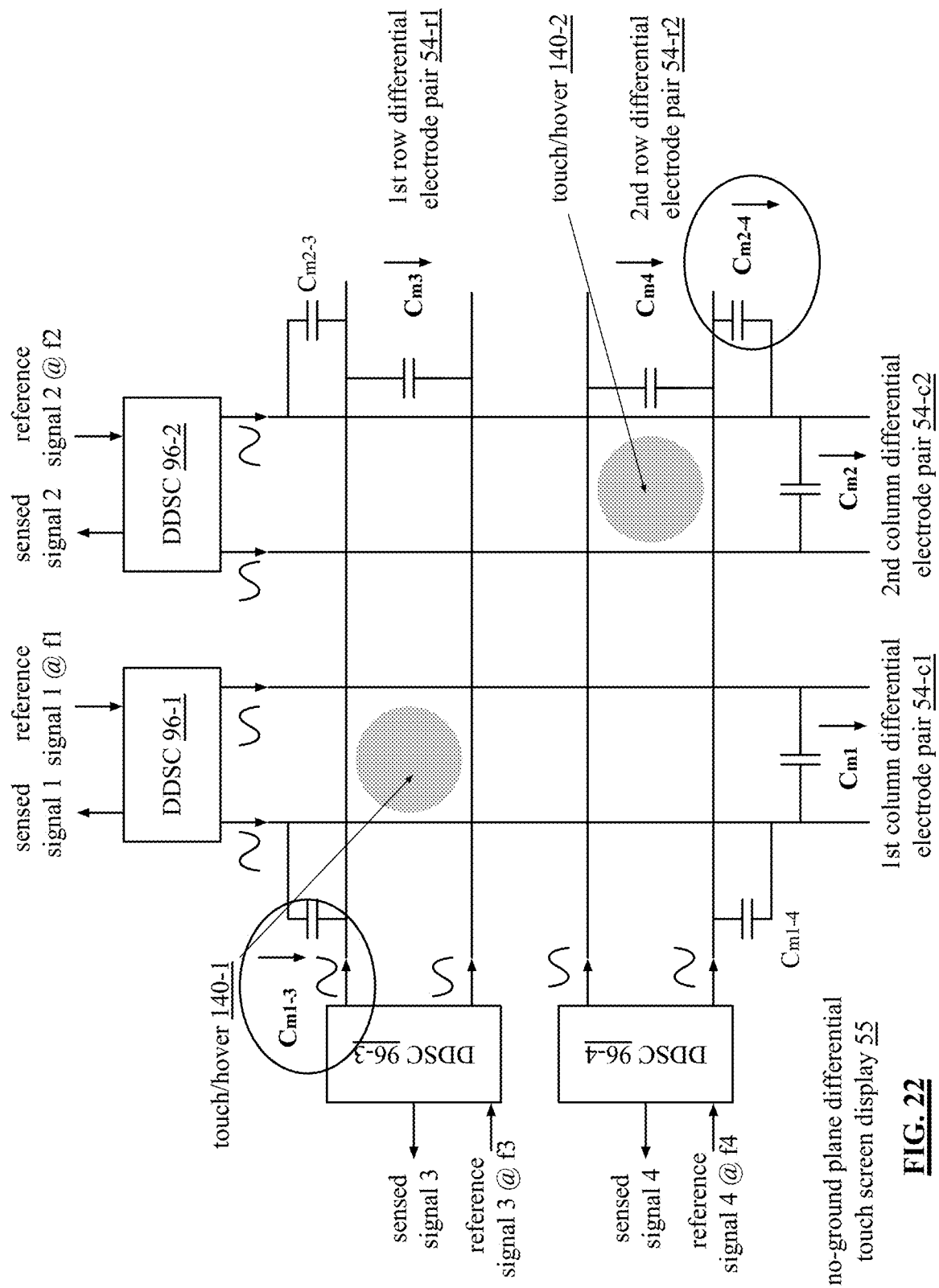
FIG. 22 is a schematic block diagram of an embodiment of a portion of a no-ground plane differential touch screen display.

FIG. 22 is a schematic block diagram of an embodiment of a portion of a no-ground plane differential touch screen display 55 that includes differential drive-sense circuits (DDSCs) 96-1 through 96-4, a first and second column differential electrode pair 54-c1 and 54-c2, and a first and second row differential electrode pair 54-r1 and 54-r2. FIG. 20 operates similarly to the no-ground plane differential touch screen display 55 of FIG. 17 and shows an example of detecting two touches and/or hovers 140-1 and 140-2 simultaneously on the no-ground plane differential touch screen display 55. The touch and/or hover 140-1 shown causes a decrease in the mutual capacitance between a first and second electrode of the first column differential electrode pair 54-c1 (e.g., $C_{m1}$) and a decrease in the mutual capacitance between a first and second electrode of the first row differential electrode pair 54-r1 (e.g., $C_{m3}$).

The touch and/or hover 140-2 shown causes a decrease in the mutual capacitance between a first and second electrode of the second column differential electrode pair 54-c2 (e.g., $C_{m2}$) and a decrease in the mutual capacitance between a first and second electrode of the second row differential electrode pair 54-r2 (e.g., $C_{m4}$).

By identifying mutual capacitance changes at cross sections of column differential electrode pairs and row differential electrode pairs, the no-ground plane differential touch screen display can distinguish between the real touches 140-1 and 140-2 and ghost touches as discussed with reference to FIG. 20.

For example, the real touch 140-1 causes a decrease in the mutual capacitance at the cross section of the first column differential electrode pair 54-c1 and the first row differential electrode pair 54-r1 (e.g., $C_{m1-3}$ goes down). The real touch 140-2 causes a decrease in the mutual capacitance at the cross section of the second column differential electrode pair 54-c2 and the second row differential electrode pair 54-r2 (e.g., $C_{m2-4}$ goes down). Because the mutual capacitance at the cross section of the first column differential electrode pair 54-c1 and the second row differential electrode pair 54-r2 and the mutual capacitance at the cross section of the second column differential electrode pair 54-c2 and the first row differential electrode pair 54-r1 remain unchanged, the no-ground plane differential touch screen display can identify the location of real touches as compared to ghost touches.

Figure 23:
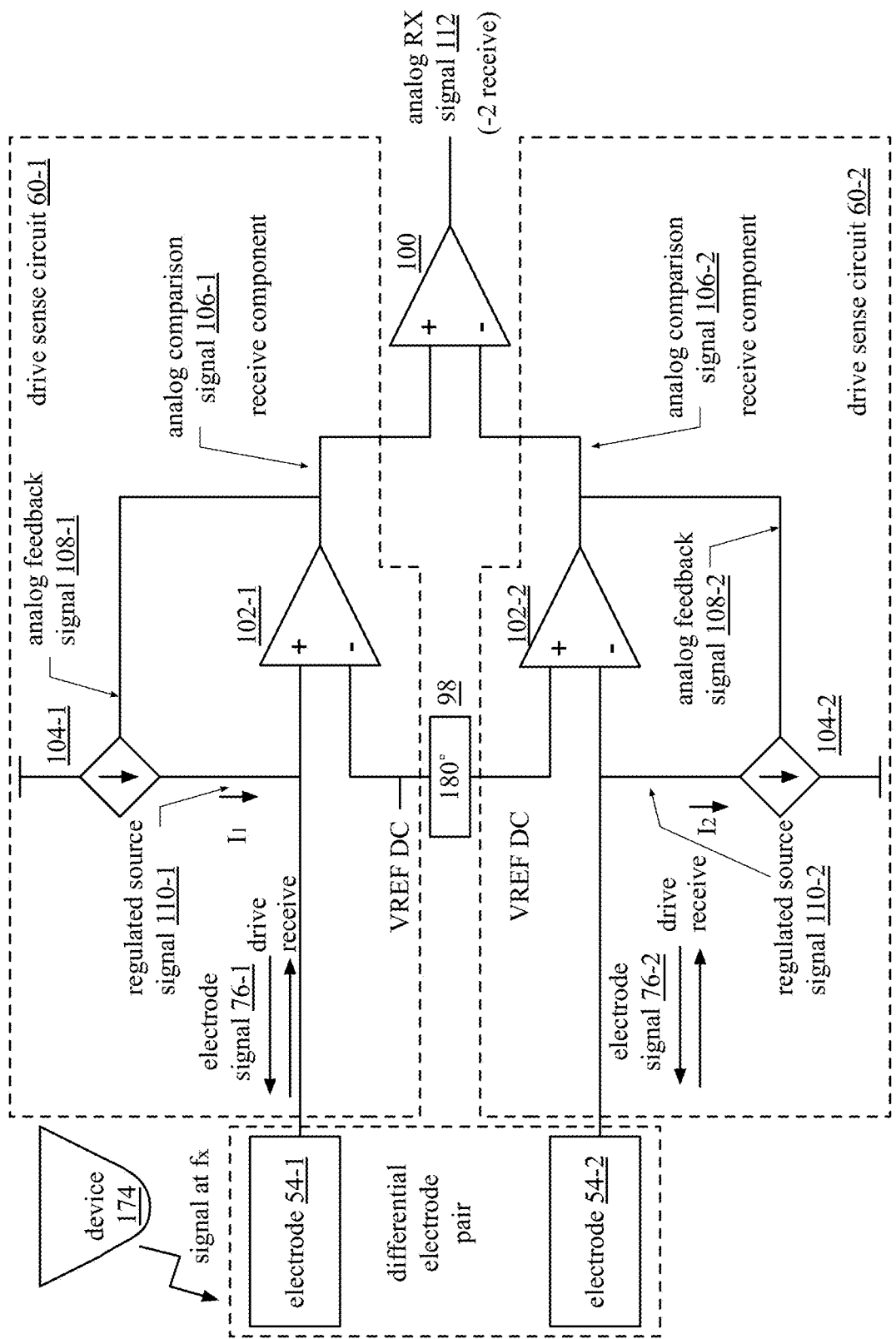
FIG. 23 is a schematic block diagram of an embodiment of a differential drive-sense circuit (DDSC)

FIG. 23 is a schematic block diagram of an embodiment of a differential drive-sense circuit (DDSC) 96 implementing a passive listening function. The differential drive-sense circuit (DDSC) 96 includes drive-sense circuits 60-1 and 60-2, a 180° phase shifter 98, and an output operational amplifier (op-amp) 100. The DDSC 96 of FIG. 23 operates similarly to the DDSC of FIG. 9 except the DDSC 96 of FIG. 23 is fed a direct current (DC) voltage reference signal input (e.g., VREF DC) instead of an analog voltage reference signal.

The drive-sense circuits 60-1 and 60-2 each include an op-amp 102-1 and 102-2, and a regulated current source circuit 104-1 and 104-2. Within the drive-sense circuit 60-1, the positive input terminal of the op-amp 102-1 is coupled to a first electrode 54-1 of a differential electrode pair and the negative input terminal of the op-amp 102-1 is coupled to a voltage reference source (e.g., via a signal generator, via the processing module that generates and provides the voltage reference signal, etc.) that provides the DC voltage reference signal VREF DC. Within the drive-sense circuit 60-2, the positive input terminal of the op-amp 102-2 is coupled to the 180° phase shifter 98. Because VREF DC is a DC signal with no phase, the 180° phase shifter 98 provides the DC voltage reference signal VREF DC to the positive input terminal of the op-amp 102-2. The negative input terminal of the op-amp 56-2 is coupled to a second electrode 54-2 of the differential electrode pair.

The drive-sense circuits 60-1 and 60-2 operate similarly to the drive-sense circuit 60 of FIG. 3 where the feedback loops function to keep the electrode signals 76-1 and 76-2 substantially matching the DC reference signal (VREF DC). As such, the electrode signals 76-1 and 76-2 will have a similar signal format to that of the VREF DC.

In the passive listening mode, the DDSC 96 can detect AC signals in proximity to the differential touch screen display. For example, a device 174 (e.g., an active touch screen pen, an active gaming piece, any active electronic device capable of transmitting an AC signal, etc.) transmits an AC signal at a frequency fx in proximity to the differential electrode pair 54. The electrode signals 76-1 and 76-2 include a drive signal component and a receive signal component that includes the AC signal at a frequency fx. The op-amp 102-1 of the drive-sense circuit 60-1 compares the electrode signal 76-1 to the VREF DC signal to produce an analog comparison signal 106-1 which includes a representation of the AC device signal.

The analog comparison signal 106-1 is fed back to the regulated current source circuit 104-1 as analog feedback signal 108-1. The regulated current source circuit 104-1 generates a regulated source signal 110-1 (e.g., a regulated current signal (I1)) based on the analog feedback signal 108-1. The regulated current signal (I1) in combination with the impedance (Z) of the electrode creates a voltage (V), where V=I*Z. As the impedance (Z) of electrode changes, the regulated current (I) signal is adjusted to keep the voltage (V) substantially unchanged.

The op-amp 102-2 of the drive-sense circuit 60-2 compares the electrode signal 76-2 to the VREF DC signal to produce an analog comparison signal 106-2 which includes a representation of the AC device signal. The analog comparison signal 106-2 is fed back to the regulated current source circuit 104-2 as analog feedback signal 108-2. The regulated current source circuit 104-2 generates a regulated source signal 110-2 (e.g., a regulated current signal (I2)) based on the analog feedback signal 108-2. The regulated current signal (I2) in combination with the impedance (Z) of the electrode creates a voltage (V), where V=I*Z. As the impedance (Z) of the electrode changes, the regulated current (I) signal is adjusted to keep the voltage (V) substantially unchanged.

The output op-amp 100 compares the analog comparison signal 106-1 and the analog comparison signal 106-2 to produce an analog receive (RX) signal 112. Comparing the analog comparison signal 106-1 and the analog comparison signal 106-2 doubles the AC receive components representative of the device 174 signal.

Figure 24:
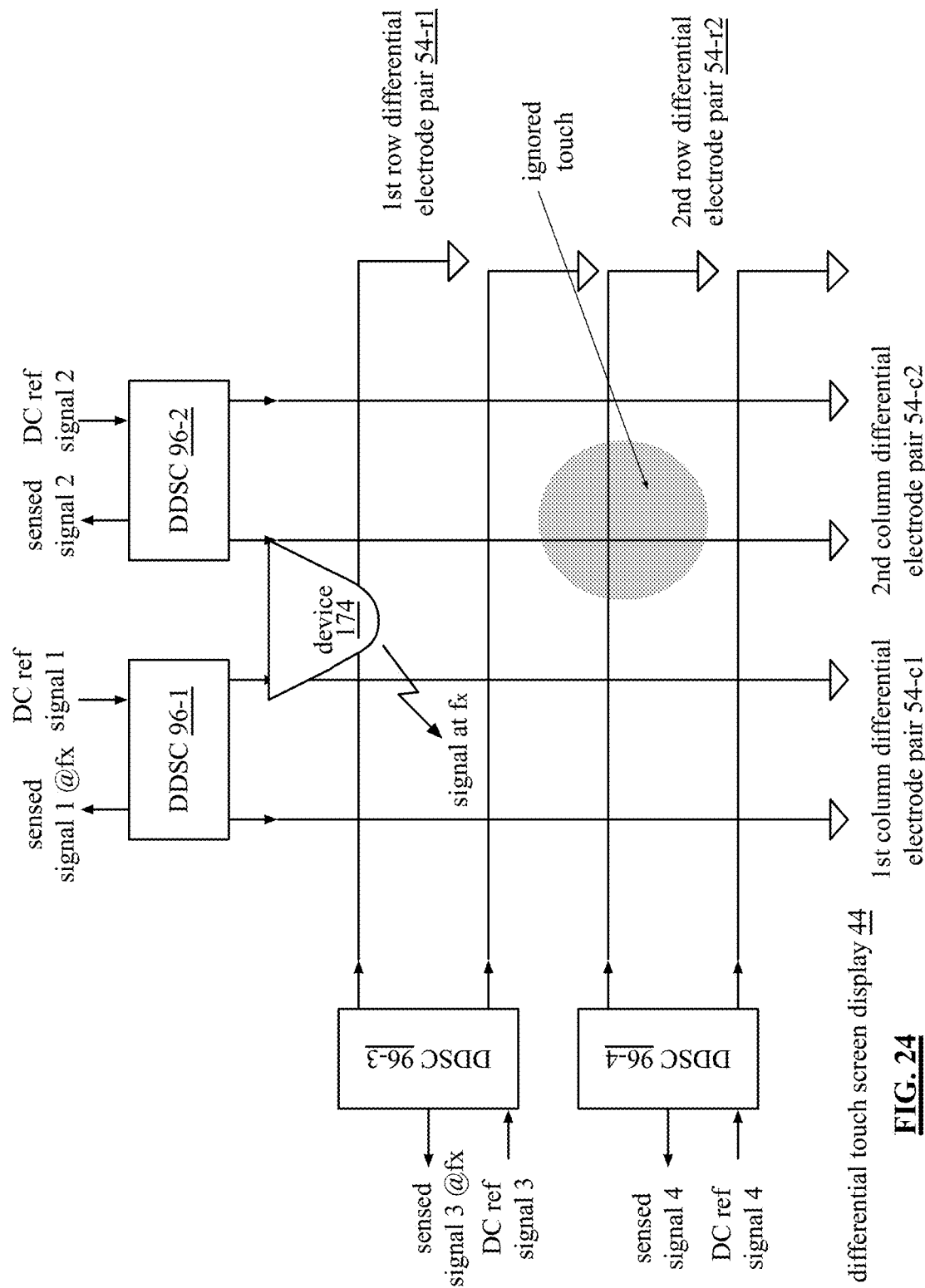
FIG. 24 is a schematic block diagram of an embodiment of a portion of a differential touch screen display.

FIG. 24 is a schematic block diagram of an embodiment of a portion of a differential touch screen display 44 that includes a differential drive-sense circuits (DDSCs) 96-1 through 96-4, a first and second column differential electrode pair 54-c1 and 54-c2, and a first and second row differential electrode pair 54-r1 and 54-r2. The DDSCs 96-1 through 96-4 operate similarly to the DDSC of FIG. 23 to provide DC reference signals 1-4 (e.g., VREF DC) to the differential electrode pairs and generate sensed signals 1-4 representative of AC signals produced by devices proximal to the differential touch screen display 44. To produce the sensed signals 1-4, the DDSCs 96-1 through 96-4 in this example include an ADC at the output to convert the analog reference signals to a digital sensed signal.

In response to a device 174 transmitting a signal at frequency fx proximal to the first column differential electrode pair 54-c1 and the first row differential electrode pair 54-r1, the DDSC 96-1 generates a sensed signal 1 including a component at frequency fx and the DDSC 96-3 generates a sensed signal 3 including a component at frequency fx. Based on the frequency detection and analysis, the differential touch screen display can identify the location of the device, identity of a device, and/or an input function associated with the device. As shown, because the differential touch screen display is in a passive listening mode, touches and hovers that do not produce an AC signal are ignored. Therefore, a user can rest a hand or elbow on the display without the touch interfering with intended user inputs produced by the device 174.

Figure 25:
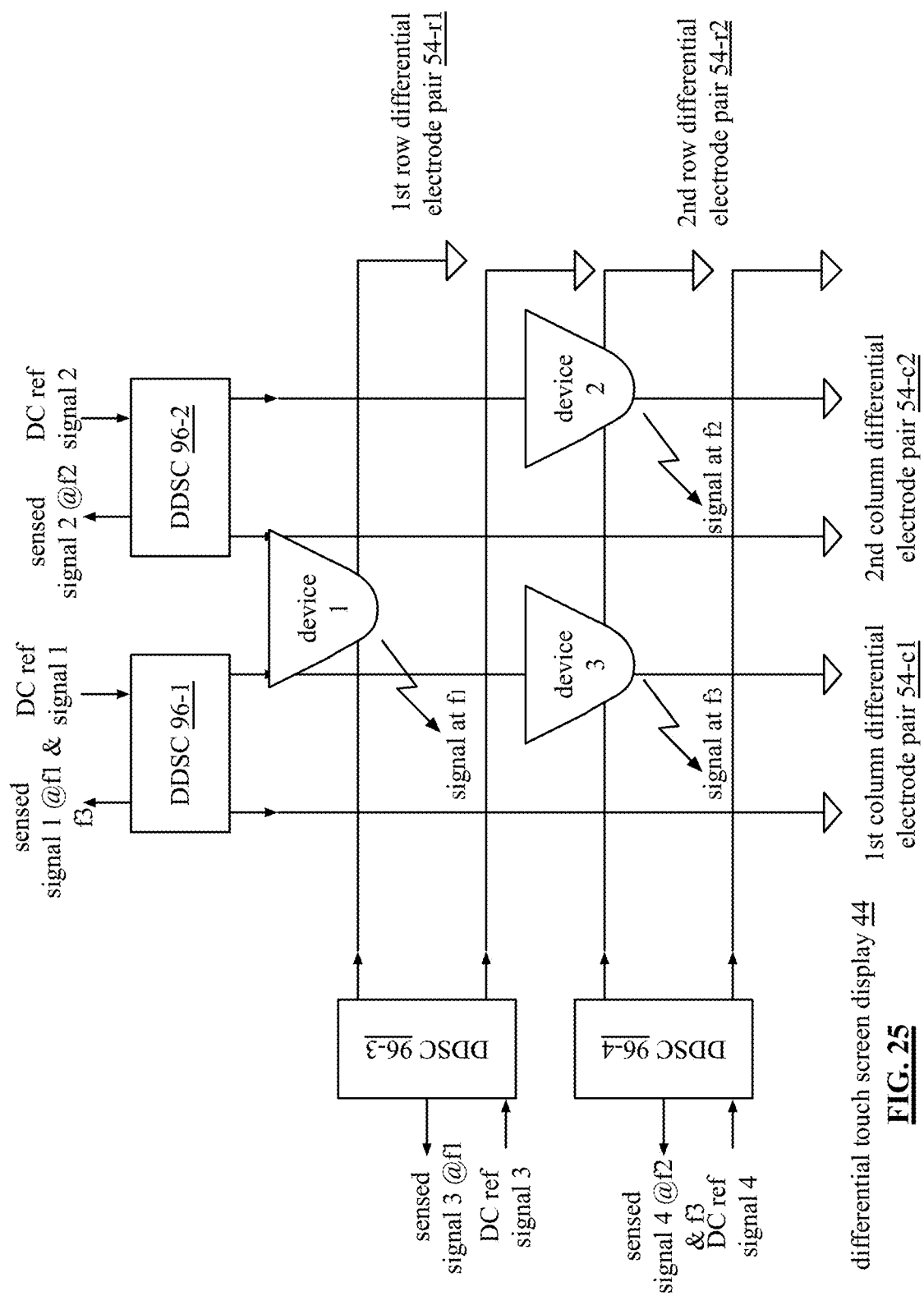
FIG. 25 is a schematic block diagram of another embodiment of a portion of a differential touch screen display.

FIG. 25 is a schematic block diagram of an embodiment of a portion of a differential touch screen display 44 that includes a differential drive-sense circuits (DDSCs) 96-1 through 96-4, a first and second column differential electrode pair 54-c1 and 54-c2, and a first and second row differential electrode pair 54-r1 and 54-r2. FIG. 25 operates similarly to FIG. 24 except a plurality of devices 1-3 are in proximity to the differential touch screen display. For example, the devices 1-3 may be game pieces associated with one or more users.

In the example shown, the device 1 is proximal to the first column differential electrode pair 54-c1 and the first row differential electrode pair 54-r1, the device 2 is proximal to the second column differential electrode pair 54-c2 and the second row differential electrode pair 54-r2, and the device 3 is proximal to the first column differential electrode pair 54-c1 and the second row differential electrode pair 54-r2. Device 1 transmits an AC signal at a frequency $f_1$, device 2 transmits an AC signal at a frequency $f_2$, and device 3 transmits an AC signal at a frequency $f_3$.

As such, the DDSC 96-1 generates a sensed signal 1 including frequency components at frequency $f_1$ and $f_3$, the DDSC 96-2 generates a sensed signal 2 including a frequency component at frequency $f_2$, the DDSC 96-3 generates a sensed signal 3 including a frequency component at frequency $f_1$, and the DDSC 96-4 generates a sensed signal 4 including frequency components at frequency $f_2$ and $f_3$. Based on the frequency detection and analysis, the differential touch screen display can identify the location of the devices, identity of the devices, and/or one or more input functions associated with the devices.

Figure 26:
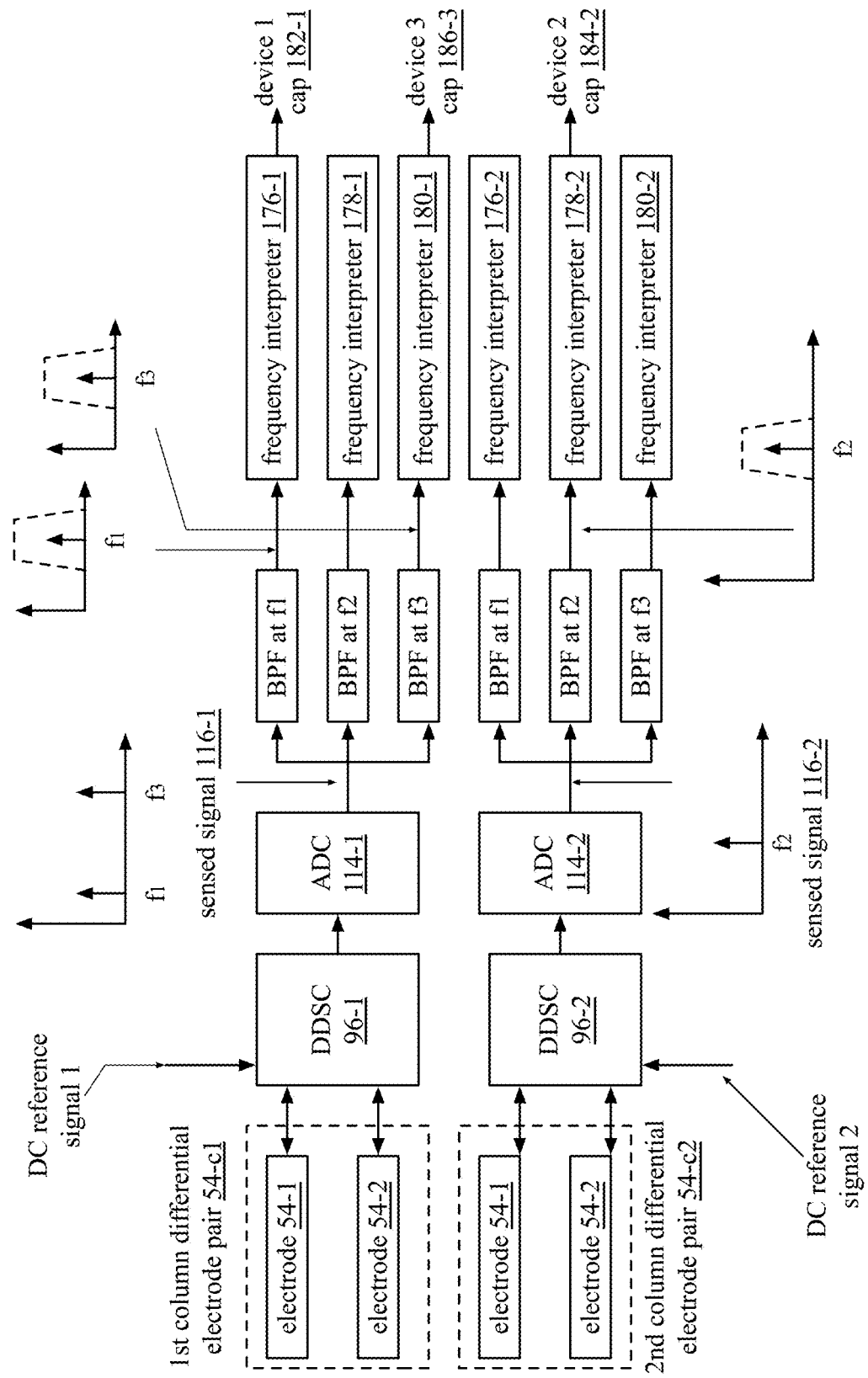
FIG. 26 is a schematic block diagram of an embodiment of differential drive-sense circuits and a portion of the touch screen processing module of a differential touch screen display.

FIG. 26 is a schematic block diagram of an embodiment of differential drive-sense circuits 96-1 and 96-2 and a portion of the touch screen processing module of a differential touch screen display. FIG. 26 includes two column differential drive-sense circuits 96-1 and 96-2 (e.g., DDSC 96-1 and 96-2 of FIG. 25) and the portion of the processing module includes analog to digital converters (ADCs) 114-1 and 114-2 (e.g., when the DDSCs do not include ADCs), bandpass filters at frequencies $f_1$-$f_3$ and frequency interpreters 176-1 & 176-2, 178-1 & 178-2, and 180-1 & 180-2. The differential drive-sense circuit 96-1 is coupled to a first column differential electrode pair 54-$c$1 and the differential drive-sense circuit 96-2 is coupled to a second column differential electrode pair electrode 54-$c$2.

The differential drive-sense circuits provide electrode signals to their respective differential electrode pairs and produce therefrom respective sensed signals. Continuing the example of FIG. 25, the sensed signal 116-1 includes frequency components $f_1$ and $f_3$. The first frequency component at $f_1$ corresponds to detection of the device 1's transmit signal. The third frequency component at $f_3$ corresponds to detection of the device 3's transmit signal. The sensed signal 116-2 includes a frequency component at $f_2$ corresponding to detection of the device 2's transmit signal.

The bandpass filter at $f_1$ passes (i.e., substantially unattenuated) signals in a bandpass region (e.g., tens of Hertz to hundreds of thousands of Hertz, or more) centered about frequency $f_1$ and attenuates signals outside of the bandpass region. The bandpass filter at $f_2$ passes (i.e., substantially unattenuated) signals in a bandpass region (e.g., tens of Hertz to hundreds of thousands of Hertz, or more) centered about frequency $f_2$ and attenuates signals outside of the bandpass region. The bandpass filter at $f_3$ passes (i.e., substantially unattenuated) signals in a bandpass region (e.g., tens of Hertz to hundreds of thousands of Hertz, or more) centered about frequency $f_3$ and attenuates signals outside of the bandpass region. More or less bandpass filters may be used depending on how many signals/devices need to be detected at any one time. Further, when the frequency of a device is unknown, the processing module may include one or more wideband filters for filtering a range of frequencies in an area of interest. As another example, the processing module may include a plurality of narrow band pass filters for filtering a range of frequencies in an area of interest.

As such, the bandpass filter at $f_1$ passes the portion of the sensed signal 116-1 that corresponds to device 1 detection. The bandpass filter at $f_2$ passes the portion of the sensed signal 116-2 that corresponds to device 2 detection. The bandpass filter at $f_3$ passes the portion of the sensed signal 116-1 that corresponds to device 3 detection. In an embodiment, the sensed signal 116-1 is a digital signal, thus, the bandpass filters are digital filters such as cascaded integrated comb (CIC) filters, finite impulse response (FIR) filters, infinite impulse response (IIR) filters, Butterworth filters, Chebyshev filters, elliptic filters, etc.

The frequency interpreters 176-180 receive the bandpass filtered sensed signals and interpret them to render device capacitance values 182-184 for the column differential electrode pairs 54-$c$. As an example, the frequency interpreter 176-1 is a processing module, or portion thereof, that executes a function to convert the first bandpass filter sensed signal of the DDSC 96-1 into the device capacitance ("cap") 182-1 value pertaining to the device 1, which is an actual capacitance value, a relative capacitance value (e.g., in a range of 0-100), or a difference capacitance value (e.g., is the difference between a default capacitance value and a sensed capacitance value). As another example, the frequency interpreter 176-1 is a look up table where the first bandpass filter sensed signal is an index for the table.

The frequency interpreter 180-1 is a processing module, or portion thereof, that executes a function to convert the third bandpass filter sensed signal of the DDSC 96-1 into the device capacitance ("cap") 186-3 value pertaining to the device 3, which is an actual capacitance value, a relative capacitance value (e.g., in a range of 0-100), or a difference capacitance value (e.g., is the difference between a default capacitance value and a sensed capacitance value). As another example, the frequency interpreter 180-1 is a look up table where the third bandpass filter sensed signal is an index for the table.

The frequency interpreter 178-2 is a processing module, or portion thereof, that executes a function to convert a second bandpass filter sensed signal of the DDSC 96-2 into the device capacitance ("cap") 184-2 value pertaining to the device 2, which is an actual capacitance value, a relative capacitance value (e.g., in a range of 0-100), or a difference capacitance value (e.g., is the difference between a default capacitance value and a sensed capacitance value). As another example, the frequency interpreter 178-2 is a look up table where the second bandpass filter sensed signal is an index for the table.

It is noted that terminologies as may be used herein such as bit stream, stream, signal sequence, etc. (or their equivalents) have been used interchangeably to describe digital information whose content corresponds to any of a number of desired types (e.g., data, video, speech, text, graphics, audio, etc. any of which may generally be referred to as 'data').

As may be used herein, the terms "substantially" and "approximately" provides an industry-accepted tolerance for its corresponding term and/or relativity between items. For some industries, an industry-accepted tolerance is less than one percent and, for other industries, the industry-accepted tolerance is 10 percent or more. Other examples of industry-accepted tolerance range from less than one percent to fifty percent. Industry-accepted tolerances correspond to, but are not limited to, component values, integrated circuit process variations, temperature variations, rise and fall times, thermal noise, dimensions, signaling errors, dropped packets, temperatures, pressures, material compositions, and/or performance metrics. Within an industry, tolerance variances of accepted tolerances may be more or less than a percentage level (e.g., dimension tolerance of less than +/−1%). Some relativity between items may range from a difference of less than a percentage level to a few percent. Other relativity between items may range from a difference of a few percent to magnitude of differences.

As may also be used herein, the term(s) "configured to", "operably coupled to", "coupled to", and/or "coupling" includes direct coupling between items and/or indirect coupling between items via an intervening item (e.g., an item includes, but is not limited to, a component, an element, a circuit, and/or a module) where, for an example of indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to".

As may even further be used herein, the term "configured to", "operable to", "coupled to", or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item.

As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1. As may be used herein, the term "compares unfavorably", indicates that a comparison between two or more items, signals, etc., fails to provide the desired relationship.

As may be used herein, one or more claims may include, in a specific form of this generic form, the phrase "at least one of a, b, and c" or of this generic form "at least one of a, b, or c", with more or less elements than "a", "b", and "c". In either phrasing, the phrases are to be interpreted identically. In particular, "at least one of a, b, and c" is equivalent to "at least one of a, b, or c" and shall mean a, b, and/or c. As an example, it means: "a" only, "b" only, "c" only, "a" and "b", "a" and "c", "b" and "c", and/or "a", "b", and "c".

As may also be used herein, the terms "processing module", "processing circuit", "processor", "processing circuitry", and/or "processing unit" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, processing circuitry, and/or processing unit may be, or further include, memory and/or an integrated memory element, which may be a single memory device, a plurality of memory devices, and/or embedded circuitry of another processing module, module, processing circuit, processing circuitry, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, processing circuitry, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, processing circuitry and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, processing circuitry and/or processing unit executes, hard coded and/or operational instructions corresponding to at least some of the steps and/or functions illustrated in one or more of the Figures. Such a memory device or memory element can be included in an article of manufacture.

One or more embodiments have been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claims. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality.

To the extent used, the flow diagram block boundaries and sequence could have been defined otherwise and still perform the certain significant functionality. Such alternate definitions of both functional building blocks and flow diagram blocks and sequences are thus within the scope and spirit of the claims. One of average skill in the art will also recognize that the functional building blocks, and other illustrative blocks, modules and components herein, can be implemented as illustrated or by discrete components, application specific integrated circuits, processors executing appropriate software and the like or any combination thereof.

In addition, a flow diagram may include a "start" and/or "continue" indication. The "start" and "continue" indications reflect that the steps presented can optionally be incorporated in or otherwise used in conjunction with one or more other routines. In addition, a flow diagram may include an "end" and/or "continue" indication. The "end" and/or "continue" indications reflect that the steps presented can end as described and shown or optionally be incorporated in or otherwise used in conjunction with one or more other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

The one or more embodiments are used herein to illustrate one or more aspects, one or more features, one or more concepts, and/or one or more examples. A physical embodiment of an apparatus, an article of manufacture, a machine, and/or of a process may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of one or more of the embodiments. A module implements one or more functions via a device such as a processor or other processing device or other hardware that may include or operate in association with a memory that stores operational instructions. A module may operate independently and/or in conjunction with software and/or firmware. As also used herein, a module may contain one or more sub-modules, each of which may be one or more modules.

As may further be used herein, a computer readable memory includes one or more memory elements. A memory element may be a separate memory device, multiple memory devices, or a set of memory locations within a memory device. Such a memory device may be a read-only memory, random access memory, volatile memory, non-volatile memory, static memory, dynamic memory, flash memory, cache memory, a quantum register or other quantum memory and/or any other device that stores data in a non-transitory manner. Furthermore, the memory device may be in a form of a solid-state memory, a hard drive memory or other disk storage, cloud memory, thumb drive, server memory, computing device memory, and/or other non-transitory medium for storing data. The storage of data includes temporary storage (i.e., data is lost when power is removed from the memory element) and/or persistent storage (i.e., data is retained when power is removed from the memory element). As used herein, a transitory medium shall mean one or more of: (a) a wired or wireless medium for the transportation of data as a signal from one computing device to another computing device for temporary storage or persistent storage; (b) a wired or wireless medium for the transportation of data as a signal within a computing device from one element of the computing device to another element of the computing device for temporary storage or persistent storage; (c) a wired or wireless medium for the transportation of data as a signal from one computing device to another computing device for processing the data by the other computing device; and (d) a wired or wireless medium for the transportation of data as a signal within a computing device from one element of the computing device to another element of the computing device for processing the data by the other element of the computing device. As may be used herein, a non-transitory computer readable memory is substantially equivalent to a computer readable memory. A non-transitory computer readable memory can also be referred to as a non-transitory computer readable storage medium.

While particular combinations of various functions and features of the one or more embodiments have been expressly described herein, other combinations of these features and functions are likewise possible. The present disclosure is not limited by the particular examples disclosed herein and expressly incorporates these other combinations.

What is claimed is:

1. A differential drive sense circuit comprises:
   a non-inverting section operable for coupling to a non-inverting electrode of a differential electrode, wherein the non-inverting section includes:
      a first operational amplifier;
      a first dependent current source; and
      a first feedback circuit, wherein the first feedback circuit provides a first feedback signal to an input of the first dependent current source, wherein:
         the first feedback signal is based on a first output voltage of the first operational amplifier,
         the first dependent current source generates a first dependent current based on the first feedback signal,
         a first input of the first operational amplifier is coupled to an output of the first dependent current source and to the non-inverting electrode,
         the first dependent current is sourced to the non-inverting electrode,
         a second input of the first operational amplifier is coupled to receive a non-inverting reference signal that includes an AC component, and
         the first operational amplifier adjusts the first output to regulate a voltage on the first input of the first operational amplifier to substantially matches a voltage of the non-inverting reference signal;
   an inverting section operable for coupling to a non-inverting electrode of a differential electrode, wherein the non-inverting section includes:
      a second operational amplifier;
      a second dependent current source; and
      a second feedback circuit, wherein the second feedback circuit provides a second feedback signal to an input of the second dependent current source, wherein:
         the second feedback signal is based on a second output voltage of the second operational amplifier,
         the second dependent current source generates a second dependent current based on the second feedback signal,
         a first input of the second operational amplifier is coupled to an output of the second dependent current source and to the non-inverting electrode,
         the second dependent current is sourced to the non-inverting electrode,
         a second input of the second operational amplifier is coupled to receive an inverting reference signal that includes an AC component, and
         the second operational amplifier adjusts the second output to regulate a voltage on the second input of the second operational amplifier to substantially match a voltage of the non-inverting reference signal.

* * * * *